US006487713B1

(12) United States Patent
Cohen et al.

(10) Patent No.: US 6,487,713 B1
(45) Date of Patent: Nov. 26, 2002

(54) SOFTWARE DEVELOPMENT SYSTEM THAT PRESENTS A LOGICAL VIEW OF PROJECT COMPONENTS, FACILITATES THEIR SELECTION, AND SIGNALS MISSING LINKS PRIOR TO COMPILATION

(75) Inventors: Frances Cohen, Irvine, CA (US); Marc Abraham Bombet, Aliso Viejo, CA (US); Robert Dennis Lusinsky, Placentia, CA (US); Timothy Andrew Lewis, Freemont, CA (US); Marc Shane Sandusky, Aliso Viejo, CA (US)

(73) Assignee: Phoenix Technologies Ltd., San Jose, CA (US)

( * ) Notice: Subject to any disclaimer, the term of this patent is extended or adjusted under 35 U.S.C. 154(b) by 0 days.

(21) Appl. No.: 09/404,298

(22) Filed: Sep. 24, 1999

(51) Int. Cl.[7] ................................................ G06F 9/44
(52) U.S. Cl. ..................................................... 717/105
(58) Field of Search ........................ 717/105, 100–104, 717/106–123; 345/700–866, 967; 713/1, 100

(56) References Cited

U.S. PATENT DOCUMENTS

| | | | |
|---|---|---|---|
| 5,325,533 A | | 6/1994 | McInerney et al. |
| 5,519,866 A | * | 5/1996 | Lawrence et al. .......... 717/162 |
| 5,557,730 A | | 9/1996 | Frid-Nielsen |
| 5,574,918 A | | 11/1996 | Hurley et al. |
| 5,758,160 A | | 5/1998 | McInerney et al. |
| 6,061,515 A | * | 5/2000 | Chang et al. ................ 717/114 |
| 6,078,739 A | * | 6/2000 | Paterson et al. ............. 345/619 |
| 6,167,564 A | | 12/2000 | Fontana et al. |
| 6,314,555 B1 | * | 11/2001 | Ndumu et al. ............... 717/101 |
| 6,321,374 B1 | * | 11/2001 | Choy .......................... 717/100 |
| 6,334,158 B1 | * | 12/2001 | Jennye et al. ................ 709/328 |
| 6,370,681 B1 | * | 4/2002 | Dellarocas et al. .......... 717/100 |

FOREIGN PATENT DOCUMENTS

WO    WO 98/14869    4/1998

OTHER PUBLICATIONS

Miyashita et al. Declarative Programming of Graphical Interfaces by Visual Examples. ACM. 1992. pp. 107–116.*
Agrawal et al. OdeView: The Graphical Interface to Ode. ACM. 1990. pp. 34–43.*
Viehstaedt et al. Interaction in Really Graphical User Interfaces. IEEE. 1994. pp. 270–277.*
Kramer J. et al. "Graphical Configuration Programming" Computer, US, IEEE Computer Society, Long Beach, CA, US, vol. 22, No. 10, Oct. 1, 1989, pp. 53–65.
Loques O. et al. "P–RIO: A Modular Parallel–Programming Environment" IEEE Concurrency, US, IEEE Service Center, Piscataway, NY, vol. 6, No. 1, 1998, pp. 47–56.

* cited by examiner

Primary Examiner—Gregory Morse
Assistant Examiner—Wei Zhen

(57) ABSTRACT

A software development system develops a product from core library of source code elements, the core library being categorized into components having one or more features. A configurator develops configuration state data based on a designated platform type and the source code elements. A graphical user interface displays a visual and logical representation of the product according to the configuration state data, includine visual indications of any unresolved dependencies. A product make routine then generates the product from the source code elements according to the configuration state data.

11 Claims, 32 Drawing Sheets

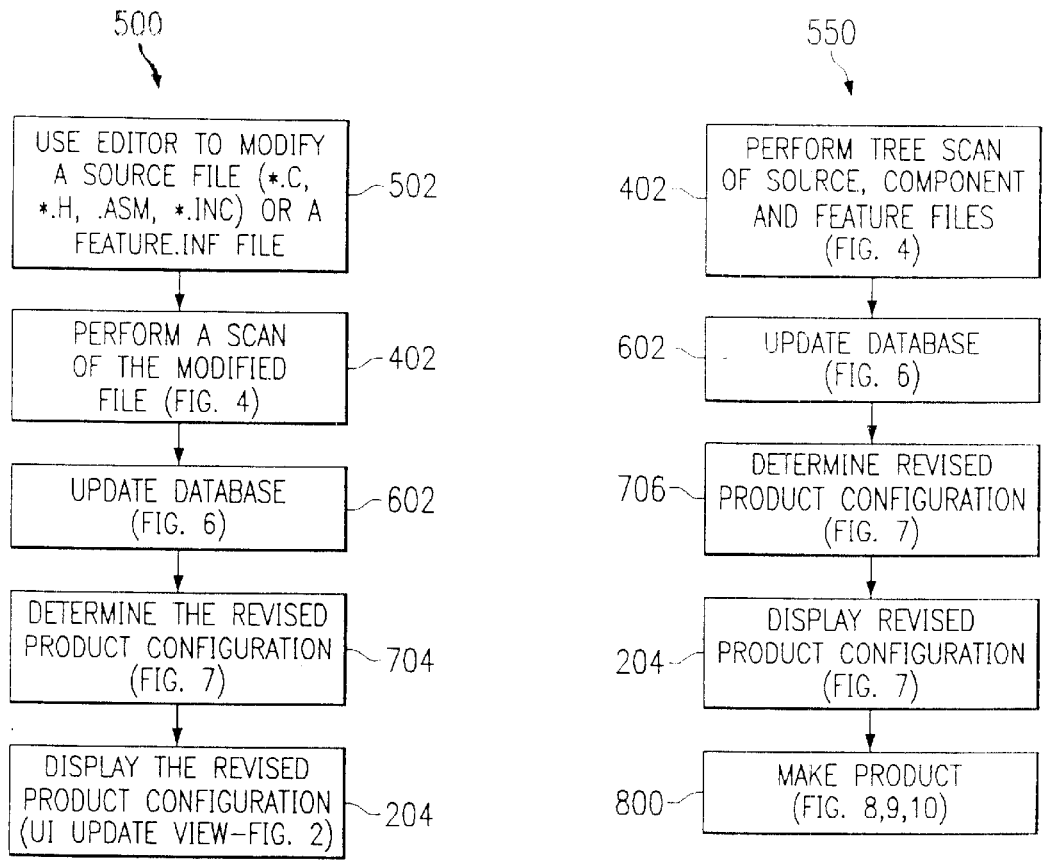
FIG. 5A
FIG. 5B
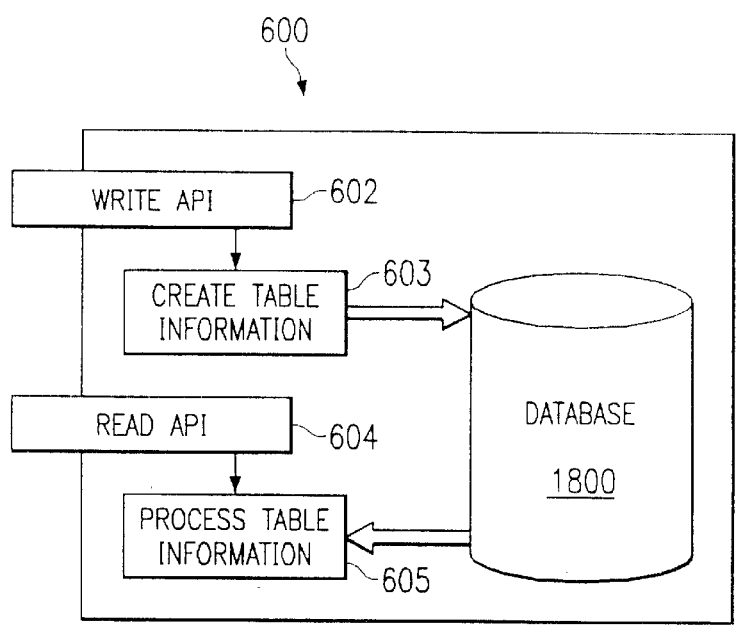
FIG. 6

1300

1302 — SUBTTL   BEEP.ASM — BEEPING SUPPORT CODE

1304 — .XLIST
   INCLUDE SYSTEM.INC — 1306
1308 — INCLUDE FEATURE.INC
1310 — .LIST

1312 — PUBEXT   TIMER.DELAY, 1.0

1314 — CODE_SEGMENT_OPEN POST + RUNTIME

1316 — PUBLIC_PROC BEEP.ERRORBEEP, 1.0
   1317 — • • •      ; CODE
   1318 — EXTCALL TIMER.DELAY      ; GATE TIMER AND WAIT
     • • •      ; CODE — 1319
  1320 — END_PROC

1323 — PUBLIC_PROC BEEP.BEEP, 1.0 — 1322
   1323 — • • •      ; CODE
   1324 — EXTCALL TIMER.DELAY      ; DURING POWER ON
1326 — DIAGNOSTICS
    1328 — • • •      ; CODE

1330 — END_PROC

1332 — SEGMENT_CLOSE    *FIG. 13*

1334 — END

1600

1602 — NAME("BEEP")
  DESCRIPTION("BIOS BEEP SUPPORT ROUTINES.") — 1604
1606 — CLASS(BEEP)
1608 — COREVERSION(7.00)
  OWNER("PHOENIX") — 1610
1612 — BRINGUP()
1614 — SHIELDPRIVATES()
         *FIG. 16*
  PLATFORMTYPE(IA32) — 1616
1618 — {
   ALLOTHERS(RECOMMENDED) — 1620
  } — 1622

```
                    1400
                       ↘
    1402 ── NAME("CORE RUNTIME SERVICES")
              DESCRIPTION("BIOS CORE ROUTINES") ─1404
    1406 ── CLASS(CORE)
              COREVERSION(7.00) ─1408
    1410 ── OWNER("PHOENIX")
    1412 ── BRINGUP()
              SHIELDPRIVATES() ─1414

CLASSIFICATION ─1416
    1418 ── {
                  COMPONENTTYPE(SOFTWARE) ─1420
    1422 ── }

PLATFORMTYPE(IA32) ─1424
    1426 ── {
                  ALLOTHERS(RECOMMENDED) ─1428
    1430 ── }
```

1502 ── NAME("COMPONENTNAME")
    1504 ── CLASS(CLASSNAME)
              PLATFORMTYPE(ARCHITECTURE) ─1506
    1508 ── {
                  PLATFORMTYPE( RULE ) ─1510
    1512 ── . . .
                  ALLOTHERS( RULE ) ─1514
    1516 ── //  RULE := RECOMMENDED | TEST | ONDEMAND
                  //      | EXPLICIT | EXTERNALTRIGGER (CLASSPATH) ─1518
    1520 ── }
    1522 ── OPTION(OPTIONNAME,OPTIONVALUE,OPTIONSIZE,"DESCRIPTION
                   ") ─1524
    1526 ── {
                  VALUENAME,VALUE,"DESCRIPTION" ─1528
                  . . . ─1530
    1532 ── }
```

FIG. 15

```
                                1700
                                  ↘
1702 ─  NAME("FEATURENAME")              FIG. 17
1704 ─  CLASS(CLASSNAME) | SUBCLASS (SUBCLASSNAME | ..)
        PLATFORMTYPE(ARCHITECTURE) ─ 1706
1708 ─ {
   1712 ─   PLATFORMTYPE( RULE ) ─ 1710
              . . .
            ALLOTHERS( RULE ) ─ 1714
1716 ─    // RULE := RECOMMENDED | TEST | ONDEMAND
1720 ─ }  //        | EXPLICIT | EXTERNALTRIGGER (CLASSPATH) ─ 1718
1721 ─ OPTION(OPTIONNAME,OPTIONVALUE,OPTIONSIZE,"DESCRIPTION
             ") ─ 1722
1723 ─ {
            VALUENAME,VALUE,"DESCRIPTION" ─ 1724
              . . . ─ 1726
1728 ─ }
```

```
                          2100
                            ↓
        2102 ─ PLATFORMTYPE ("DESKTOP", IA32)
        2104 ─ COMPONENT ("PNP", NOFORCE)
        2106 ─ {
                 FILE ("MYFILE.ASM", "\DEVREF\INTEL\440BX") ── 2108
        2110 ─ }
```

2202 ─ PLATFORMTYPE("PLATFORMTYPE" ,ARCHITECTURE) ── 2201
               SYSTEMOPTION("OPTIONNAME" ,"OPTIONVALUE")
        2206 ─ COMPONENT("COMPONENTNAME" [,FORCEFLAG]) ── 2204
               { FEATURE/OPTION/SYSTEMOPTION ...}
        2210 ─ // FORCEFLAG := FORCEIN | FORCEOUT | NOFORCE (DEFAULT) ── 2208
               FEATURE("FEATURNENAME" [,FORCEFLAG])
                 { FEATURE/OPTION/SYSTEMOPTION/FILE/OVERRIDEFILE ── 2212
                   ...
        2214 ─ }
        2215 ─ FILE("FILENAME" ,"PATH")
               OVERRIDEFILE("FILENAME" ,"NEWPATH" ,"ORIGINALVERSION") ── 2216
        2218 ─ OPTION("OPTIONNAME" ,"OPTIONVALUE" ,EDITFLAG,
                 [,"DESCRIPTION"]) ── 2220
```

FIG. 22

```
                          2300
                            ↓
               2302 ─ D_TIMER_DELAY = TRUE
```

FIG. 23

```
                        2400
2402 — ASMS =
2404 — EXTASMS = $ (MANTICORE) \BUILD\COMPHEAD\EXE.ASM \
    2406 — COMPAT\COMPAT.ASM LISTMGR\GETNEXT.ASM \
           BEEP\BEEP.ASM  DISPMGR\DISPINTF.ASM \— 2408
    2410 — DISPMGR\DISPINIT.ASM \
           DISPMGR\MODULE.ASM DISPMGR\SERVICE.ASM \— 2412
    2414 — DISPMGR\DISPUTIL.ASM \
           DISPMGR\DISPUTIL.ASM \— 2416
    2418 — VECTOR\FILLINT.ASM \
           UTILS\CHECKSUM\CHKSUM.ASM — 2420
2422 — DIRLIST = BEEP COMPAT LISTMGR DISPMGR VECTOR NVRAMMGR
       COMPONENT_NAME = COMPNENT — 2424
2426 — FILE_LISTING = FALSE
2428 — ML_FLAGS = /FE$ (COMPONENT_NAME) .EXE /NOLOGO

2430 — !IF "$ (FILE_LISTING) " == "TRUE"
       ML_FLAGS = $ (ML_FLAGS) /FL — 2432
2434 — !ENDIF

2436 — .ASM.OBJ:
       @ML $ (ML_FLAGS) /C /I$ (MANTICORE) \INCLUDE $(**) — 2438
2440 — $ (COMPONENT_NAME) .EXE:$ (EXTASMS:ASM=OBJ) $ (ASMS:ASM=OBJ)
       LINK /NOLOGO @<< — 2442
       $ (**F: = +^ — 2444
2446 — )
2448 — $ (COMPONENT_NAME)
       $ (COMPONENT_NAME) — 2450
2452 — ;
       << — 2454

2456 — CLEAN:
    2458 — @DEL $ (COMPONENT_NAME) .MAP
           @DEL *.LST — 2460
    2462 — @DEL *.OBJ
           @DEL $ (COMPONENT_NAME) .EXE — 2464
    2466 — @DEL $ (COMPONENT_NAME) .OUT
```

2502 — BIOS.ROM:
        CD $ (MANTICORE) \CPU\INTEL\PENTIUM — 2504
  2506 — NMAKER
        CD $ (MANTICORE) \POST — 2508
  2510 — NMAKER
        CD $ (MANTICORE) \ISA — 2512
  2514 — NMAKER
        CD $ (MANTICORE) \MEMC\INTEL\440BX — 2516
  2518 — NMAKER
        CD $ (MANTICORE) \CORE — 2520
  2522 — NMAKER
        CD $ (MANTICORE) \PNP — 2524
  2526 — NMAKER
        CD $ (MANTICORE) \DEVREF\INTEL\440BX — 2528
  2530 — BINLINK >BINLINK.OUT

2532 — CLEAN:
        CD $ (MANTICORE) \CPU\INTEL\PENTIUM — 2534
  2536 — NMAKER CLEAN
        CD $ (MATICORE) \POST — 2538
  2540 — NMAKER CLEAN
        CD $ (MANTICORE) \ISA — 2542
  2544 — NMAKER CLEAN
        CD $ (MANTICORE) \MEMC\INTEL\440BX — 2546
  2548 — NMAKER CLEAN
        CD $ (MANTICORE) \CORE — 2550
  2552 — NMAKER CLEAN
        CD $ (MANTICORE) \PNP — 2554
  2556 — NMAKER CLEAN
        CD $ (MANTICORE) \DEVREF\INTEL\440BX — 2558
  2560 — DEL *.SCR
        DEL *. — 2562
  2564 — DEL *.EXE
        DEL *.MAP — 2566
  2568 — DEL *.ROM
        DEL *.OUT — 2570

*FIG. 25*

FIG. 33C
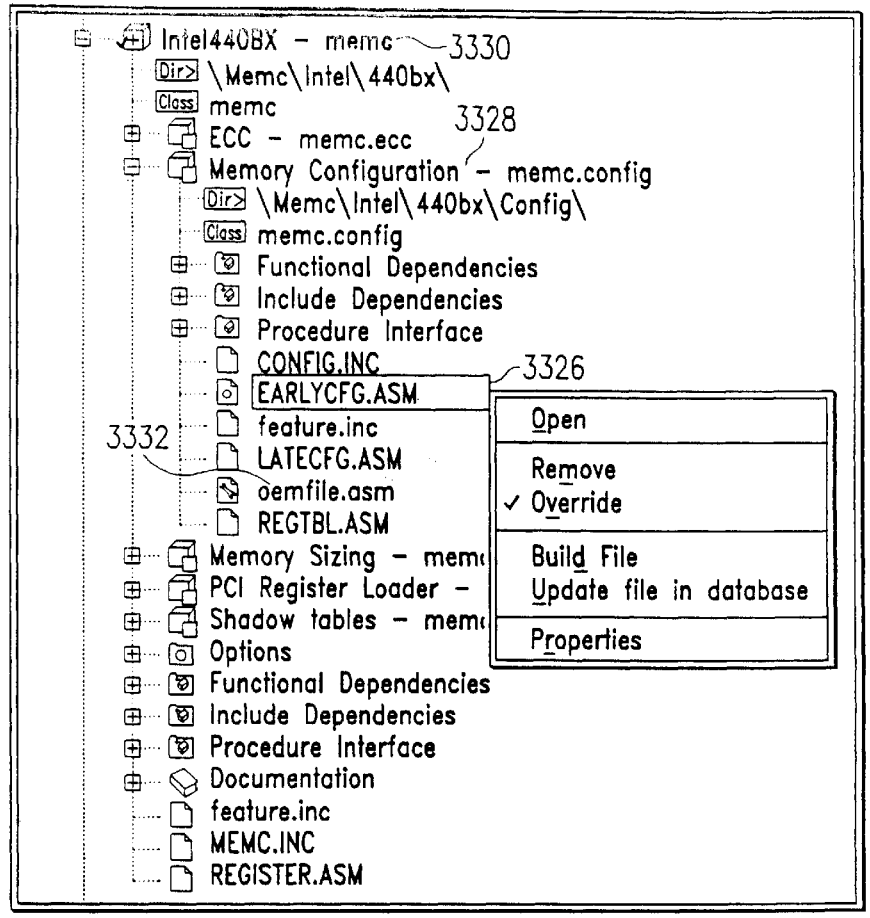
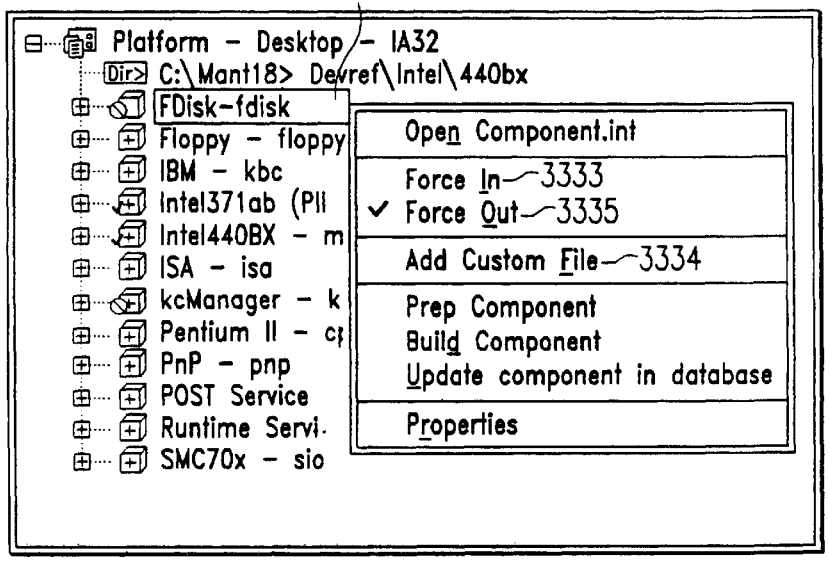
FIG. 33D

| DESCRIPTION OF ICON IN LOGICAL VIEW TREE | IN BIOS | NOT IN BIOS | FORCED IN | FORCED OUT | HAS ERRORS | HAS WARNINGS |
|---|---|---|---|---|---|---|
| PLATFORM | | | | | | |
| COMPONENT | | | | | | |
| FEATURE | | | | | | |
| CLASS | Class | Class | Class | Class | Class | Class |
| PATH | Dir> | Dir> | Dir> | Dir> | Dir> | Dir> |
| FILE | | | | | | |
| OVERRIDE FILE | | | | | | |
| CUSTOM FILE | | | | | | |
| FOLDER OF OPTIONS | | | | | | |
| OPTION | ○ | ○ | ○ | ○ | | |
| FOLDER OF INTERFACES | | | | | | |
| PUBLIC INTERFACE | ◇ | ◇ | ◇ | ◇ | | |
| PRIVATE INTERFACE | | | | | | |
| FOLDER OF DEPENDENCIES | | | | | | |
| PUBLIC DEPENDENCY | | | | | | |
| PRIVATE DEPENDENCY | | | | | | |
| FOLDER OF DOCUMENTS | | | | | | |
| DOCUMENTATION FILE | | | | | | |

FIG. 33F

SOFTWARE DEVELOPMENT SYSTEM THAT PRESENTS A LOGICAL VIEW OF PROJECT COMPONENTS, FACILITATES THEIR SELECTION, AND SIGNALS MISSING LINKS PRIOR TO COMPILATION

CROSS REFERENCE TO RELATED APPLICATION

Not applicable.

STATEMENT REGARDING FEDERALLY SPONSORED RESEARCH OR DEVELOPMENT

Not applicable.

BACKGROUND OF THE INVENTION

1. Field of the Invention/Overview

The present invention relates generally to methods and systems for developing and integrating a software product by customizing and combining core components and integrating them to form the software product. More particularly and illustratively, the present invention relates to a software system for maintaining and re-using the core components of a Basic Input/Output System (BIOS) for a personal computer (PC) that simplifies BIOS deployment and that provides the architecture for an extensible yet maintainable core which enables rapid product development, enhancement, and modification.

2. Background and State of the Art

A BIOS product is a piece of software code that executes when a PC is started up or "booted" and that is later called upon to provide various services while the PC is running. A development system for BIOS products must support all the peripherals that may be installed on any type of PC from a low-end basic PC up to a state-of-the-art, highly customized, high-end server or portable product. The various aspects of building a BIOS are described below to illustrate the capabilities that a software system for maintaining and using a library of core BIOS software components should provide.

A customer wishing to build a BIOS for a particular machine selects core BIOS software components to support the peripherals installed on that machine from a library of such components. Each software component may include one or more features and may be configured by adding or removing code for features from the set of available features and by specifying the values of optional parameters ("options") for this code. The customer may wish to add special BIOS code for peripherals custom manufactured by the customer and not available from the BIOS vendor.

Configurable features are implemented as separate code in the core BIOS component library that have external references and definitions in the code addressing other code components by name and by directory/subdirectory or by library name so the code for each feature can be linked into the final product only when it is properly configured and addressed. The present state of the art is to replace the code for a called, named, and addressed optional feature that is not selected with a stub routine that merely returns to its caller. Another possibility is to reference the optional feature indirectly through a pointer that can be set to null if the feature is removed; however, this requires each caller to verify that the pointer is valid. Ideally, the code to call an optional feature should be removed from the code when the component is built to realize a savings in both execution time and memory size occupied by the program.

The present state of the art defines the optional parameters of a software component (hereinafter called "options") as manifest constants, e.g., "BUFFER_SIZE EQU 256." The name of a manifest constant (BUFFER_SIZE) and the value it represents (256) are associated when the manifest constant is defined. Each reference to the name of a manifest constant, such as the length of an array or the value of a variable, for example, is replaced with the associated constant value when the source code is compiled. This allows each option to be given a descriptive name and makes it possible to change the option value in all the places it is referenced by changing the one definition. Options such as these are typically set or adjusted by defining or modifying an "include" file by hand. The "include" file is then incorporated by reference into the other source code files. It is easy to miss a file containing a reference to an option name, or to confuse options having the same names in different system components.

The producers and marketers of the core BIOS component library need to respond rapidly to new devices that become available in the marketplace. One tried and true method is to make a copy of the code for a similar existing device and to modify it only where necessary to support the new device. The original code may have supported several configurable features that are now also available for the new device. Copying the code from another core component gives rise to two components in the same library with not only the same features, but also identical external names to reference them. This ambiguity can cause further confusion at compile and link time.

The customer may sell machines that incorporate either an old device or a new device. The customer may therefore create a BIOS that incorporates both an old software component supporting the old device and a new component, generated by modifying the old component and having identical external names, supporting the new device. The BIOS would contain additional code to intercept the calls to each procedure in the old and new components. The customer then would add decision code for each intercepted procedure that decides whether the procedure in the new component or the old component should be called. This gives rise to a BIOS containing two components having identical external names and decision code for each intercepted call that must call one of the two procedures with identical names without being intercepted. Both software components would have to be compiled and linked separately so that the identical external names in each component would not conflict. They would also have to be linked together with the decision code that calls them.

Suppose that both the old component and the new component, generated by modifying the old component and having identical external names, had an initialization feature named INIT. The additional decision code mentioned above must be called in place of the INIT procedure so it can determine whether the INIT procedure in the old or new component should be called. Present art would require that each call to INIT go indirectly through a pointer table so that the pointer could be changed to intercept, or hook, each such call. All calls to INIT throughout the BIOS would be intercepted, or hooked, in this manner. The ability to intercept such calls is also important for debugging purposes.

The producers of the core BIOS component library respond to new devices that become available in the marketplace by rapidly releasing new versions of the library. In the process of maintaining and enhancing the library, they may modify some interfaces to add functionality or to fix bugs. The customer with an existing BIOS will wish to incorporate the new functionality and bug fixes as well as the newly supported devices. The customer must verify that calls to existing interfaces which have changed are still compatible and quickly identify those interfaces that are now incompatible and that must be changed. Present art validates interfaces by matching the number of parameters, the type of each parameter, and the range of values.

The BIOS code for a particular device typically consists of initialization code that executes when the PC is started up and support code that provides services when called upon. There may be no references in the support code to the initialization code, or vice versa, that would cause both pieces of code to be included in the BIOS build; yet the support code clearly depends upon the initialization code. Present art requires manual intervention to insure that both pieces of code are included in the build.

The conventional way of finally testing source code modules for consistency is to compile and/or assemble the separate source code files, identifying and correcting all errors and repeating this process; link the object code files, identifying and correcting all errors and repeating both of these processes; and finally, combine the separately linked system elements into an inter-linked image, identifying and correcting all errors and repeating all three of these processes repeatedly and recursively until no more errors are found. Even then, improper linkages may result from identical names being used to mean different things in different sets of source files, from selection of the wrong set of two very similar sets of source files, or from version incompatibilities that compilers and assemblers cannot detect. All of these problems, in combination, make software system development and integration more time consuming than ideally it should be.

Accordingly, primary objects of the present invention are the achievement of a software development system that can identify, and assist one to correct, the above types of errors prior to any assembly, compilation, or linking; that permits one to view and select components, features, and variations simply and without regard to where the corresponding source code is stored; that permits one to specify globally that the product is to be a "server" or a "portable" and to achieve thereby entirely different system configurations; and that addresses the problems mentioned above of selecting the proper one of several component variations, of adjusting and controlling the values and scope of options, and of automating the selection of needed system components in accordance with source code dependencies.

BRIEF SUMMARY OF THE INVENTION

Briefly described, and in accordance with these and other objects and advantages, the present invention is embodied in a software development system that manages a source code library that is stored as source code files placed into a directory hierarchy. Different subdirectories may correspond to different software "Components." Each "component" in the directory hierarchy, whether it be a true software component or a "hardware component," meaning software supporting the needs of a particular hardware device, may be defined further by one or more "features" stored in lower level subdirectories so that one or more features may comprise each component and there may also be "sub-features" stored in yet lower level subdirectories. One or more source code files may reside in each feature subdirectory. Each component and each feature is further described by an information file that is placed into its corresponding subdirectory defining what type of platform (server, notebook, etc.) a feature is intended for, what class it is assigned to, etc.

In the preferred embodiment of the invention, the source code files call upon special macro routines to define each external procedure and to classify it. as public (callable between components) or private (callable by parents or siblings within one component only). Each call to such an external procedure is also made with a special macro routine, and each source file that contains such a call declares the procedure is being referenced publicly or privately with a call to another special macro routine. These special macro routines may pass, among other things, program revision numberd and program class designations. Special macros are also used to define public and private "include" files and to declare references to them. In addition, special macros may be used to create a list, to define the entries that are to form such a list and that are drawn from separate source code components, and to specify sort criteria for the list entries.

The component information files and feature information files are scanned, and their contents are stored within a special database. These files may relate a component or feature to a particular class and may specify which types of platforms (desktop, portable, server, etc.) for which a component is appropriate or essential. The source code files assigned to each feature are also scanned, and the parameters associated with the special macros such as classes and version numbers are also entered into the database along with each feature's directory address. This database then holds a complete description of the source code library, including the available components, the features each component provides, the way in which features are classed together so that they later may be linked together, and the rules for selecting components and features for inclusion into a particular platform type (portable, server, etc.). The information for each feature includes the source files that must be compiled to provide each feature, the external interfaces to each feature, the dependencies of each feature upon externally-defined subroutines and options, and the class assignments that prevent identical names within different classes from being confused, and cross-linked.

Once a system designer using the present invention has specified a type of platform, the minimum information necessary to specify a configuration for such a platform is extracted from the database, including all components and all features that the specified type of platform requires. This platform specification identifies a preliminary set of source code files that must be compiled and linked to provide the desired system configuration. There is more than enough information from the parameters of the macros of the present invention to associate each procedure call and option with its proper definition.

The present invention acts in the manner of a linker in that it associates each procedure call with its definition and identifies all missing procedures; however, this test "linking" process takes place long before compilation or assembly and linking and makes use of all the information available from the parameters of all the special macros found within the library. This allows the present invention to associate a procedure call with its definition using criteria other than and in addition to just the matching of procedure names and argument counts, and to identify and signal any procedure calls that are using an incompatible interface, such as incompatible versions of programs, as well as differentiating between procedure calls by class designation.

The present invention quickly identifies problems and errors within the current configuration before compilation or assembly and provides a visual interface through which the designer can quickly locate and fix problems by selecting and editing source code files. The same visual interface also allows the designer to add or remove components and features with the click of a mouse button and to add or override source file selections to adjust the configuration as needed.

Once the designer has selected a valid configuration, he or she may direct the present invention to build the configured product. The present invention then compiles or assembles only those source files specified by the configuration data, and links each feature separately to resolve the private external references within the component, converting class designations into specific addresses to resolve ambiguities in public external references, and thereby produces a linked executable file for each component. Finally, a special product component linker is called upon as a second stage linker that can link the separate component executable files together into the final integrated product. Each public procedure call is fixed up with the address of the public procedure that it references. Lists defined by the list macros of the present invention are gathered, sorted and are stored in the code segment where they were defined.

The product component linker is controlled and directed by data associated with the macros and, in the preferred embodiment, passed to the component linker in special code segments which are read and then discarded by the component linker. The resolution of the various options and the linkages between procedure calls and procedure entry points are also controlled in the preferred embodiment by automatically generated, special "include" files which pass information into each source code file to enable each macro to redefine, redirect, or even omit entirely any given procedure call statement, to control the scope of each option, and to permit the designer, through the visual interface, to adjust option values. Program calls made in a RAM-less environment may also be achieved through macros that automatically use a register for return address storage and that automatically provide, in ROM code, dummy stacks and register controlled return jumps to intercept procedure "return" instructions.

Other objects, features, and advantages of the present invention are apparent in the drawings and in the detailed description of the preferred embodiment that follows. The features of novelty that characterize the invention are pointed out with particularity in the claims annexed to and forming a part of this specification.

BRIEF DESCRIPTION OF THE DRAWINGS

FIG. 5A is a flow diagram illustrating the process of modifying a file, updating the database, determining a revised product configuration, and displaying the newly-revised configuration to the user or system designer;

FIG. 5B is a flow diagram illustrating the process of creating a final product, including scanning all files, updating the database, revising the configuration (if necessary), displaying any configuration revisions to the system designer, and building the finished product;

FIG. 6 is a block diagram of the database access routines;

FIG. 13 illustrates the contents of a typical IBM PC compatible assembly language source code file 1300 occupying the component source code library 1200 shown in FIG. 11;

FIG. 14 illustrates the contents of a typical component information file "compnent.inf" 1400 occupying the component source code library 1200 shown in FIG. 11;

FIG. 15 illustrates an example of what may be placed in component information files;

FIG. 16 illustrates the contents of a typical feature information file "feature.inf" 1600 occupying the component source code library 1200 shown in FIG. 11;

FIG. 17 illustrates an example of what may be placed into feature information files;

FIG. 21 illustrates an exemplary set of product configuration commands contained in the product configuration data file "platform.cfg" 2100 shown in FIG. 11;

FIG. 22 illustrates an outline of what may be placed into this "platform.cfg" file;

FIG. 23 illustrates the contents of an exemplary feature include file "feature.inc" 2300 (FIG. 11), these contents being generated automatically by the product make routine 900 (FIG. 11) and more particularly generated by the build feature include file routine 950 (FIGS. 9A and 35);

FIG. 24 illustrates the contents of an exemplary component make file 2400 (FIG. 11) generated automatically by the product make routine 800 (FIGS. 8 and 34) and more particularly generated by the component build prepare routine 900 (FIGS. 9B and 34);

FIG. 25 illustrates the contents of an exemplary product make file 2500 (FIG. 11) generated automatically by the product make routine 800 (FIGS. 8 and 34);

FIG. 33C illustrates how the system designer opens, removes, or overrides a source code file, or learns of its properties from the graphical user interface;

FIG. 33D illustrates how the system designer opens and selects or de-selects a component with the graphical user interface;

FIG. 33F illustrates the icons and what they mean in the graphical user interface;

DETAILED DESCRIPTION OF THE INVENTION

Figure 1:
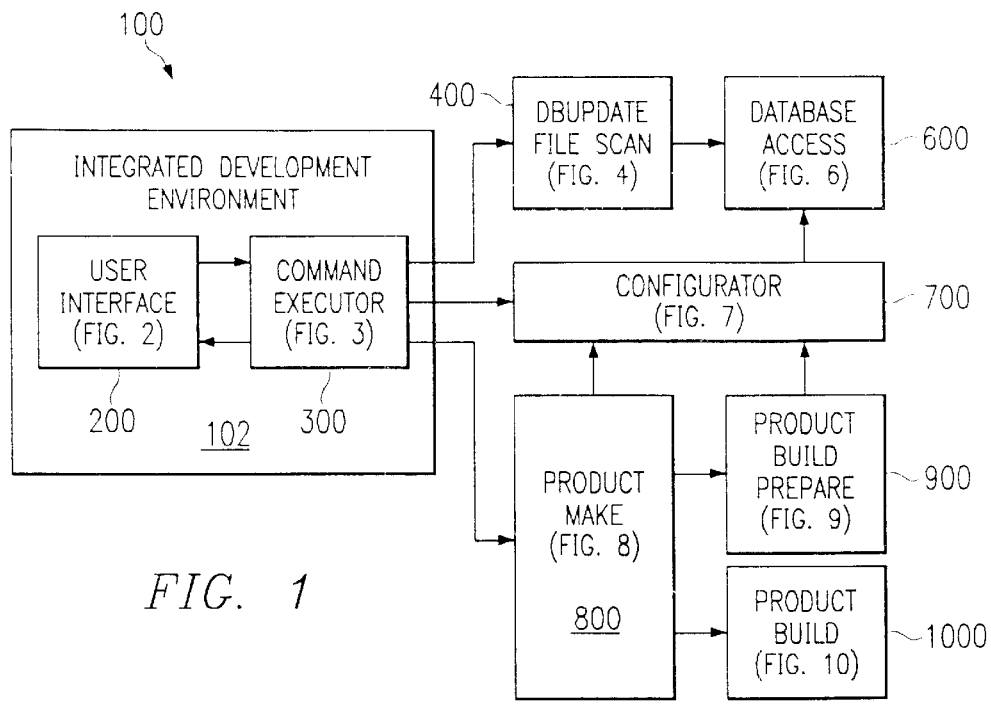
FIG. 1 presents an overview block diagram of a program development system 100 designed in accordance with the teachings of the present invention, emphasizing the relationships between the various software elements.

The preferred embodiment of the invention is optimized for use in an IBM compatible PC ROM code image software development environment in which a shared library of code is used by many vendors to develop ROM BIOS code images for portables, desktops, and servers having a variety of different processors, busses, and peripherals. The invention was developed using conventional, unmodified assemblers, compilers, and linkers, as well as a standard UNIX-style make utility. In addition, a special product component linker 3600 (FIG. 36) was developed for use with the invention. Th component linker 3600 is, in many respects, a conventional linker for combining separately compiled and linked *.exe files into a single, integrated code image suitable for ROM storage. The ways in which it differs from a conventional tool used for this purpose are pointed out below.

The inventors contemplate that the invention has applicability beyond the development of ROM BIOS images to embedded systems of all types, as well as to software development in general. In its more general features, the invention is applicable to any software development environment where software components and features need to be managed, selected, and altered to meet the special requirements of specific clients.

Because conventional compilers, assemblers, and linkers are used in the preferred embodiment of the invention without any special file preprocessors, and because it is desirable and convenient and efficient to have some steps of the present invention (in its preferred embodiment) performed from within such compilers and assemblers, some way of altering the performance of these standard components was needed. Accordingly, the preferred embodiment of the present invention contemplates inserting specially-defined macros into the source code at many points where conventional programming commands such as "CALL" or "PROC" or "INCLUDE" or the like would normally appear. These special macros are described in complete detail below, at the end of this specification, following the more general overview explanation of the invention. But it is also possible to utilize preprocessors or to utilize modified compilers and assemblers that can achieve the functionality of the present invention without the need nor the use of some or all such special macros. In effect, the results achieved in the preferred embodiment of the present invention through the use of special macros can be achieved without the authors of source code files having to use special macros by simply having a preprocessor or the compilers and assemblers respond to commands such as "CALL" and "PROC" and "INCLUDE" in substantially the same way in which the present invention has them respond to the macros substituted for these commands. The present invention encompasses such variations in design as fallingwithin its scope.

In addition, the preferred embodiment of the invention places the data that is to control the product component linker into special code segments defined and created by the special macros, a technique that is particularly apt in the IBM PC environment where segmentation is heavily used for other purposes as well. Once again, other equivalent ways can readily be provided for collecting this data (such as the definition and contents of lists) from the many source-code files, for example, at a much earlier stage in the process, and for passing this data to the component linker or its equivalent to thereby achieve the goals of the present invention.

An overview of the program development system 100, which is the preferred embodiment of the present invention, is presented in FIG. 1. FIG. 1 emphasizes the major software routines that form parts of the system and how they call upon and relate to each other.

Figure 2:
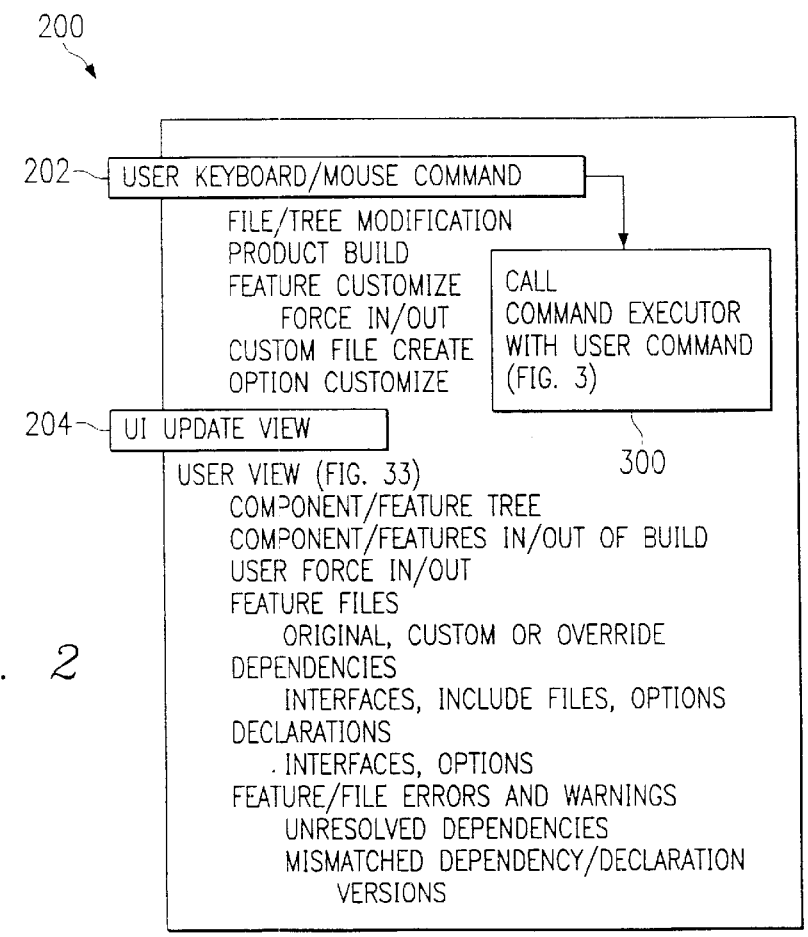
FIG. 2 presents an overview summary of the visual user interface system, listing user executable functions and also listing display functions.
Figure 33A:
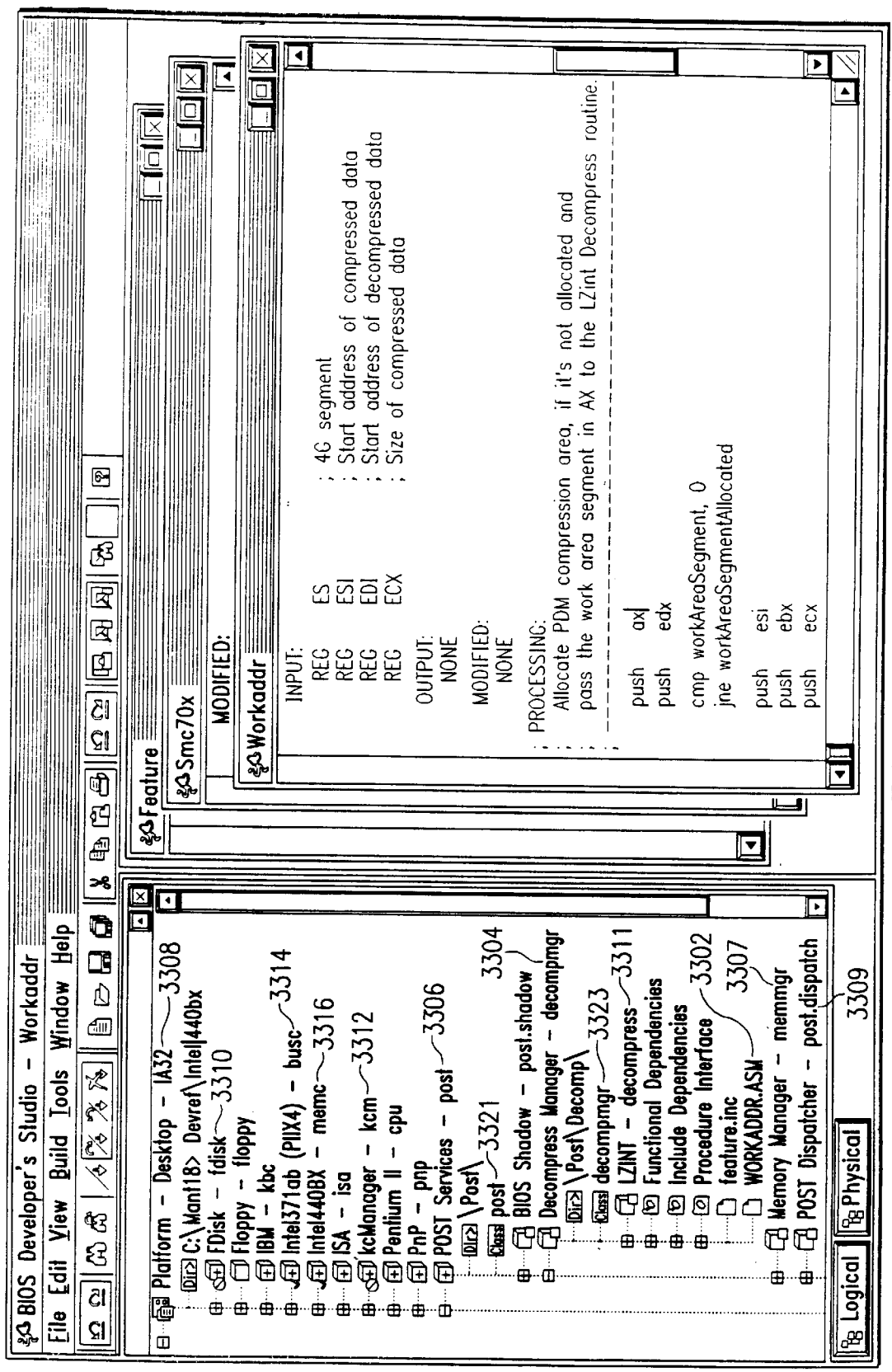
FIG. 33A presents a system designer view of the graphical user interface of the present invention; including a logical view of a project and windowed views of specific files.

At the heart of the system 100 is an integrated development environment 102, which includes a user interface 200, the functions of which are set forth in FIG. 2. The user interface itself appears in FIGS. 33A through 33F. With reference to FIG. 33A, the designer is presented with a first window (to the left) in which he or she may view a logical (as shown) or a directory-subdirectory view of a source code library. A "logical view" is a user view of the code library that is organized, and the components and features of the code library are displayed, hierarchically first by class, then by component, then by feature, then by subfeature, and so on, with each individual source code file associated with a corresponding component, feature, and sub-feature.

As shown in FIG. 33A, the logical view includes a root node 3308, which is shown as Platform—Desktop—IA32. In the first level below the root node 3308 are a series of components, such as FDisk 3310, Intel371ab (PIIX4) 3314, POST services 3306, etc. In the levels below each of the components, there may be one or more features. For example, in FIG. 33A, the Post services component 3306 includes several features, such as Decompress Manager 3304, Memory Manager3307, and POST Dispatcher 3309. In addition to being in the level directly below a component, a feature may also be viewed in a lower level as a subfeature, which is a child feature to a parent feature. In FIG. 33A, the LZINT feature 3311 is a subfeature to the Decompress Manager feature 3304.

Hereinafter, the term "object" will be used generically to mean a "component," "feature," or "subfeature". (This special usage of the term "object" in this patent is not to be confused with the entirely different meaning assigned to the term "object" in the field of object-oriented programming.) The "logical view," with the code subdivided by class (note the class designations "post" 3321 for the component 3306 and "decompmgr" 3323 for the feature Decompress Manager 3304 in FIG. 33A), goes beyond just the user view, however. In source code files, when references are made to the names of externals, such as include files, procedures, and options, class designations may replace these precise directory/subdirectory addresses, used in conventional software development systemws, and accordingly the programmer need not be concerned with precisely where an external procedure or and included file resides—only with the class to which the source code file containing the external procedure is assigned.

Figure 33B:
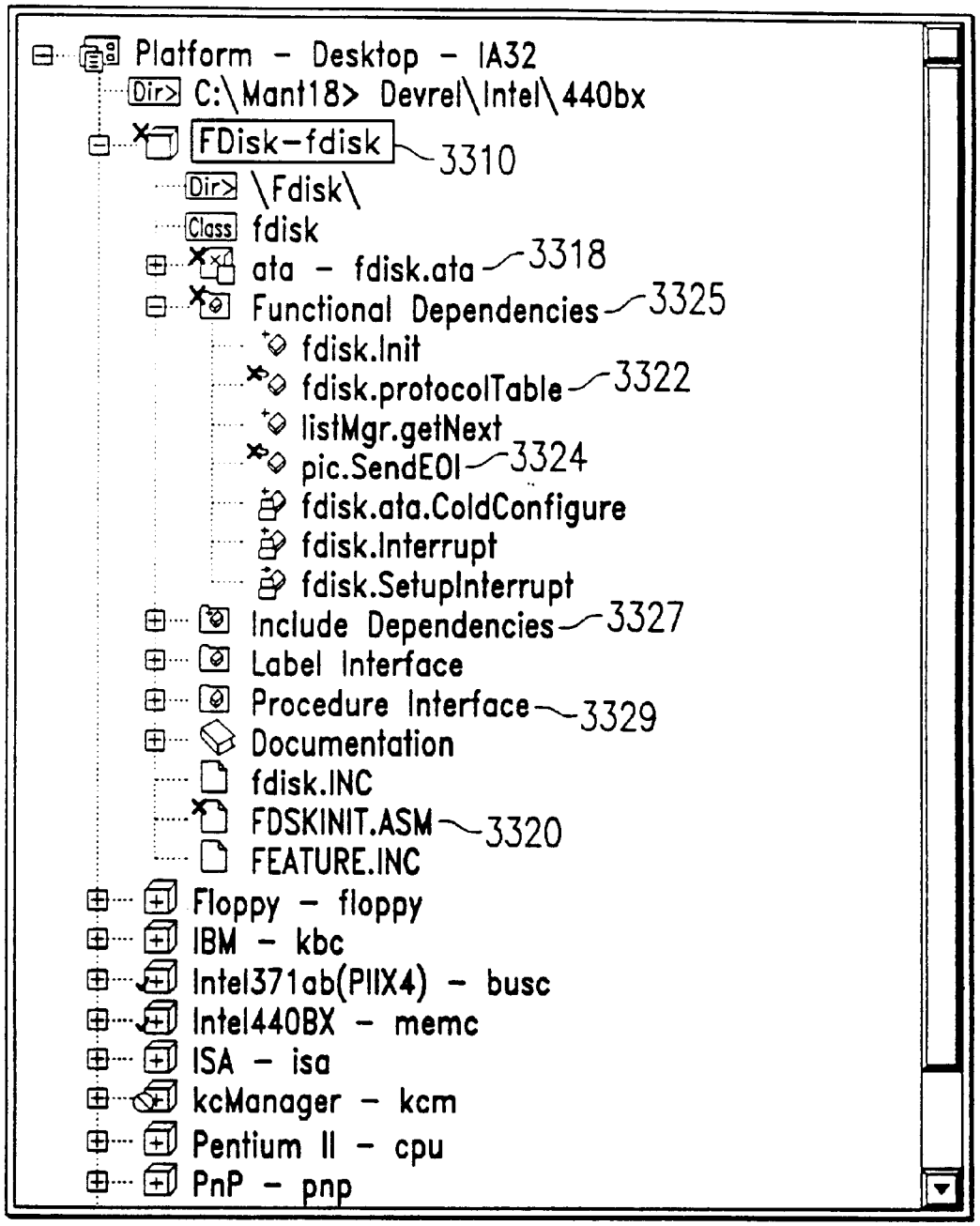
FIG. 33B illustrates how errors are revealed to the system designer in the user interface.

FIG. 2 lists the primary functions performed and views provided by the user interface 200. The designer can use the keyboard or mouse 202 to modify a file or directory 302 (FIG. 3), build the product from a valid configuration 306, customize features by forcing them into or out of the build 304, specify custom code (file override) in addition to or in place of code from the component source code library 304, and customize or change option values 304. The updated user view 204, as a result of these changes, then displays the component and feature tree (left side of FIG. 33A): with components and features clearly marked as in (bold) or out (faint) of the build (FIG. 33A); with components and features clearly marked where the designer has forced them into (marked with a check) or out of (marked with a "prohibit" slashed circle) the build, overriding the default configuration (FIG. 33D); with original source files shown plus custom 3332 and override files 3326 clearly marked (FIG. 33C); with dependencies 3325, 3327 listed individually and collapsable into an icon (FIG. 33B); with interface declarations 3329 (FIG. 33B), option declarations 3336 (FIG. 33E) viewable; and with feature/file errors and warnings clearly shown 3318, 3320, 3322, 3324, and 3325 (FIG. 33B).

Figure 3:
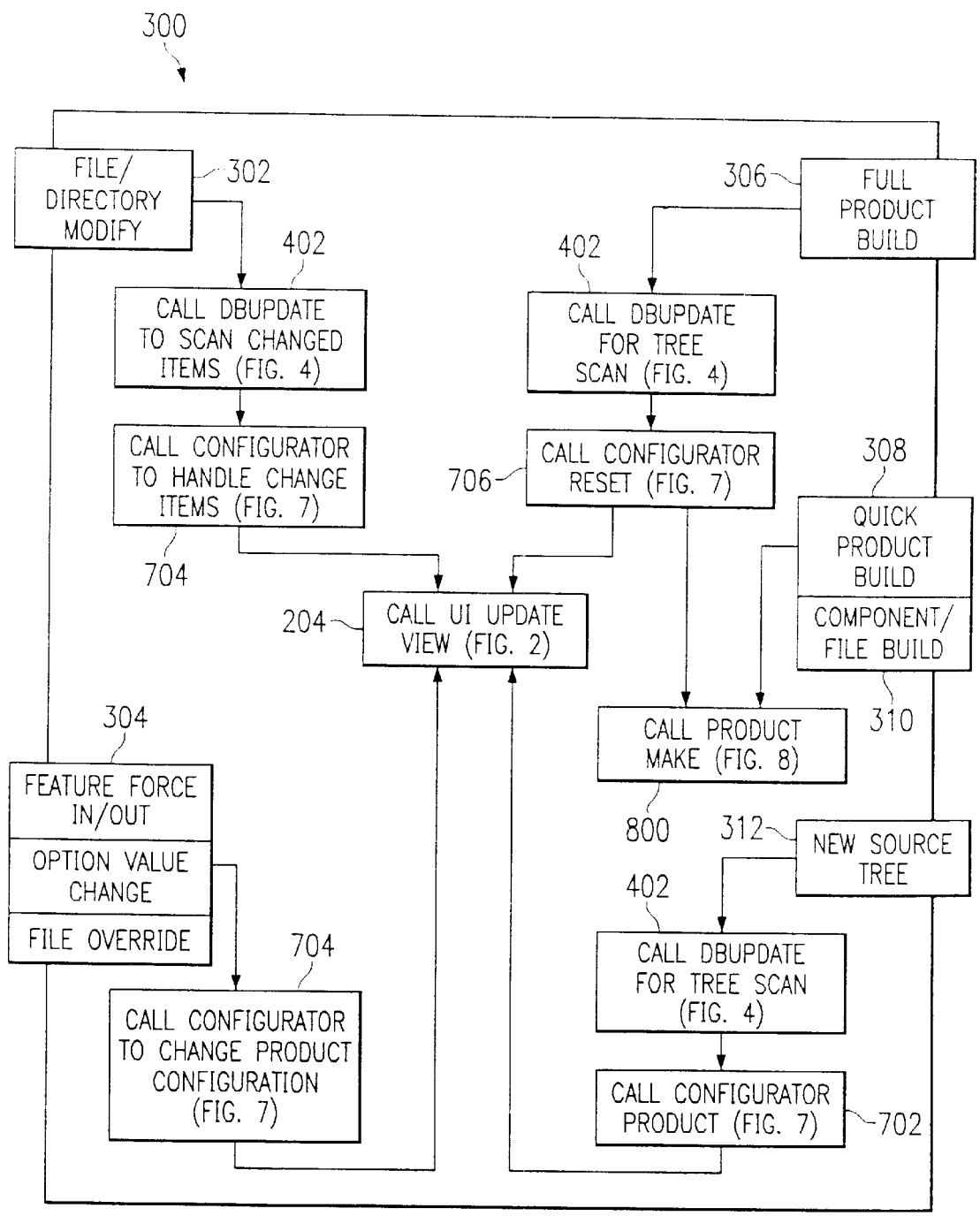
FIG. 3 is a block diagram showing the routine that executes user-initiated commands.

The user interface 200 permits the designer to issue commands through a command executor routine 300, an overview view of which appears in FIG. 3. In FIG. 3, and in all similar figures to follow, any rectangle that overlies the border of the large rectangle that encompasses the components of the routine 300 contains one or more entry points to the routine—one or more commands that may be issued by the designer or by a calling routine.

If the designer wishes to update or modify a source code file, or move a file into a new directory, or change the directory structure of the system, the designer does so using the user interface shown in FIG. 33A. For example, to revise a source code file, the designer clicks on the file's name 3326 (FIG. 33C) and selects "Open" using the mouse and pointer. The file appears in an editable window (right half of FIG. 33A) where the designer may review and optionally modify the source code file (step 502 in FIG. 5A). When the designer is finished, the designer closes the window and "saves" any modifications in the traditional way. The command executor 300 is then called upon automatically to perform the steps shown, starting at 302, in FIG. 3, and also shown in flow diagram form in FIG. 5A. First, at step 402 in FIGS. 3, 4, and 5A, the database update routine 400 (FIG. 4) is called upon to scan the file, assuming that it has been changed (steps 404, 406, and 408 in FIG. 4). The routine 400 collects information from source-code-resident special macros and from commands found in component and feature information files (step 2700 in FIGS. 4 and 27) defining each source code file's internal names, entry points, and exits, as indicated at 1826 to 1830 in FIG. 18 (source library database 1800). The inforation gathered includes the "class" assigned to each procedure call, to distinguish, for example, "TIMER" class procedures from "DMA" class procedures so that identical procedure names will not be confused ("TIMER.RESET" cannot be confused with "DMA.RESET", for example); version numbers, such as "3.2," for later use to check for incompatible versions; and like information. All this information is stored within the database 1800 (FIGS. 6 and 18) by the data access routine 600 write API routine 602 (FIG. 6).

Figure 30:
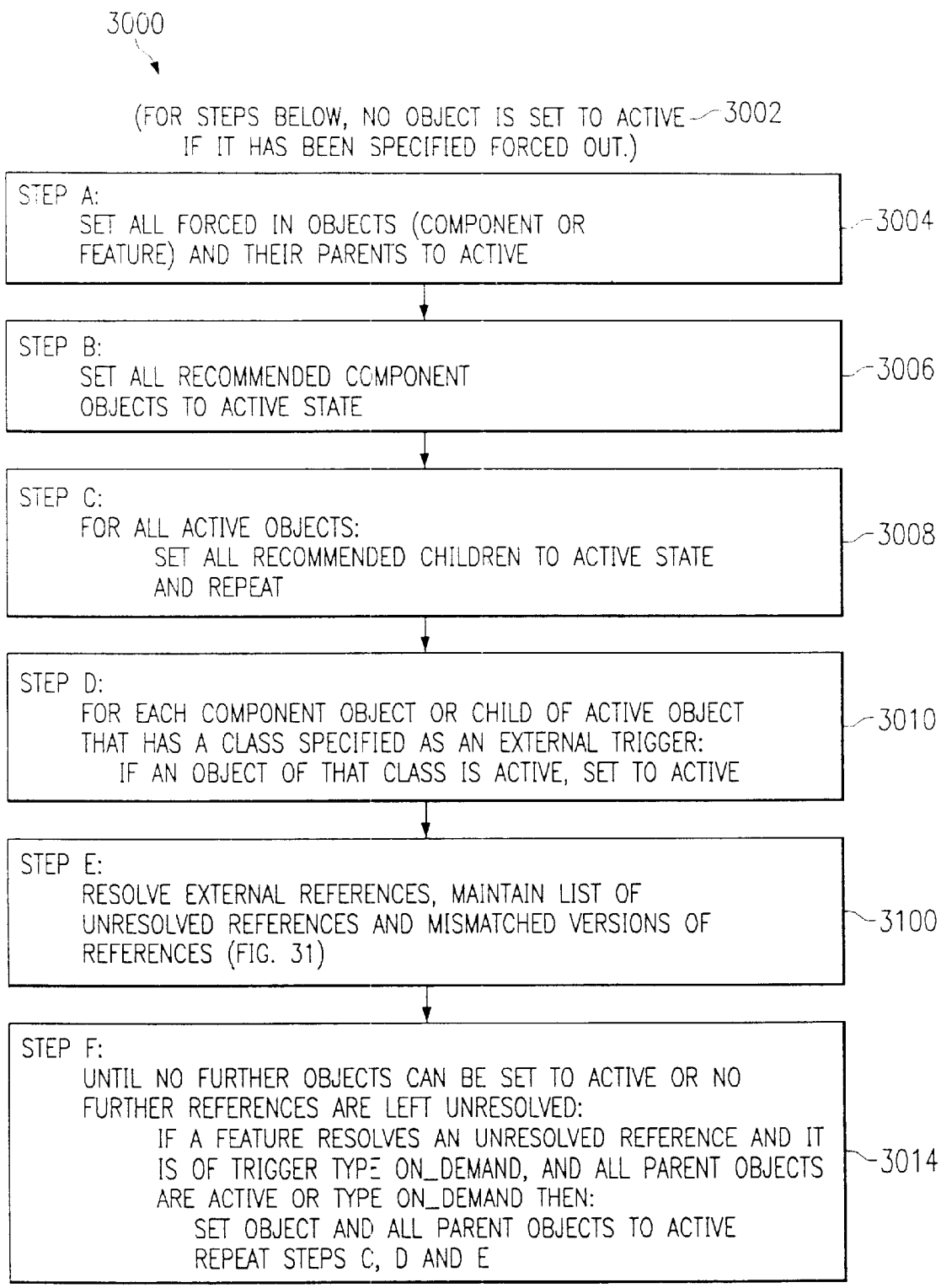
FIG. 30 is a block diagram of the product configure routine 3000 portion of the configurator procedure 2800 (FIG. 28)

Next, a configurator routine 700 (FIG. 7), which maintains configuration status data 1900 (FIGS. 19 and 32) in RAM, is called upon at entry 704 to use the database 1800 to update the product configuration state data 1900 and to then configure 3000 (FIG. 30) the product to be built by redetermining which objects (components and features) to include, which to exclude, which objects to make designer options with what default values, depending upon which platform type (server, desktop, etc.) has been selected, what dependencies (options, calls to functions, file inclusions, etc.) need to be satisfied, and so on. Finally, at step 204 (in FIGS. 3, 5A, and 7), the routine UI UPDATE VIEW (FIG. 2) is called upon to regenerate the logical view of the software system within the left-hand window of FIG. 33A to share with the designer the new state of the system, and to permit the designer to change default object selections (see the menu 3334 in FIG. 33D) or to adjust the values of options (see the menu 3338 in FIG. 33E). In this quick and unobtrusive manner, all changes made by the designer are quickly and accurately recorded, the product to be built is reconfigured accordingly, and the designer is presented immediately with the results of all this activity.

If the designer does something, for example, that might cause the final linker in a conventional system to fail because of a dependency that could not be satisfied, such as by the absence within the library of any external procedure to which a "call" statement can be linked (this could, for example, be caused simply by the misspelling of a procedure's name), then, as is shown in FIG. 33B, little "X"s will appear beside the items that are causing the trouble. The designer may then, by simply clicking down through the displayed tree, quickly find, for example, the particular "dependency" that caused the problem (for example, the subroutine name "SendEOI" in the class "pic" shown as "pic.SendEOI" at 3324 in FIG. 33B). A "find" utility enables the file containing this reference to be quickly found, opened, corrected, and closed, with the system again being updated and corrected automatically to reflect the correction (the "X"s would then dissapear).

With reference now to FIGS. 3 and 5B, when it comes time to build the final product, the entry 306 "full product build" in the command executor routine 300 is called upon by the user interface 200 in response to a user keyboard/mouse command 202. Once again, the database update routine 400 (in FIG. 4), entry 402, is called upon to perform a scan, this time of the entire library: source code files; component information files; and feature information files. With brief reference to FIGS. 15 and 17, the "component.inf" and "feature.inf" component and feature information files contain build commands that define the value of options (line 1528, for example), and also contain formal rules to determine logically when a particular object (component or feature) is to be selected (lines 1514, 1516, and 1518 in FIG. 15, for example). These files also provide class designations (line 1504, for example) for the corresponding components and/or features. Such a class designation is automatically applied to procedures and labels within any source code files that are stored in the same subdirectory with a "component.inf" or "feature.inf" file containing such a class designation. this enables, for example, external calls to the procedures specifying a class as if it were a "path" ("class path" designation, such as "TIMER.RESET" where "TIMER" is the class and "RESET" is the procedure name) may be found and linked up properly without the individual calling source code files having to specify the actual path through the source code library tree to the called procedure source code file. This class designation also determines how the objects are organized in the user's "logical," as opposed to "directory/subdirectory," view of the library contents (FIG. 33A). Since dependencies are slways designated as to their class, in addition to the class determining which subroutine or procedure calls link to which subroutines or procedures in which source code files, the class designations also determine other similar linkages whenever any type of external reference by a dependency is satisfied. Identical function and procedure names, and other names (include file names, for example) may accordingly be used in features and objects assigned to different classes without causing any confusion or mis-linking. And class designations enable include files and procedures to be found without regard to where they are actually stored within the component source code library file directory tree. For example, prior to assembly or compilation, include file paths (or addresses) are automatically generated and inserted without user intervention or knowledge of where the include files are actually stored.

Figure 4:
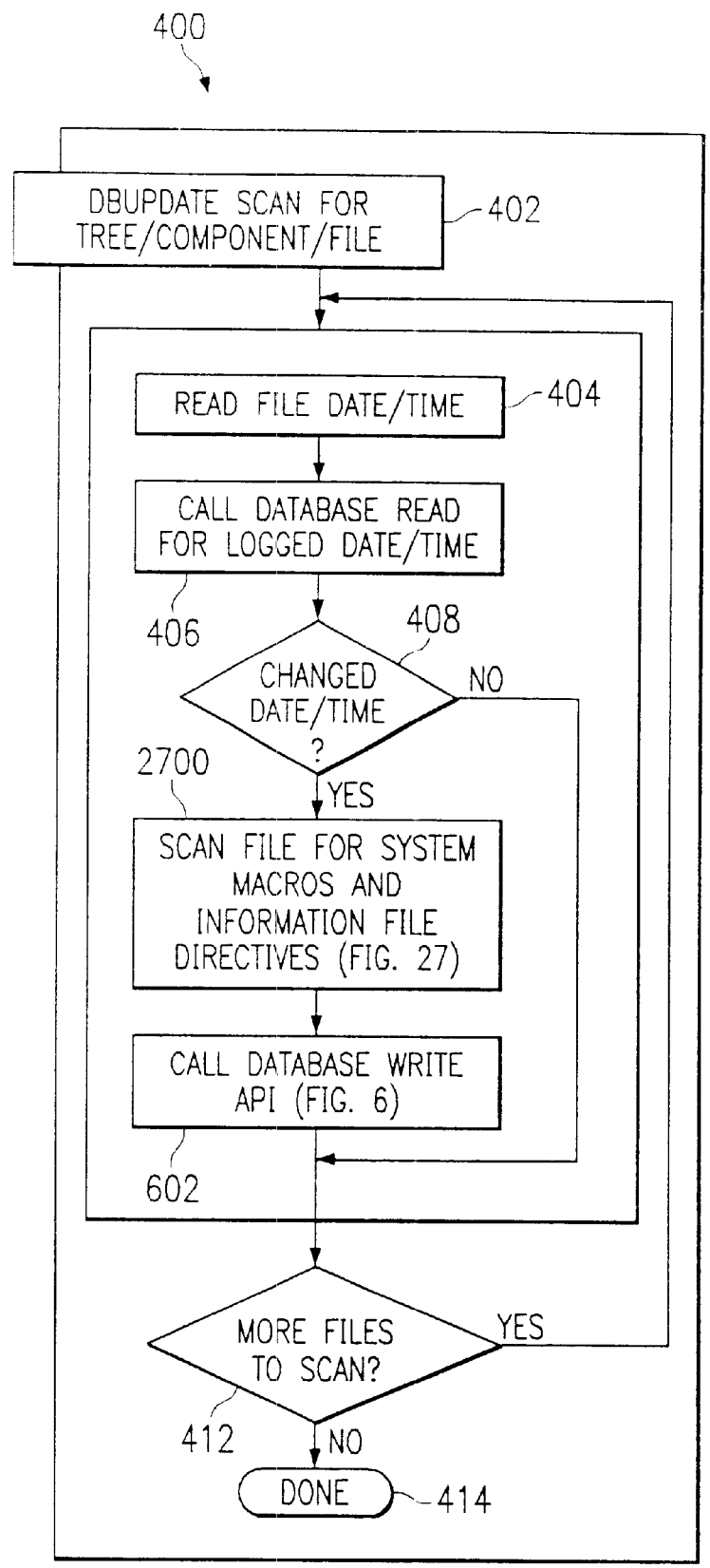
FIG. 4 is a block diagram of the database update routine.

Next, the database 1800 (FIG. 6) is updated (step 602 in FIGS. 4, 5B, and 6). Then the configurator 700 is called upon again to revise the product configuration state data (step 706); and if any changes are made, then the routine UI UPDATE VIEW 204 (FIG. 2) is called upon to update the user's view; and if any red "X"s appear (FIG. 33B), the product build is cancelled.

Figure 7:
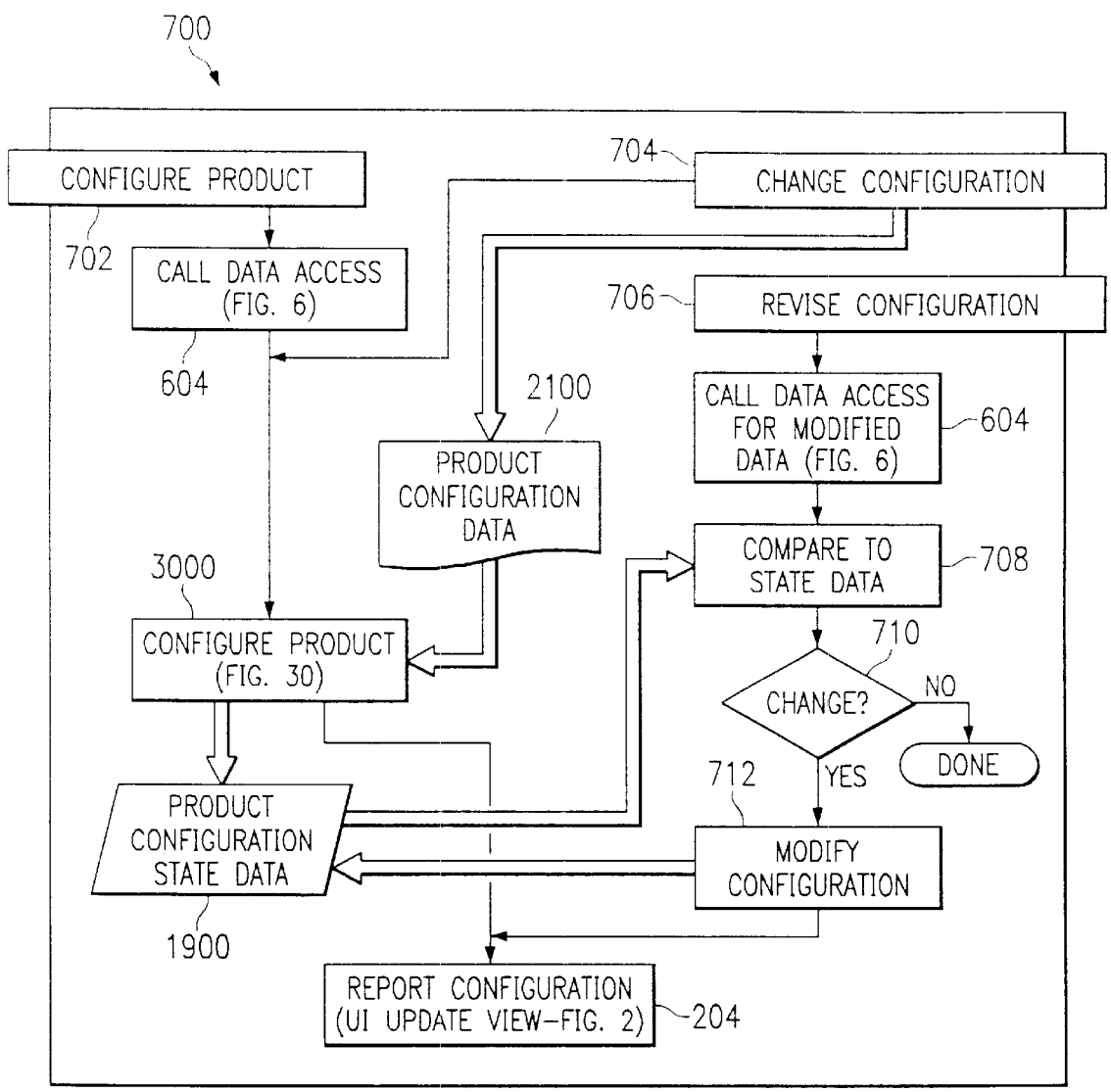
FIG. 7 is a block diagram of the configurator routine.

Note, in FIG. 7, that the configurator begins a configuration with product configuration data 2100, which is retrieved from a file "platform.cfg." With reference to FIG. 22, this product configuration file designates such things as PLATFORMTYPE 2201 (server, desktop, etc., and specific architecture), system option values 2202, features to be included or not included 2212, additional files to be included 2215, files to be replaced 2216 (override), option values 2218–2220, and the like. All of this information comes from the user interface, and all of it is created under user. A simple question asking routine (not shown) can be used to create a new configuration by asking the designer simple questions to determine the platform type, the system architecture, and other such fundamental things. The remainder of the data contained in this file is accumulated whenever the designer exercises his or her option to override the default object selections and option values, again through interaction with the user interface. (Of course, this file may also be edited manually; the entire program development system may be run without the user interface, with the routines shown to the right in FIG. 1 executed one-at-a-time manually; but much of the functionality of the invention lies in the interactive user interface.)

Figure 19:
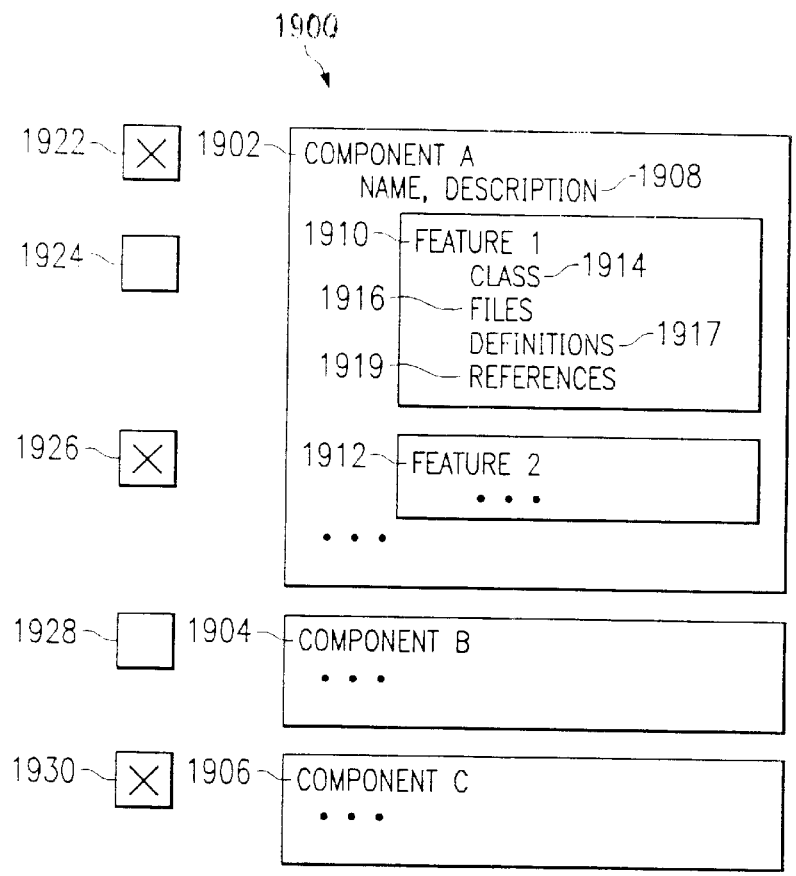
FIG. 19 illustrates an outline of the contents of the configuration state data 1900 shown in FIG. 11.

The configurator 700 next goes to the database 1800 and loads itself up with all of the data which the database contains, both data obtained from scans of source code files, and in particular the parameters the programmer has supplied to the special macro call statements (such as class, name, version number, and the like taken from each type of macro), and also data gathered from special class and feature files which occupy the same subdirectories as the corresponding class and feature source code files. All of this information, in combination, is called the product configuration state data 1900. As shown in FIG. 19, this data includes component names 1902, 1904, 1906, descriptions of components 1908, feature names 1910 and 1912, and information associated with each feature such as class 1914, files 1916, definitions 1917 and references 1919, etc. This is the information that governs the nature of the user display. Note that the "in" 1922, 1926 and "out" 1924, 1928 status of each object (feature or component) is clearly marked by a flag bit or number in the configuration state data (as is indicated by the presence or absence of Xs in FIG. 19.)

Figure 8:
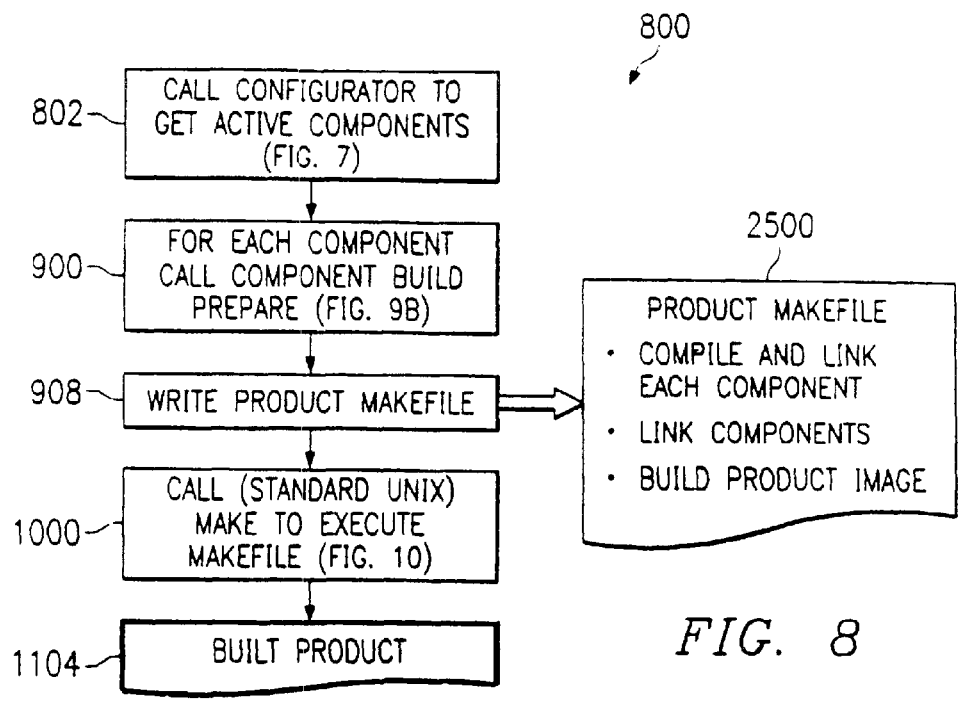
FIG. 8 is a flow diagram illustrating an overview of the product make procedure.

Program control next continues with a call to the product make routine 800 shown in FIG. 8 (step 800 in FIGS. 3 and 5B). The product make routine begins at step 802 by calling upon the configurator 700 to provide a list of all active (or selected) components. The product make routine 800 eventually will retrieve all of the selected (or "X"ed) information shown in FIG. 19. This selected information is shown at 2000 in FIG. 20.

Figure 9A:
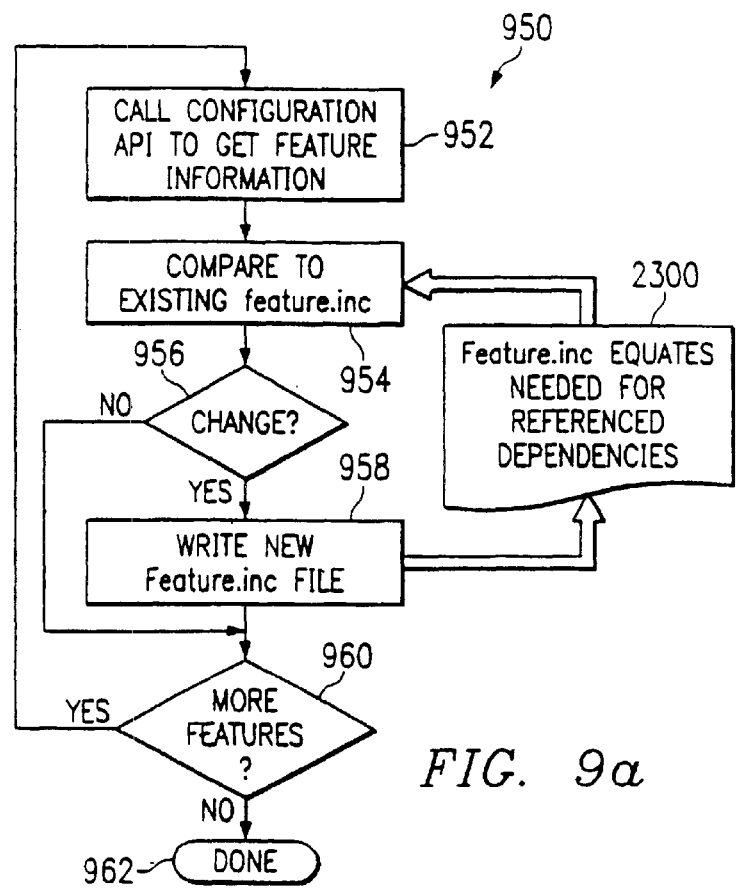
FIG. 9A is a flow diagram of the build prepare routine which creates the "feature.inc" file for each feature.
Figure 9B:
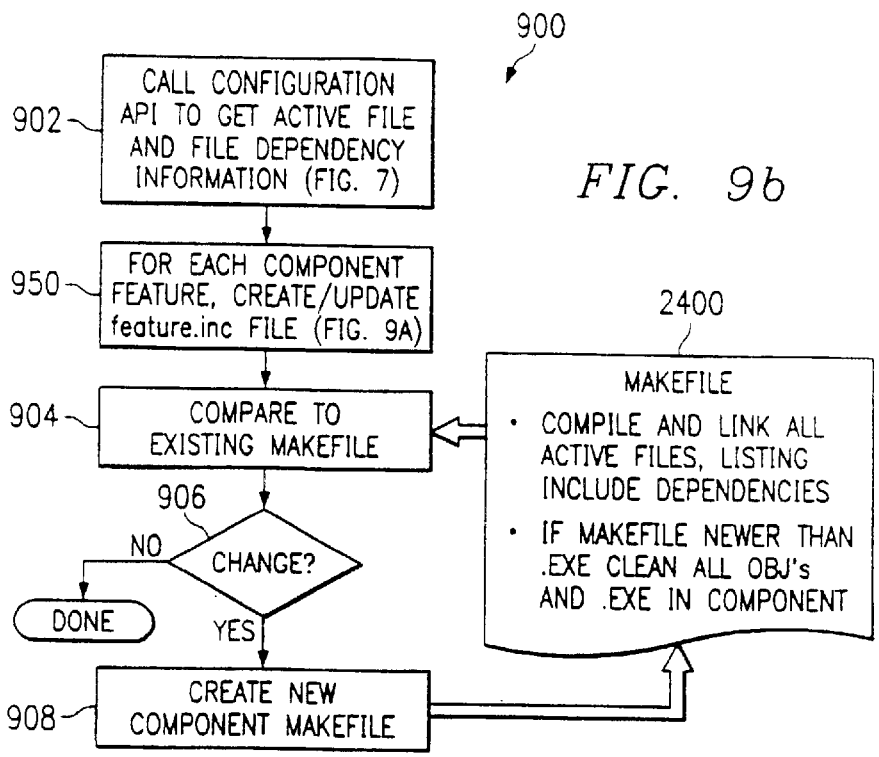
FIG. 9B is a flow diagram of the build prepare routine which creates the component makefiles and which calls upon the routine in FIG. 9A to create the "feature.inc" files.

Returning now to the product make routine 800 shown in FIG. 8, at step 900, for each separate component, the product make routine calls upon the component build prepare, routine 900, shown in FIG. 9B. This routine, at step 902, calls upon the configurator 700 and its RAM configuration state data 2100 to provide source code file and file dependency information for the component. Next, at step 950, the build prepare—feature include files routine (FIG. 9A) is called upon to go through each of the feature subdirectories of the component. At step 952, the configurator 700 is again called upon, this time to obtain information about a particular feature. The information provided is compared to the existing information found within the feature's "feature.inc" file, if any exists, at step 954. If the information has changed (step 956), then a new "feature.inc" file 2300 is generated and is written. Next, at step 960, if there are more features, this process is repeated until, at step 962, all the features have been checked out. Then program control returns to step 904, where the component information is compared with the contents of any existing component makefile. If, at step 906, there is any change, a new component makefile 2400 (FIG. 24) is created at step 908 that governs the proper compilation and/or assembly and linkage of the component and all of its features into an "*.obj" object file. The bild prepare—component makefile routine 900 is repeatedly called in this manner, once for each component that has been selected for inclusion in the finished product.

By way of brief explanation, to be supplemented below, the "feature.inc" files are placed into each feature subdirectory along with the source code files that actually define each feature. Each of the feature source code files contains the command "INCLUDE feature.inc". This causes the compiler or assembler to insert a feature's "feature.inc" file into all the source code files for the feature, where they may perform such tasks as changing class references to file path references, define options, and set switches that cause procedure calls to be deleted from the source code, if they call unselected components (see, for example, FIG. 23, where the value TRUE is assigned to "D_TIMER_DELAY" to cause a subroutine call to the "TIMER_DELAY" function to be included in the source code), or to be marked, for example, with a specific component name (to require the procedure linked to a call statement to reside within a feature of the named component). Likewise, a procedure entry point can be marked "override" to cause it to be selected in preference to an identical procedure name in some other source code file. Through the mechanism of the automatically-generated "feature.inc" files, all such user-option mechanisms can be adjusted by the system designer from the graphical user interface without the need to edit or alter the source code files themselves. This gives the system designer unprecedented control over the configuration of the finished product, with minimal effort.

Figure 11:
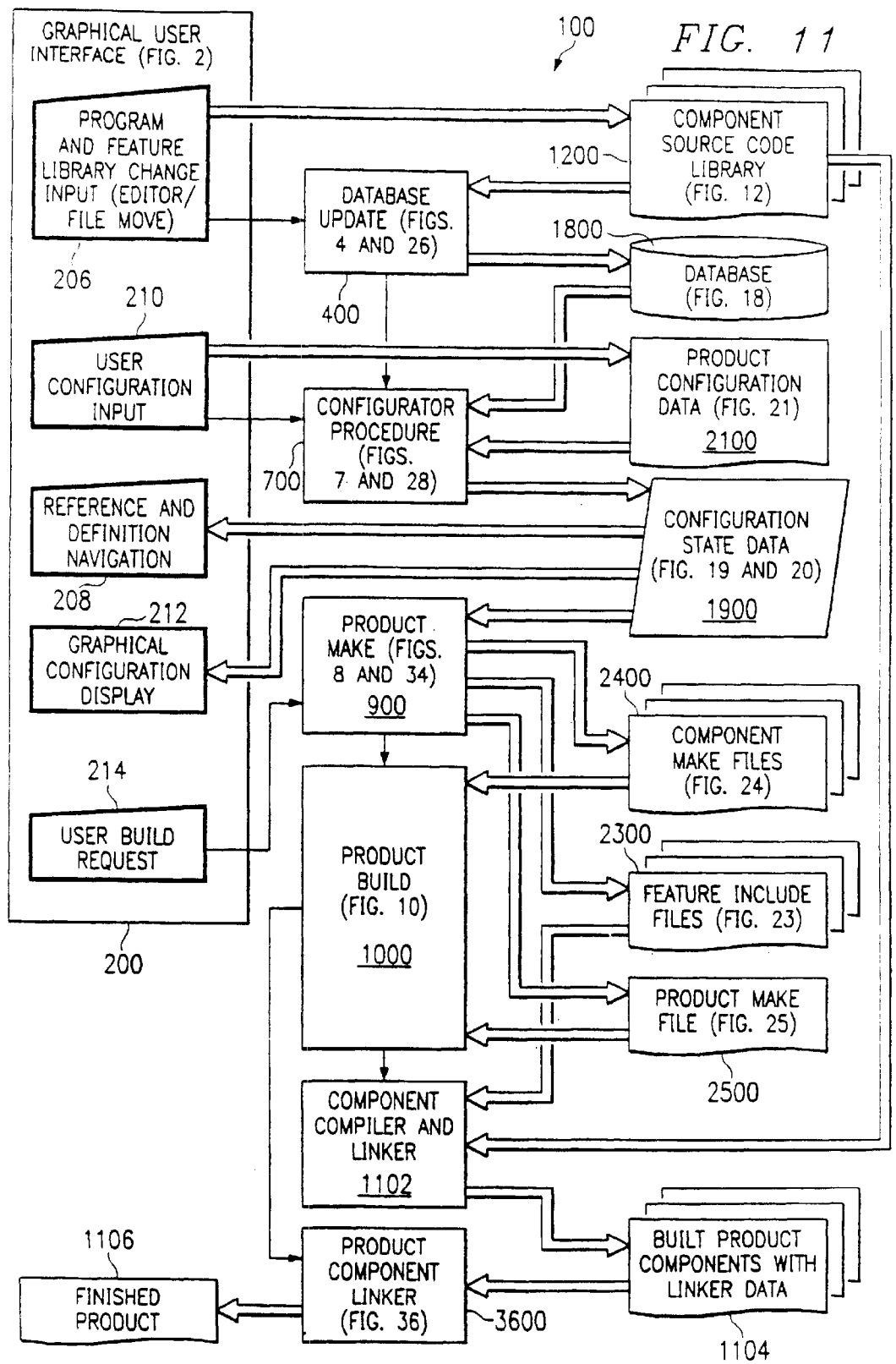
FIG. 11 is a flow diagram illustrating an overview of the program development system 100, emphasizing the data flow aspects of the invention.

After all components have been processed, program control returns to the product make routine (FIG. 8), step 908, where a product makefile 2500 is created. This product makefile 2500 contains directions that switch the computer's focus to the various component subdirectories and that then cause the computer to execute the component makefiles 2400 found within each such subdirectory, thereby building an object code module for each object. Then it calls upon the product component linker 3600 to link together all the component object code files 1104 (FIG. 11) into the finished product 1106 (FIG. 11).

Next, at step 1000 in FIG. 8, a standard Unix "make" utility is called upon to build the product under the control of the component and product makefiles 2400 and 2500 just described. This process is outlined in FIG. 10. At step 1002, a command is read from the master make file that selects the subdirectory of a component (step 1006). The make utility, governed by the product makefile 2500, then calls upon itself to process the component makefile 2400 found within that component subdirectory which carrys out the steps 1008 to 1016. At step 1008, a command is read from the component makefile 2400 which calls for compiling 1010, assembling 1012, or linking 1014 a feature source code file, and this process continues repetitively until all the commands have been executed (step 1016), thereby producing a built product component file 1104 which also contains special segments that contain "fix-up" data that the product component linker 3600 will later use to patch one or more separately linked executable object code files into a finished, unified product (other special segments may contain list elements, etc.). The make utility, at 1018, sensing more commands in the product make file 2500, continues to read commands from this file 2500, to select additional component subdirectories, and to call upon itself to execute component make commands found in makefiles associated with each additional component, as was just explained, until finally all the component source code files have been compiled or assembled and linked.

At step 1004, the make utility finally reaches the product component linker instructions (2528 and 2530 in FIG. 25), which cause the product component linker 3600 to combine all of the separately linked component executable files to be merged into a single code image, with the addresses fixed up such that class and name references are all replaced with absolute image addresses, ready for incorporation into a ROM-based finished product 1106.

With reference to FIG. 2, there are a number of other user commands available. At entry 304, the designer may force a feature in or out by calling upon the configurator 700 to change the product configuration, and these changes are reflected in and stored within the the project configuration data file 2100 "project.cfg." Option values may be changed in this same way, and files specified for inclusion within the manufacture of a finished product may be overridden and replaced with other files designated by the designer.

Another option is the quick product build or the single component or single file build at entry 308, which bypasses the tree scan and configurator steps 402 and 706. The new source tree entry 312 is used when the source code library tree has never before been processed, thereby making it unnecessary to perform steps such as steps 956 and 904 in FIGS. 9A and 9B that check for whether existing special files need to be corrected (since it is likely no such files exist). The step 402 calls for a scan of the entire tree (FIG. 4). The configure product entry 702 into the configurator 700 is then taken which, at step 604, calls for access to the data in the database 1800 (FIG. 6) and then configures the product in step 3000 (see FIG. 30 for details). At step 204 (FIG. 2) a report is generated for the designer, and the product configuration state data 1900 is written out to disk storage.

The macros are described in full detail towards the end of this specification. Their functioning is described here in overview.

The program development system 100 is useful in resolving dependencies between references and declarations. One way the program development system 100 can resolve these dependencies is with the use of macros. For example, the macros can be used to resolve dependencies in the situation where two routines with the same name exist, and this commonly named routine is being referenced. Such a situation can occur when two or more identical components are used in a system, each component having the same routine names.

To overcome this problem, macros for branching the code execution, EXTJMP and EXTCALL, are used. These macros must be preceded in the file by a PBUEXT public external declaration macro. EXTJMP and EXTCALL are macros used to branch from a routine in one component to routines within another component. Both macros generate fix-up data, destined for the product component linker (and placed into the external segment 3802 shown in FIG. 38) that lists the address of EXTJMP or EXTCALL macro and the name (class plus procedure name) of the routine that is to be branched to. The fix-up data is stored in intermediate libraries, which reside in the external segment 3802 from which it is accessible to the product component linker 3600 which actually performs the fix-ups. The name and class generated by an EXTJMP or EXTCALL macro may be the default name and class; it may be an alternate name and class, if the call or jump is declared by the PUBEXT to have an alternate name and class; or the call or jump may be deleted entirely, and no fix-up data generated, if the call or jump is declared by the PUBEXT to be optional. A data switch passed in as part of the "feature.inc" file, calculated by the product make utility based upon whether the default procedure exists or not, switches the macros between the default name and class and the other two options. IN this manner, an optional call destination can be acrhieved if the default destination does not exist, or the call or jump can be automatically deleted if the default destination does not exist.

The PUBEXT, EXTCALL, and EXTJMP macros can a!! designate a component by name. Then, if two components contain the same procedure name, the fixup data generated by the EXTJMP and EXTCALL macros will contain a component name designation, and then the product component linker 3600 will link that call or jump only to a procedure residing within the named component. In this way, the name ambiguity discussed above can be resolved.

A PUBLIC_PROC macro indicates the location of a procedure within a component. One of the arguments that this macro may accept is the key word INTERCEPT, which is added to the "fex-up" data generated by this procedure. Every public procedure macro generates fix-up data, including the name (class plus name) of the procedure, plus its absolute address within the object code, and this fix-up data also identifies the component that contains the procedure. This fix-up data is placed into the public segment 3804 from which it can be accessed by the product component linker 3600, which does the actual fixing up of the data.

If the key work INTERCEPT is present in the fix-up data of a given procedure, and if there are other procedures that have the same name (name plus class), then the product component linker 3600 will link all procedure calls (identified by their fix-up data in the external segment 3802) to the procedure designated the INTERCEPT procedure instead of to other identically named procedures, for example, assigned to the same class and possibly having the same component name.

The following is a more general discussion of macros and system development, and of how macros can be used and of how systems can be designed. It is not fully in accord with the preferred embodiment of the present invention, particularly in not always assuming that the "fix-up" steps are performed by a product component linker. Fix-up data, of course, may be stored in some form of intermediate library, and the fixing up of the code can be done in other ways. (The description of the preferred embodiment will begin again with the detailed description of FIG. 11 which commences some paragraphs below.)

A PUBLIC_PROC macro may used to declare a dispatch routine. The dispatch routine is a routine that acts as a dispatcher to branch to the two different routines. The name and address of the routine will be stored as fix-up data. This fix-up data is also stored in the intermediate libraries. The build tools discard the fix-up data generated by these macros before generating the final binary image.

In addition to the argument in the EXTCALL and EXTJMP macros designating the routine name, another argument in these macros designates the name of the component library used to resolve the specific branch. The name of the component library used to resolve the specific branch can be designated by the designer through the user interface 200. The designer can obtain information from the user interface to determine which component libraries can be designated. Alternatively, an automation utility (a wizard) can parse the components in which the common routine is found and generate a source code template with a dispatch routine for each common routine between the components. This wizard would automate the search for common routines and simplify the coding for the dispatch routines as well as provide a method to automate debugging between the components.

Like the address of every branch, the name of the routine to be branched to, and the name and address of the dispatch routine, the information regarding the designated component library is stored as fix-up data in the intermediate libraries, which the build tools discard before generating the final binary image. The binary linker uses all of this fix-up data stored in the intermediate libraries to patch the branch instruction with the address of the correct routine from the correct component library, thereby resolving the dependency.

By using these macros to resolve such a dependency, existing component routines do not need prior knowledge of the component to which it belongs since routines are automatically distinguished by the component in which they were compiled and linked into the component library. Existing component routines also need not be recompiled. Moreover, all component routines can be encapsulated within a single component library and distinguished via the component, which enhances code encapsulation.

These macros used to resolve a reference to a commonly named routine existing in at least two components are not required. Any method for tracking external references (i.e. branches) can be used. Other tracking mechanisms that can be used include, for example, a preprocessor, assembler or compiler keywords, and a custom linker. Likewise, the invention can utilize any method for tracking public declarations. Any method that allows public declarations to be tracked and the declaration type (i.e. intercept or non-intercept) can be used.

Another way the macros can be used is to select among possible resolutions to unresolved compilation references in the objects of a build. The names of objects and their location are maintained in a database. There may be only one object per file-system directory and each object directory contains either a COMPNENT.INF or a FEATURE.INF file. The database may be updated either by scanning the file system for such INF files or through manipulation of the database using an API.

The objects could be specified explicitly. A directory or list of directories could be specified which would then be searched for objects, not to determine order, but to determine presence or absence. The detection occurs in a timely fashion and can be handled automatically. A database or some other storage means could be used.

The INF file includes ASCII text containing attributes used for browsing the software project and controlling the compilation process. In addition, BaseClass is used to identify that two features have the same interface and provide the same basis functionality. Normally no final software product may contain two features having the same BaseClass.

Since the build can be for numerous types of target hardware platforms, it is useful to classify these platforms into general categories, such as BasicPC, Notebook or embedded. For each of these platform types it is possible to specify the default behavior, which can then be changed by the designer manually. One of these default behaviors is an "OnDemand" attribute, which indicates that the object will be included in the final software product if there is a reference to it by another object, another object with the same BaseClass has not been explicitly included by the system designer, and the system designer has specified that the hardware platform falls into the general category listed in the PlatformType command.

The OnDemand attribute could be placed within a source file (rather than a separate file). The attribute could also be in some sort of master database instead of in the tree. Alternatively, the attribute could be for one or more platform types or not use platform type at all in determining whether or not the OnDemand attribute should be used. The OnDemand attribute could be linked to any number of user specified software project attributes (not just Platform Type) or none at all. The On Demand attribute could also be moved to the interface functions themselves (for function-level exclusion).

Interface functions (i.e. functions which can be called between objects) are declared using the macros PUBLIC_PROC and PRIVATE_PROC. These macros specify the scope and other attributes information for the function. Objects which use interface functions must either be in the same file as the function or else declare its prototype using a PUBEXT or PRVEXT macro. The actual function calls use the EXTCALL macro. Configurator 700 scans the source files before the normal compilation process begins in order to determine the location of all interface functions and all references to such functions. Then, based on the platform type and explicit commands from the system designer, the list of references to interface functions is compared against the list of interface function declarations. When there is a non-optional reference with no declaration, this is considered unresolved.

The detection of unresolved references can be done without the use of the macros. Standard methods could be used including leaving such detection until the link stage of compilation. It could also be used in late binding with dynamic load libraries, using a list of libraries and their attributes.

At this point, all objects listed as OnDemand are checked to see if including them would resolve one or more unresolved references. If so, the object is included. The determination that an object will be included in the final software product is determined before normal compilation begins. This is accomplished by either including or excluding the files in the object from the compilation process. For some objects, all files therein are included or excluded. For other objects, this is done on a file-by-file basis. In either case, the make file is modified. An error condition is detected when two components with the same BaseClass are marked OnDemand and one or both of them would resolve an unresolved reference. Although preferably done before compilation, the decision to include an object in the final make product can alternatively be done using link-stage binding or run-time binding.

This method for resolving references prior to compilation allows a developer of the object to determine which object should be included by default. This lowers the chance of errors and increases productivity. It also allows faster builds, since pre-compilation knowledge of all objects and all dependencies limits the number of files to be assembled to the exact minimum.

The macros can also be used to resolve dependencies based on the versioning of the objects being referenced and declared. The PUBLIC_PROC macro is used to declare public function interfaces. One of the parameters in this macro is a version number in the form x.y, where x is the major version number and y is the minor version number.

Incrementing the major version number indicates a later revision of the interface, which is not backwards compatible with regards to inputs, outputs and/or side effects. Incrementing the minor version number indicates a later revision of the interface, which is backwards compatible with versions of the interface having the same major version number and lower minor version numbers. This indicates that all inputs and outputs expected by lower minor version numbers are supported, as well as similar side effects. However, new inputs may produce new outputs and different side effects. This versioning scheme is just one of many possible, including non-numeric, single version numbers, and dual version numbers with one being the current and one being the backward compatibility version.

The PUBEXT macro is used to declare a reference to a public interface, either function or array. One of the parameters includes the version number expected by the caller. The version number has a similar format to that of the PUBLIC_PROC and LIST_CREATE macros. A warning is generated if the caller and callee differ in major version numbers or if the caller has a higher version number than the callee.

The database is accessed to determine the location of the "callee" and its version. The information in the database is updated using the DBUPDATE (database update) utility, which, when invoked, scans for the previously described macros in all source code files in each object and places the name of the interface and its version in the database. It also finds the references to these interfaces by scanning for PUBEXT and recording the location and the version of the caller in the database.

Then, the database is searched for each caller to see if the version is compatible with the callee. The version is considered compatible if the major version number of caller and callee are the same and the callee minor version number is greater than or equal to the caller version number. This information can be displayed, output to a file, etc. so that the designer is informed of any potential incompatibility.

The database is not required, and the scanning process need not use a database at all. Rather, the version information could be added to the data prototypes as a special keyword handled by a preprocessor or special version of a compiler. For example, in C, the version number of the function could be encoded as a__-style keyword in the function prototype.

In addition, the exact manner by which the version number is attached to the caller and callee could vary from programming language to programming language. For example, in C, it can be attached to the function prototypes if MASM macros are used. For other embodiments, the versions could be attached using an external file. The versioning can also apply to static variables or data structures.

This use of versioning allows large software projects to be built more independently by tracking semantic changes in input parameters (bug fixes-modified parameter definitions). It also gives improved feedback as to whether the software project is likely to work before compilation and run-time. The versioning may also reduce errors because functional changes are readily identifiable by examining the version numbers.

Another use for the macros is to intercept a call to a first routine and have the call to the first routine replace by a second routine, which is the intercept routine. First, the two macros used to branch code execution, EXTJMP and EXTCALL, are used. EXTJMP and EXTCALL are macros used to jump to or call routines between components. Both macros generate fix-up data that lists the address of every call and jump and the name of the routine to be called. The fix-up data is stored in the intermediate libraries and discarded before the build tools generate the final binary image.

A routine that intercepts a call to another routine should have the same name as the routine to be intercepted. The intercept routine uses the PUBLIC_PROC macro to declare itself as an interface routine with an INTERCEPT keyword specified as a macro argument. The PUBLIC_PROC macro generates fix-up information that lists the address of the intercept routine, the name of the intercept routine (identical to the original routine), and the attribute that the routine is used to intercept another routine. Again, the fix-up data is stored in the intermediate libraries and discarded before the build tools generate the final binary image.

Using the generated fix-up data stored in the intermediate libraries, a linking utility is used to correctly link each branch and generate the final binary image. The address of the called routine is directly patched for the branch instruction in the component initiating the branch if a routine is not intercepted. However, the address of the intercept routine will be patched in place of the originally called routine whenever the intercept routine is present.

Although the address of the intercept routine is patched in place of the originally called routine, the originally called routine can be optionally branched to from within the intercept routine using the EXTJMP and EXTCALL macros. The linking utility will perform this by using the fix-up information in the intermediate libraries to correctly link the branch instruction to the original routine. In addition, the originally called routine can be optionally removed if the intercept routine never calls it and no other piece of code in the final binary image would reference it.

This interception process can be extended to replace called routines with referenced variables. It can also be extended to allow calls between routines within the same component to also be intercepted. The process could be modified to allow the intercept routine name to be different than that of the routine intercepted, i.e., the originally called routine. This would simply require an alternate and separate mechanism to couple the intercept routine with that of the caller.

With the use of this interception process, calls can be directly linked to their routine and no indirection is needed. Furthermore, the caller does not need to anticipate or know about any potential routines intercepting a call. The caller simply declares itself as any other procedure. The process also does not require the originally called routine to be in the final image if it is never called or referenced.

The elimination of an intercepted routine from the final binary image allows for a more efficient use of space by eliminating code that is not used. This efficiency can be extended to eliminate code that makes unnecessary calls. When all source files composing a project are present, a scanning and update utility scans each project source file for specific macros that reference declarations in other files. The two branch macros EXTCALL and EXTJMP use the macros PUBEXT and PRVEXT to declare all references. The scanning utility will scan for the PUBEXT and PRVEXT macros. The names of the declarations that the branch instructions refer to (via the PUBEXT and PRVEXT) are then recorded by the scanning utility into a database along with the source file name and location.

The two branch macros EXTCALL and EXTJMP require one of two BIOS external declaration macros: PUBEXT or PRVEXT. The macros have an attribute field allowing the macro to declare the reference to the branch declaration to be "optional." To eliminate unnecessary code from the final binary image, a branch instruction will not be compiled if the declaration that the branch instruction references is optional and the source file defining the declaration is not in the build.

Every branch is reconciled with its public declaration, which is in a different file. For each declaration reference, a flag indicates if a specific declaration is present in the build. A flag will not be generated for any declaration referenced that is not in a project source file. The flag is stored in an include file to be picked-up by the macros during compilation.

The two branch macros EXTCALL and EXTJMP will interpret the data generated by the scan utility (and passed via the include file) and optionally generate the necessary branch instruction for compilation. No branching code will be generated if the declaration is not in the project and the branch was marked as optional using either the PUBEXT or PRVERT macro. The EXTCALL and EXTJMP macros also provide a mechanism to insert additional code to be compiled if the declaration for the branch instruction is resolved. Conversely, additional code in addition to the branch instruction can be removed if the declaration for the branch instruction is not resolved.

This process can be extended to replace branched routines with referenced data types. The mechanism used would be identical to that for code branches. Furthermore, the macros discussed in the implementation of this process are not required for its implementation. Instead of the macros, the process could be implemented by scanning for the declarations dynamically as the project is pieced together as opposed to just before the compilation. The macros used to declare declarations and record declaration references could instead be keywords interpreted by the compiler or other utilities such as a preprocessor. Also as discussed above, a different method other than the formal database can be used to record the declarations and their references. A monolithic file that was parsed for information could be used in addition to other methodologies of recording data. In addition, a mechanism other than an include file could be used to pass the flags.

This process of removing optional branch code allows for the removal of the code before source compilation using prior knowledge of the system, which decreases the compile time. The removal of the declaration reference in addition to the declaration itself is completed without a stub. The process also operates across multiple translation units.

The resolution of declarations and references and the use of versioning can also be applied to labels. Similar to procedures, i.e., routines, the PUBLIC_PROC and the PRIVATE_PROC macros are used to declare each label definition. Labels defined by the PUBLIC_PROC or the PRIVATE_PROC macro may be used to resolve either public or private label references. Each label definition includes the label's name, the label's location, and the version of the label being defined. The PUBEXT and PRVEXT macros are used to declare each label reference. Each label reference includes the label's name, label's location, and the version of the label being referenced.

A validation utility is used to validate each label reference. The function of the validation utility could be integrated with another utility, such as the compiler or the integrated development environment. The utility ensures that each label reference has a respective label definition. The utility then compares the version information for each label. The utility will report an error if either a label being referenced does not exist or if the label being referenced is of an incorrect version. The validation utility reports the resolution status of each label reference once all label references have been resolved. The resolution status for each label can be reported to aid in the debugging of the build process.

This process allows the designer performing the build process to save time by quickly detecting and correcting all build-related label resolution errors before the time consuming build process is performed. It also does not require libraries or components that are external to the software product's code base to be previously built in order to detect build-related label resolution errors.

In the program development system 100, the main data structure is called a "list." A list is an array of fixed size elements, which entries may be added by any source code file. Lists must be created once, using a LIST_CREATE macro. This specifies the name of the list and the size of each list entry. List entries are added in groups. The groups begin with a LIST_START macro and end with a LIST_END macro. Each list entry is assigned a name.

For groups containing replacement list entries, an extra parameter on the LIST_START macro specifies the override priority. The override priority is applied to all list entries within the group. If the software project contains two list entries with the same name but different override priorities, the list entry with the higher priority is retained and the other discarded. Two entries having the same name and priority is an error condition.

The binary linker creates the final list, containing all list entries. The binary linker finds all list entries. For those with the same name, it compares their override priority. The highest priority entry is retained and the others discarded. The list entries for a particular list are placed sequentially, given an address and all references to the list and its entries are resolved.

This list process can be used with any statically initialized data structure. The lists can use different keywords for creating and initializing the data structures or none at all as long as the replacement data structure can be identified. The number of override levels can be changed, from a simple one level to n levels, n being an integer greater than one. The merging of the lists can be performed by the normal linker or even the compiler.

Using the list process, data structures can be created normally. In addition, more than one level of replacement can be done, which allows for "core," "product line" and "platform" distinctions.

Program development system 100 also provides a mechanism for including libraries in the build based on the existence of other libraries within the build. A load library is a dynamically triggered load library similar to prior art load libraries because the library's entire code set is included in the build. A search library is a dynamically triggered load library providing a mechanism similar to prior art search libraries for conditionally including code in the build. The difference between these two types of libraries is seen in the type of reference used.

Search libraries use a "forward" reference to include the library code in a build. For example, if Library A depends upon an object in search Library B, then the object code from search Library B will be included in the build. Dynamically triggered load libraries, on the other hand, use a "backward" reference to include the library code in a build. For example, Library B will declare that it should be included in the build when Library A is in a build—even though Library A has no dependency upon Library B.

Three things are needed to implement the dynamically triggered load library: a configuration script, a trigger command, and a build script generator. A configuration script is necessary to identify which modules are intended to be included in the final product. This may be a simple MAKEFILE, or it may be a custom file that simply lists the module names.

An "External Trigger" command is associated with the library to be loaded based on external criteria. For example, a special file (ModuleY.INF) can be associated with the triggered component. The INF file includes an External Trigger command indicating that "ModuleY" should be included in the final product if, for example, "ModuleX" has been included. Although the trigger declarations in this example is made within a .INF file, the trigger declarations can be included anywhere within the library's code. It is simply the responsibility of the script generator to locate these declarations and use them appropriately.

The build script generator's main task is to generate a MAKEFILE (or appropriate compiler/linker script) for building the executable product. The generator uses all potential library's INF files and the configuration script as input. During the script generation phase, the generator, based on external triggers, will determine if any of the libraries should be included in the final build. The use of a MAKEFILE assumes the use of tools that utilize such a script. This is not a requirement, however, and it may be substituted with any manufacturer's build tools to obtain the same effect.

The use of dynamically triggered load libraries provides the ability to include libraries in a product without the need to directly modify the triggering module code or build scripts. A benefit of dynamically triggered load libraries is also found as the number of libraries and interdependencies among modules increases. For example, when a designer chooses to include modules into a software project build from 400 possible choices, it is difficult to know what "backward" referenced libraries may exist. The externally triggered load library solves this problem because the backward referenced libraries will bring themselves into the final product.

In program development system 100, a utility can scan the source code files of a system to detect and record public declarations and external references. The public declarations and external references are scan-able keywords in the source code files. A list of the source files that will be used as source code libraries (as opposed to those files assumed in the build) is created.

As discussed above, a utility can resolve external references to the public declarations detected in the source code. Like a linker, the utility first finds references to external declarations in files assumed in the build. It tries to resolve them with files assumed in the build, followed by files in libraries. This is a recursive process; a file or module brought into the build may reference other files or modules. This resolution process needs to output the resultant list of source code files that will be part of the build. Normal compilation and linking can follow, and no object libraries need to be created.

In the generated list, files can be listed in a makefile, batch file, or command line application, like it is done for the creation of object libraries. A centralized list can list the library files of a project. The resolution of external references to public declarations can be done at alternate phases of development and build. It can done dynamically during edit of a source code file for real-time feedback to the developer, or it can be done after individual file compilation, using compilation output to provide public and reference information. In addition, the listing of object modules to compile and link can be done form a batch file, or a list input for command line link execution.

The listings and resolution help save development time. First, they help prevent the developer from mistakenly looking at the wrong source code during debug trouble shooting, because the actual files and their location will be listed and viewable. Knowledge of specific files used in a build also helps the developer detect the location of problem features missing or undesired features added. Second, the developer also gets immediate feedback of unresolved references prior to building the system. This saves development time, because unresolved external references are normally reported only at the end of the build process when the link is done.

Program development system 100 also provides flexibility to source code that includes a file of a specific feature class by obviating the need to specify where the include file is located. In the source code files used in program development system 100, there can be a macro class and a file name of an include file. The include file lists its class information within a macro. Prior to compilation, the source code file is scanned, and the location of the appropriate include file is determined by a system utility.

The system utility source code file includes a local include file of a static system-determined name. This included file is created dynamically by the system before compilation of the source code. The source code file lists a local fixed name include file before this macro is listed.

Using the system scan utility, the source code tree of the software system will be scanned for the above defined macros before compilation. System configuration utilities use the information retrieved from scanning the system and reconcile the class information of the file with the include files found. The system utilities generate an include file local to the source code file. The generated local include file provides the macro expansion to specify the physical location of the included file. The system utilities also dynamically create the makefile with the proper location of the include dependency.

In order to maintain control of changes to the include files located in differing locations, a versioning scheme can be used, where both the source code file and the include file list the version of the included file as parameters of their macros. The system utilities validate that they are compatible.

Using this system, the source code does not need to know which include file will be used, and a deployment of the system does not need to manually specify it. This is advantageous in polymorphic features with include files, or multiple versions of features (upgrades . . . ) in different locations. The system utilities automatically resolve the include file to the appropriate file. The class information prevents multiple instances of an include file of the same name being a problem.

The following description provides a more detailed description of program development system 100. FIG. 11 presents an overview of the program development system 100 which emphasizes the flow of information (right side of the figure) to, from, and between the routines (center of the figure) and the designer managing the graphical user interface 200, into the finished product 1106 (lower left corner of the figure). Data flows are indicated by double-line arrows, while routine command paths are indicated by single-line arrows. The description presented below of FIG. 11 places main emphasis upon data, data structures, and the data flow aspects of the present invention.

Initially, the component source code library 1200 is set up within a directory on a media such as a fixed disk drive. Within the library directory, subdirectories are assigned to each component of the software product. Under the subdirectory of each component, sub-subdirectories are set up for features each of which contains one or more source code files corrsponding to that feature, and further sub directories under the first layer of feature subdirectories may define subfeatures, and so on. Each component subdirectory also contains a "component.inf" file 1400 which defines how a particular component is to be compiled and linked, what type of platforms it may, must, or must not be used with, etc. Each feature subdirectory also contains a "feature.inf" file 1600 that defines, among other things, how a particular component is to be compiled and linked, what type of platforms it may, must, or must not be used with, and so on. The options supported by these files are described in more detail in connection with the descriptions presented below of FIGS. 14 through 17.

The database update routine 400 scans all of these files and builds the database 1800, which then contains information extracted from the arguments passed to all of the special macros calls to which macros are inserted into the source code files, plus all the information gathered from the "feature.inf" and "compnent.inf" files. This data can then be accessed by the configurator procedure 700. In particular, the database system is designed and structured so that it can answer the following questions: What are the components? What are the features? With respect to an object (component or feature), what are its dependencies, including functional dependencies (jumps, calls, etc.), options, and include file dependencies? What are its interfaces, including procedures, labels, and lists? What are its options? What are its files? What are its details? It can present a list of the components and/or features whose inclusion in the final product is triggered by a special trigger type, such as: an external trigger (X must be in if Y is in); recommended triggers (use recommended for servers; and "on demand" triggers (it must go in because component Z requires its presence). It can make sure a file (identified by name, path, data and time stamp) exists. It can also present information on a specific option identified by name. And finally, it can present a list of the "Enums" (or enumerated data names and values) for a specified option.

Figure 32:
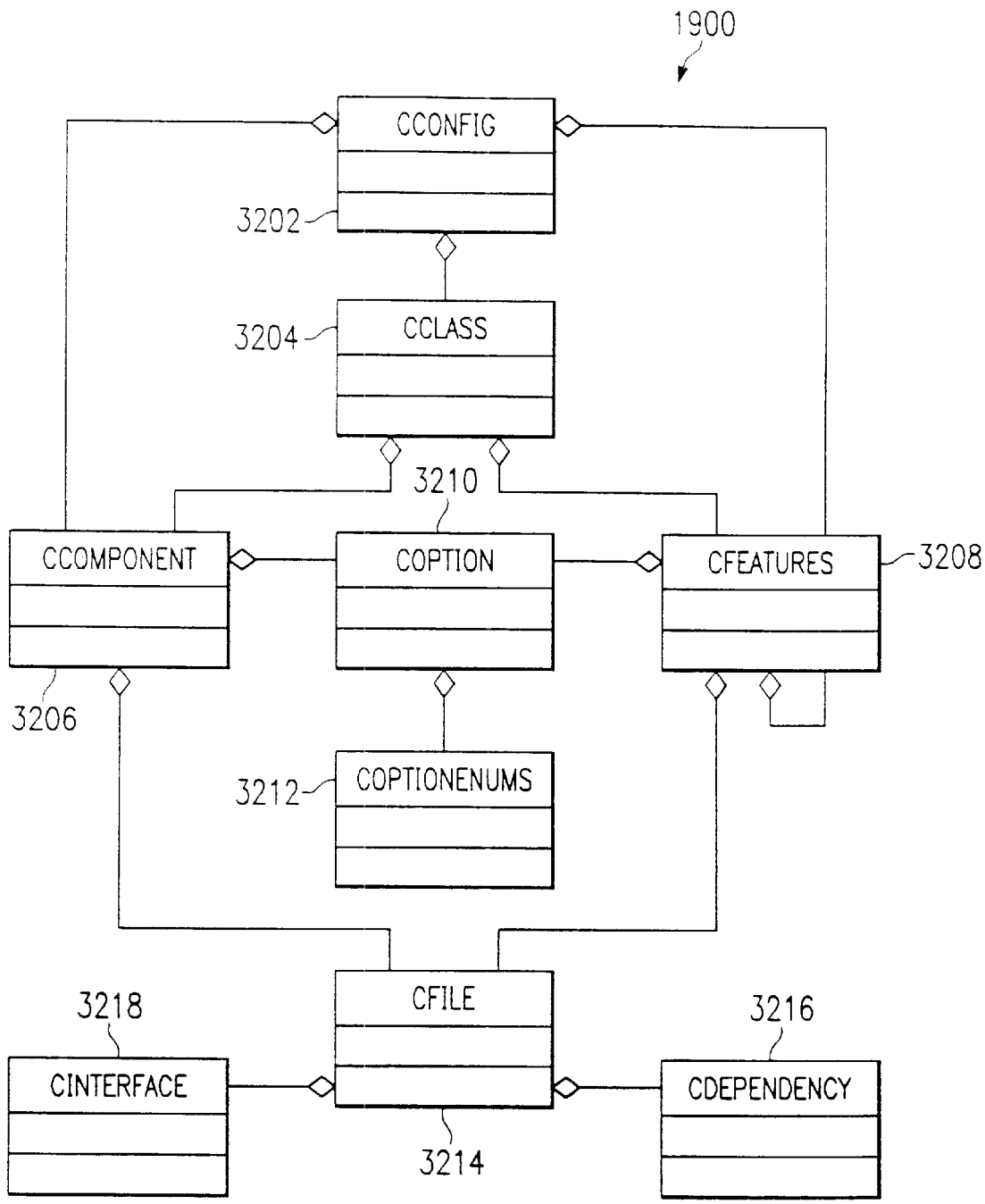
FIG. 32 illustrates the internal structuring of the RAM-based product configuration data 1900 (FIG. 11), also shown in FIG. 19)

The configurator procedure 700 creates the configuration state data, defining the configuration of the finished product, using information drawn from the database 1800 and information drawn from the product configuration file "platform.cfg" 2100. The configurator 700, which in the preferred embodiment is written in C++, maintains this information in a C++ RAM data structure of classes (in the C programming sense of the word class) as is shown in FIG. 32. As shown, any number of product configurations 3202 may be stored in this RAM data structure. Each such product configuration may be linked to any number of classes 3204 (in the sense of the present invention), components 3206, and features 3208. The classes 3204 may also be linked to any number of components 3206 and features 3208 (note that components do not need to be assigned a class if they are not associated with source code files, which generally they are not). Each feature 3208 may be linked to any number of sub-features 3208. The components 3206 and features 3208 may be associated with files 3214 (source code files and include files) and also with options 3210 (such as equates or manifest constants of the type formally represented as, for example, "START_DELAY EQU 12" in conventional "include" files). In the case of source code files 3214, each may be linked to any number of dependencies 3216 ("include"s, "option"s, macros, and functions, where functions include lists, labels, function calls, and strings) as well as any number of interfaces 3218 (anything that can be publicly (between components) or privately (access limited to parents and siblings) referenced, such as procedures). The "visibility" of a name in a source code file is thus first limited by class, and then by component/function (parent/sibling) relationships if a name is not declared to be public. In the case of options, any option may optionally be assigned a set of enumerations 3212, as in Pascal computer programs, with each enumeration assigned a numeric value, such as "Fast= 3; Slow=2; Off=1", to present a simple example. Menus of enumerations may then be presented to the designer through the user interface (when the "Modify" selection is made of the menu 3338 shown in FIG. 33E).

The graphical user interface 200 in FIG. 11 is described in more detail elsewhere. Briefly summarized, the designer at 206 may double click on icons representing source code files, "feature.inf" and "compnent.inf" files and may thereby edit any files, with automatic calls being thereafter placed to the database update routine 400, the configurator procedure 700, and to the graphical configuration display 212 to update the database 1800, the configuration state data 1900, and the user display (FIG. 33A). At 208, the designer may use tools provided to reference and search for various named system components, referencing them and navigating though the library looking for where they may be defined, after which their definitions may be viewed and revised as just described. At 210, the designer may call upon the configurator procedure 700 to modify the finished product configuration, with changes dutifully recorded both in the configuration state data 1900 (as in the "X"s shown in FIG. 19) and in the disk-resident product configuration data file 2100 "platform.cfg." All such changes, once again, are displayed upon the graphical configuration display 212.

Figure 20:
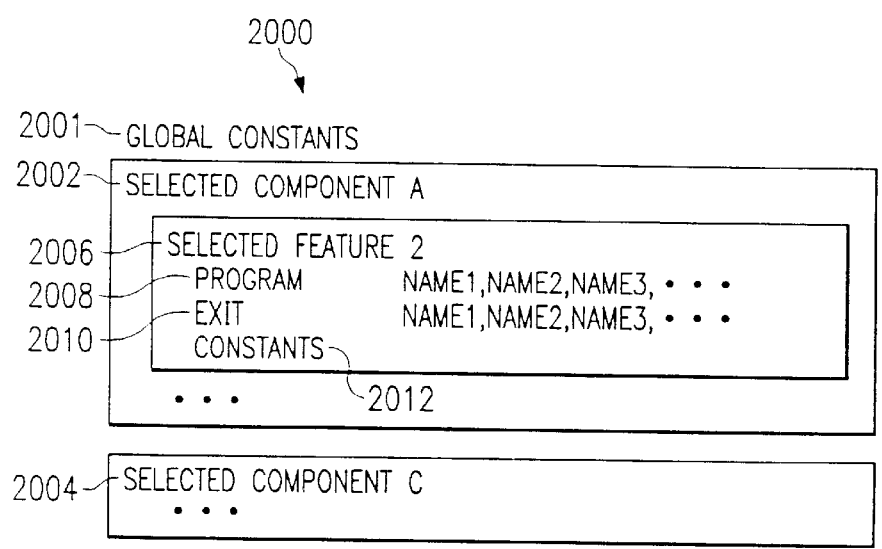
FIG. 20 illustrates an outline of the portion of data shown in FIG. 19 that is selected and fed into the product make routine 900 shown in FIGS. 8 and 34 to govern the building of the finished product.

The final user command are the user build request commands 214 in FIG. 11. As previously explained in connection with FIG. 7, this command causes user-selected and system-selected configuration state data (as illustrated in FIG. 20 (compare to FIG. 19)) to be supplied to the product make routine 800 (described in overview in FIG. 8 and in more detail in FIG. 34) to first construct the component make files 2400 and the product make files 2500, which together control all aspects of compilation and linking, and also cause the feature include files 2300 "feature.inc" corresponding to each feature and the switching on and off of feature dependencies (including or excluding "calls" and the like) to be constructed or updated.

Figure 10:
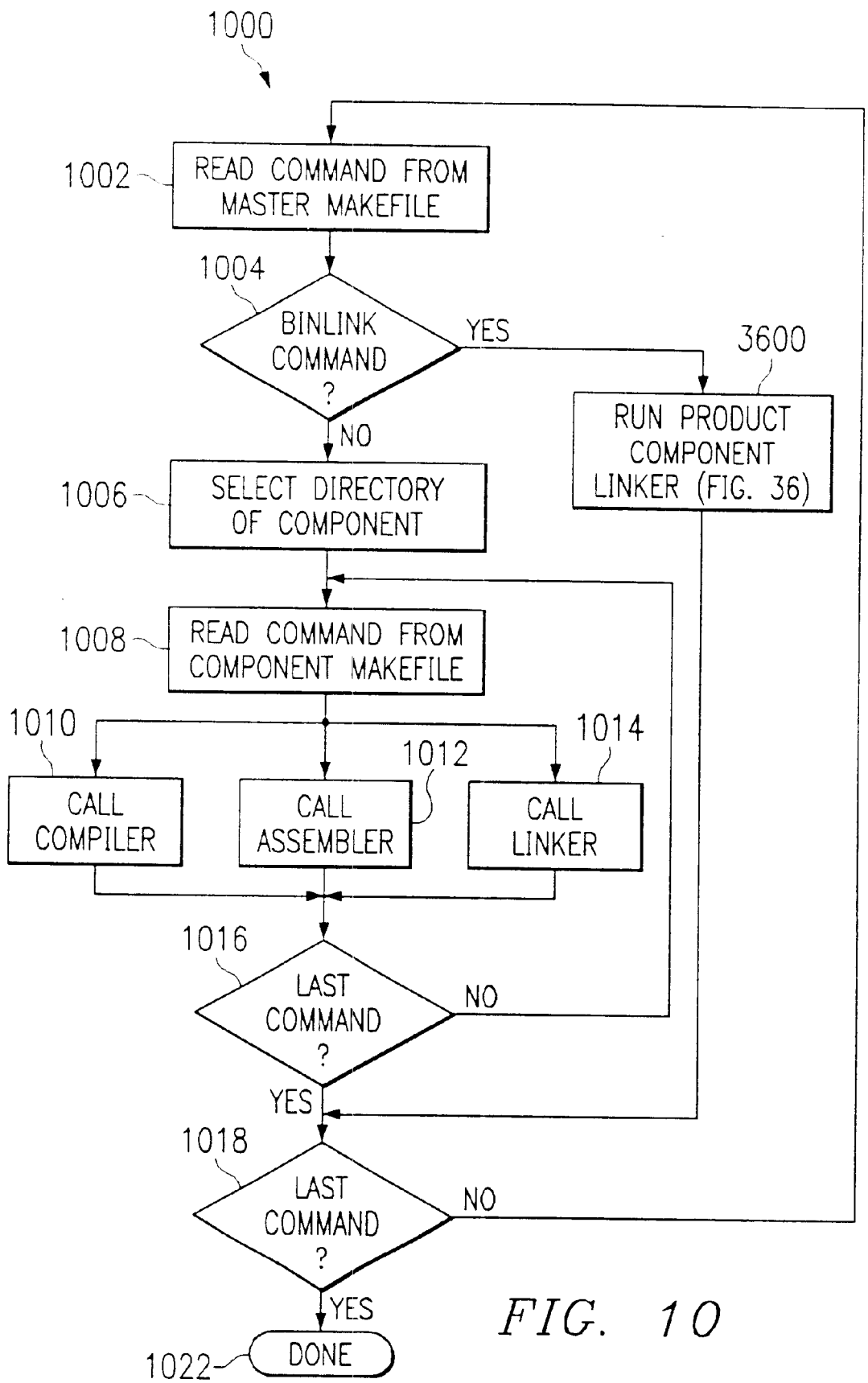
FIG. 10 is a flow diagram of the steps carried out by the make utility when executing the product and component makefiles, causing source code selection, modification, compilation, assembly, linking, and final component linking by the product component linker.

When it has finished its work, the product make routine 900 in FIG. 11 simply calls upon a standard Unix make utility to execute the product make file 2500 and thereby places into execution the product build routine 1000 described in overview in FIG. 10, which calls upon the compiler, assembler, and linker to create built product component files 1104 for each and every component under the control of the individual component make files, with the source code modified as is required by the feature include files 2300 for each individual feature.

Finally, the product component linker 3600 in FIG. 11 is called upon to accept the built product component files 1104, strip from them data contained in special macro-generated segments that are intended to control the product component linker as it performs the final "fix-up" of the object code images, sewing them together into a fully-linked, unitary ROM image, with calls by name and class replaced with the proper calls to absolute addresses in the ROM image, with list components retrieved from their special segments, organized into independent lists, sorted as commanded, and inserted where indicated into the proper code segments, with options fully resolved, and with all other final steps of linking fully completed. In this manner, the product component linker generates the finished product 1106 ready for installation into an EEPROM or flash ROM or the like.

Figure 12:
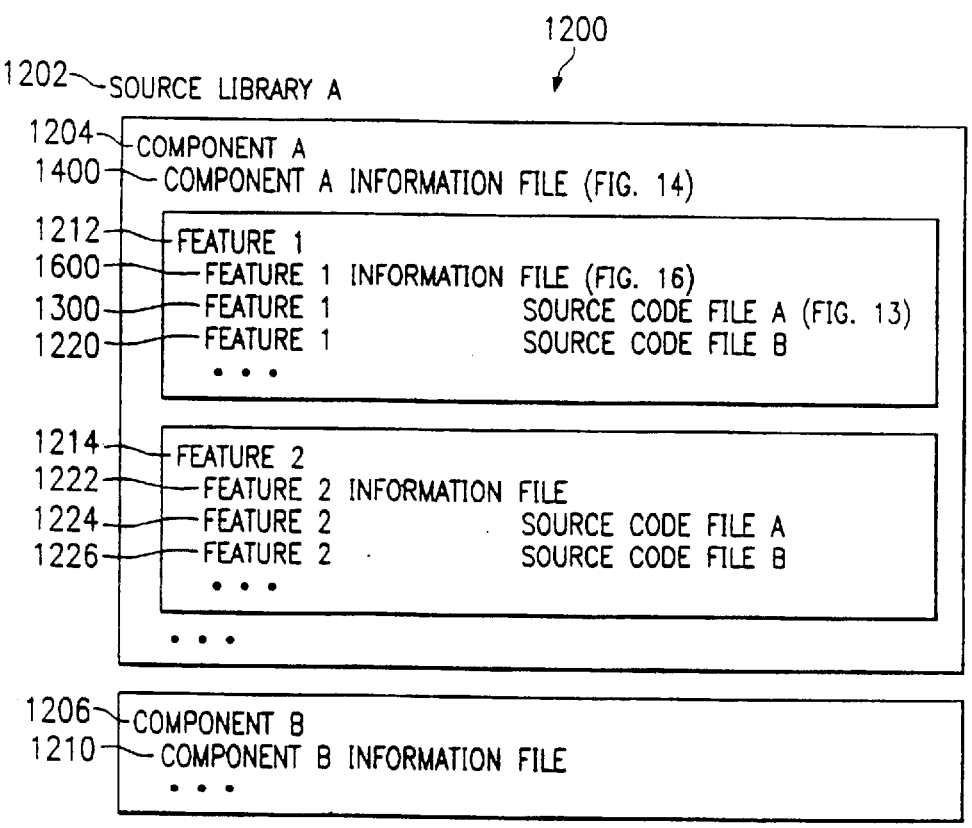
FIG. 12 illustrates an outline of the contents of the component source code library (1200 in FIG. 11)

FIG. 12 illustrates the general structure of the component source code library 1200. This library is constructed on the hard disk drive of a computer or server in any convenient root directory. In the preferred embodiment, all system elements must reside within the confines of this root directory, which is the only part of the disk drive that is scanned by the database update routine 400.

There can be any number of system components. Each component resides within its own subdirectory within the root directory assigned to the library. In FIG. 12, the outline structure of the lines of text represent symbolically the levels of directories and subdirectories within which things are stored, and rectangles surround single subdirectories and their contents.

Accordingly, the root directory in FIG. 12 is the source library A 1202. Everything within this source library is scanned by the database update routine 400. Within this root directory are shown two subdirecoties, one allotted to component A 1202 and one allotted to component B 1206. Each componend subdirectory contains a component information file. The subdirectory for component A contains a component A information file 1400 (the details of which are shown in FIG. 14), and the subdirectory for component B likewise contains a component B information file 1210. Each component subdirectory also contains one or more feature sub-subdirectories. In FIG. 12, the component A subdirectory contains two feature subdiectories 1212 and 1214. Each feature sub-subdirectory contains feature source code files 1300, 1220, 1224, and 1226 and a feature information file 1600 and 1222, as shown. With reference to the feature 1 sub-subdirectory, it contains the feature 1 information file 1600 the details of which are shown in FIG. 16 and the feature 1 source code file A the details of which are shown in FIG. 13.

FIG. 13 presents the source code file "BEEP.ASM", an assembly language source file with macro calls of the present invention emphasized. This file is used to illustrate the Configuration Display (FIG. 33A) and its position in the component source code library 1200 is show in Appendix A.

Figure 35:
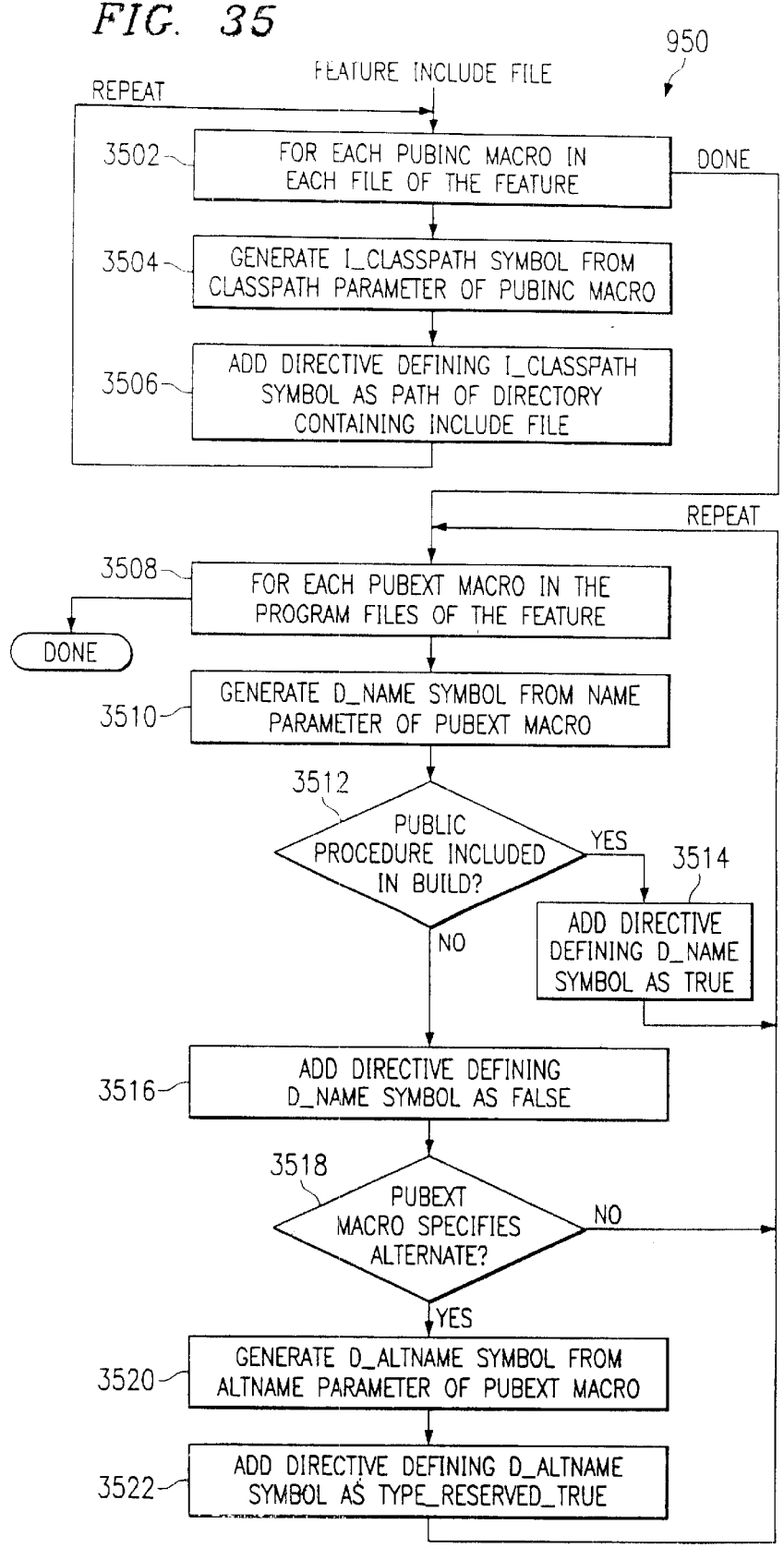
FIG. 35 is a block diagram of the build feature include file routine 950, also shown in FIG. 9A.

All source files used with the present invention should include "SYSTEM.INC" 1306, which includes other include files used by the present invention. Among other things, these include files contain the special macros that may be used to implement many aspects of the invention. All source files used with the present invention should also include "FEATURE.INC" 1308, the feature include file that is generated by Product Build Prepare (FIG. 9), which builds a feature include file for each feature (FIG. 35 Build A Feature Include File). The feature include file that was built by the present invention for feature BEEP, and would be included by BEEP.ASM, is shown in FIG. 23. As will be explained, the "FEATURE.INC" include file contains macro variables that control the code generated by the macros PUBEXT 1312 and EXTCALL 1318, which permits direct designer control over the linkup of procedures without changes to the source code.

Figure 36:
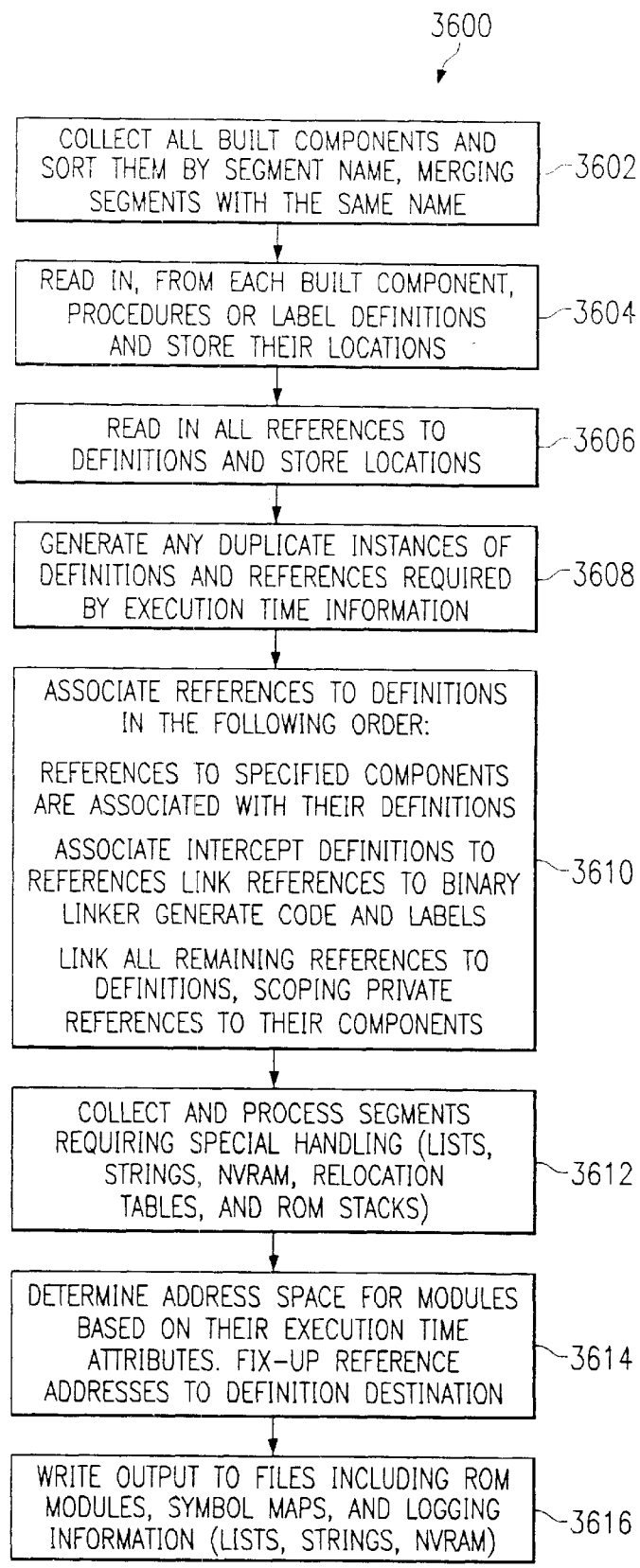
FIG. 36 presents a block diagram overview of the product component linker routine 3600 (FIG. 11)

The PUBEXT macro 1312 declares an external procedure DELAY in class TIMER with interface version 1.0. The macro name itself declares the procedure to be one that is defined by a PUBLIC_PROC macro that is contained within a separately linked component. These references are to be fixed up by the Product Component Linker (FIG. 36). The PUBEXT macro is described in Section 2.1 of the Line-by-line Description of Macros presented below.

The PUBLIC_PROC macro 1316 defines an external procedure ERRORBEEP in the class BEEP with an interface version 1.0. The macro name itself defines the procedure as able to be referenced in separately linked components that declare it with a PUBEXT macro. The PUBLIC_PROC macro is described in Section 3.1 of the Line-by-line Description of Macros. As will be explained, the class designation is replaced with an absolute library address by the macro prior to compilation or assembly.

The EXTCALL macro 1318 calls the external procedure DELAY assigned to the class TIMER using its declaration in the PUBEXT macro 1312. Since this procedure is defined in a seperately linked component, the reference to it will be fixed up by the Product Component Linker (FIG. 36). The EXTCALL macro is described in Section 1.1 of the Line-by-line Description of Macros.

The END_PROC macro 1320 ends the procedure opened by the PUBLIC_PROC macro 1316. It is described in Section 3.3 of the Line-by-line Description of Macros.

Each object, i.e. a component or feature, has a corresponding information file, which can be represented as a .INF file. The purpose of these information files is to include information required by the BIOS tools, or whatever tools for which the software product being developed is used, that cannot be derived from the tree structure or assembly file scan. A database update process scans these .INF files and the assembly files to gather information and place it into a centralized database.

A component information file (COMPNENT.INF) is included at every component tip. A feature information file (FEATURE.INF) is contained within each subdirectory of a component or feature directory. Since the COMPNENT.INF and FEATURE.INF files are virtually the same, the following description simply refers to them as INF files and only distinguishes between the two types where differences exist. In general, the information in the INF files includes the name of the object and associated libraries or binaries, free flowing descriptive information about the object, the class or subclass to which the object belongs, and option declarations.

Each of the INF files may include one or more commands. These commands preferably are not case sensitive and do not exceed a single line. In addition, it is preferable that only one command exists per line. Comments may be placed on any line by itself, or at the end of any command line by preceding it with an identifier, such as '//'.

The commands that may be used within the body of the INF files may be optional, required, or conditionally required. In addition, some commands may be for only a component information file or a feature information file. Among the optional commands is the BringUp command. This command is used to identify that the object should be included in a platform BIOS identified in the PLATFORM.CFG file as 'BringUp.' It is used to assist in quickly configuring a BIOS with the minimal objects needed to boot a motherboard. When this command is added to the PLATFORM.CFG file, only the objects required for booting a system to DOS will be installed in the BIOS.

The Class command is a conditionally required command. It provides the name of the class to which the object belongs. Only one class or subclass per INF file is allowed. An object's public procedures are referenced by their function name prefixed with their class.subclass[.subclass . . . ] path. A component is not required to declare a class. A feature, however, is required to declare a class or subclass if it's parent object declares a class or subclass. In other words, a Class command in a feature information file is conditionally required depending upon if it's parent object declares a class or subclass.

The Classification command applies to component information files only, but is required of all component information files. This command is used for specifying information that allows for sorting and classifying components using, for example, BIOS tools. The Classification command may include one or more field names, such as ComponentType, DeviceVendor, DeviceAlias, PartNumber, and Category.

The value of the ComponentType field name is either hardware or software and is always required in the Classification Command. The DeviceVendor field name defines the vendor and is only required and applicable to hardware component types. The DeviceAlias field name defines a commonly known nickname for the component type and is only optional and applicable to hardware component types. The PartNumber field name defines the component part number and is only required and applicable to hardware component types. The Category field name is used to define the category the device or software component fits into and is optional for both software and hardware component types.

A CompileUsing command is an optional command that identifies a custom compile command to be used in the component's MAKEFILE for the specified extension instead of the default command generated by COMPMAKE. This command includes three fields: Command, SourceExtension, and DestinationExtension. The Command field is, for example, a custom DOS command having parameters identifying where specific file information should be located and parameters for other control information. The SourceExtension field provides a file extension of the source code files that should be effected by the custom command. The DestinationExtension provides a file extension of the destination file being created by the custom command.

A CoreVersion command is a required command that identifies the core versions with which the object is compatible. This command may include one or more values, each representing a compatible core version.

A Description command is a required command and provides a text comment that may be used by high level interfaces to provide details regarding the component, feature or option being described. The description may be up to, for example, 512 characters in length.

A LinkUsing command is an optional command that identifies a custom Link command to be used in the component's MAKEFILE instead of the default command generated by COMPMAKE. Like the CompileUsing command, the LinkUsing command includes a Command field, a SourceExtension field and a DestinationExtension field, which provide the same function as described above.

A Name command is a required command and provides the name of the object. An identifier in the Name command, which specifies the name of the object, may be an alphanumeric string of, for example, 40 characters in length, and preferably does not begin with a number or include spaces.

An Option command is an optional command that declares a configurable option and gives it a default value. The designer can change the setting of the option using the PLATFORM.CFG file. This command supports a 'body' section for providing descriptive names of the option's supported values. These names may be used instead of numeric values for declaring the default value or changing the value in the PLATFORM.CFG file. The value name should be defined on a separate line. Exclusion of the body section indicates that only numeric values may be used for setting the value.

In addition to a name field defining the option name, there are several other fields in the Option command. A DefaultValueName field provides a valid 'value name' as defined in the body section and is required when value names have been defined in the body section of the command. A Default_numeric_value field provides a valid numeric value that preferably does not exceed the length specified. Numeric values may not be used as a default when enumerated names exist. A Size field specifies the size of the option space. A RomEditDescription field is an option description string that is save in ROM if 'Romedit' is chosen by the designer in the PLATFORM.CFG file. A ValueName field is a descriptive name that may be used in place of a numeric value when setting the option's value. A Value field represents the specific numeric value to associate with the ValueName. A ValueDescription field provides a textual description of the value's meaning.

An Owner command is a required command that provides a company name of the object owner. This command is used for filtering a customer's components when releasing or replicating core trees to customer sites.

A PlatformType command is an optional command that describes when an object should be included in a build by default based on the PLATFORM.CFG file's identification of platform type. This command includes a one or more PlatformType fields, each having a corresponding Usage field. The PlatformType field can be, for example, BasicPC, Desktop, Server, Notebook, PICO or AllOthers.

The Usage field is used to describe the conditions for including an object in a build. If it is 'Recommended', an object is brought in by default, but the designer may manually remove the recommended object from the build. If it is 'Test', an object will be included in the build by default for testing purposes, but will be excluded from a product release. 'OnDemand' an object is automatically brought in when needed to resolve hard external references. For 'Explicit', an object is prevented from being included in a build for the associated PlatformType unless it is explicitly added in the PLATFORM.CFG file. 'External Trigger' identifies the name of a Class.SubClass that will trigger an object to be included in a build A class may combine 'External Trigger' with 'OnDemand' or 'Recommended' for a single platform type. Any other combination of Usage fields for a single platform type, however, is not allowed and will cause a validation failure. Furthermore, only one object for a single class may declare itself OnDemand, Recommended or Externally Triggered within the core files. Otherwise, having more than one default resolution to a dependency will result in a validation failure. Within a single component, only one feature of a specific subclass may declare itself OnDemand, Recommended or Externally Triggered. Having more than one may result in multiple resolutions to a dependency causing a validation failure.

A ShieldPrivates command is an optional command that protects an object's private procedures from being accessed by its sibling objects. This command is useful for objects that are used as repositories of miscellaneous objects that are not functionally related.

A SubClass command is a conditionally required command that provides the name of a subclass to which a feature belongs. Each INF file is allowed only one class or subclass. An object's public procedures are referenced by their function name prefixed with their class.subclass path. As described above with respect to the Class command, a component is not required to declare a class, but a feature is required to declare a class or subclass if it's parent object declares a class or subclass A Target command is an optional command applicable to component information files only. This command provides the name of a library or binary that should result from building the particular component. The Target command includes a TargetName field and a TypeKey field. the TargetName field defines a character file name. The TypeKey field is a four character code used to identify files of non-standard types. This code is used by the BIOSMAKE utilities for fixup of dispatch tables referencing these files.

A Uses command is an optional command that is used to identify the location of shared code used by an object being described. The build tools may use this command to identify the file as a dependency in the MAKEFILE created for the object. Use of shared files is restricted. In particular, objects may only use files that identify themselves as shared using, for example, a PRIVATE_PROC or PRIVATE_INCLUDE command with the 'Shared' attribute. In addition, an object may only use shared source files that are in sibling directories, or immediate children of upstream directory nodes. The Uses command includes a FilePath field that provides the relative path and filename of the shared file to be used by the object.

FIG. 14 presents the component information file for class CORE 1406 shown at path C:\BIOS\CORE\COMPNENT.INF in Appendix A. This is the component that contains feature BEEP (FIG. 16), which contains the source code file BEEP.ASM (FIG. 13). This part of the present invention contains commands describing the component and commands used in the configuration of the component (FIG. 15).

The BRINGUP command 1412 indicates that this component should be included as part of the configuration when a customer using the present invention begins to build a new BIOS with minimal functionality to get started quickly.

The PLATFORMTYPE command 1424 indicates that this component may be used when building a product that will run on an IA32 architecture. The ALLOTHERS command 1428 indicates that this component is RECOMMENDED for all platform types that were not explicitly specified in the PLATFORMTYPE command 1424. This CORE 1406 component will be included in all configurations produced by the present invention that run on an IA32 architecture unless it is explicitly forced out.

FIG. 15 shows those commands in a component information file of the present invention that are used in the configuration of the component. Names in bold are keywords, and names not in bold are specified by the designer. The characters "//" indicate that the rest of the line is a comment. All commands residing between the braces { } of a command are considered within the scope of the command.

The PLATFORMTYPE command 1506 specifies the rules under which the component will be included in the configuration. The rules apply to a configuration for a specific PlatformType such as "DeskTop" or "NoteBook" or to any PlatformType not explicitly mentioned (ALLOTHERS). The rules 1516 include RECOMMENDED: include component unless explicitly forced out of the configuration, ONDEMAND: include component if a procedure in the component is referenced by another component already in the configuration, EXPLICIT: include component only if explicitly forced into the configuration, and EXTERNALTRIGGER: include this component if the component or feature specified by the ClassPath is in the configuration.

The OPTION command 1522 defines the name and default value of an option that may be used in the source code files comprising a component. It may also define the names of acceptable values for the option that may be specified in the product configuration (FIG. 22)

FIG. 16 presents the feature information file for class BEEP 1602 shown at path C:\BIOS\CORE\BEEP\FEATURE.INF in Appendix A. This is the feature which contains the source code file BEEP.ASM (FIG. 13). This part of the present invention contains commands describing the feature and commands used in the configuration of the feature (FIG. 17).

The BRINGUP command 1612 indicates that this feature should be included as part of the configuration when a customer using the present invention begins to build a new BIOS with minimal functionality to get started quickly.

The PLATFORMTYPE command 1616 indicates that this feature may be used when building a product that will run on an IA32 architecture. The ALLOTHERS command 1620 indicates that this feature is RECOMMENDED for all platform types that were not explicitly specified in the PLATFORMTYPE command 1616. This BEEP 1602 feature will be included in all configurations produced by the present invention that run on an IA32 architecture and include the CORE component unless it is explicitly forced out.

FIG. 17 shows those commands in a feature information file of the present invention that are used in the configuration of the feature. Names in bold are keywords, and names not in bold are specified by the designer. The characters "//" indicate that the rest of the line is a comment. All commands residing between the braces { } of a command are considered within the scope of the command.

The PLATFORMTYPE command 1706 specifies the rules under which the feature will be included in the configuration. The rules apply to a configuration for a specific PlatformType such as DeskTop or NoteBook or to any PlatformType not explicitly mentioned (ALLOTHERS). The rules include RECOMMENDED: include feature unless explicitly forced out of the configuration, ONDEMAND: include feature if a procedure in the feature is referenced by another component already in the configuration, EXPLICIT: include feature only if explicitly forced into the configuration, and EXTERNALTRIGGER: include this feature if the component or feature specified by the ClassPath is in the configuration.

The OPTION command 1721 defines the name and default value of a manifest constant that may be used in the source code files of the feature. It may also define the names of acceptable values for the option that may be specified in the product configuration (FIG. 22)

The PLATFORM.CFG file is a text file that specifies the customizations to a build and contains statements which direct the build. It is in the PLATFORM.CFG file that OEMs may include information to identify OEM features, OEM hooks, and OEM file overrides. Also, although the PLATFORM.CFG file is maintained by the user interface 200, it is an editable file that allows the designer to explicitly state configuration parameters.

The PLATFORM.CFG file includes a minimal description of the BIOS. Based on this information, the configurator 700 can derive a more comprehensive description of the BIOS configuration. For example, if a designer explicitly declares that a component should be included in the build, the configurator 700 can determine that another component or feature should also be included in the BIOS, even if it has not been explicitly declared within the PLATFORM.CFG file.

There are several commands associated with the PLATFORM.CFG file. A BuildOption command specifies information that is specific to the build of a particular software product. The commands within the body of the BuildOption command specify the details of the information to be stored. These commands include Type, which specifies the type of build option, Name, which specifies the name of the item to which the build option is being applied, and Value, which specifies a value to which the item is being set.

A BringUpBios command is used to indicate a special configuration override. This special override instructs the configurator 700 to build a minimal BIOS containing only the minimal set of elements needed to bring up the minimal BIOS. The BringUpBios command may only appear once in the PLATFORM.CFG file.

A Classification command specifies platform specific information. This information can define a name or value to a series of platform specific data, including a vendor name, an alias, a platform number, a revision or version number, and a category.

A Component command specifies the addition, configuration or removal of any component from the build, regardless of the intended platform type. A component's configuration is defined by Features, Options, SystemOptions, Files and OverrideFiles that are specified within the Component command. When brought in by default based on the designated platform type, the component is not listed in the PLATFORM.CFG file.

The Component command preferably includes a ForceFlag. This flag specifies whether or not a component is forced into a build, forced out of a build, or set to use the default build inclusion dependencies and triggers. When the flag is set to ForceIn, it will be merged with any exiting default definitions for the component. When a component is set to NoForce, it will revert to its default state, meaning it will depend on other dependency and trigger selections. When a component is set to ForceOut, it is expressly not included in the build.

Each Component command also includes a name of a component to be brought into the system. The name used in the command is derived from the named component's .INF file. Since each component preferably has a unique name, there should be no ambiguity in the component named in the Component command.

All commands residing within a Component command's braces, which delineate what is included in the Component command, are considered within the scope of the named component. Examples of these commands include the Feature, Option, and SystemOption commands. The components themselves may not be placed inside other components. In addition, the Component command can only appear once for each unique component. In other words, there cannot be two or more Component commands describing the same component.

A Feature command allows the addition, configuration and removal of a feature within a given component. The feature named in the command must be valid for the component within which it resides. Like a component, a feature's configuration is defined by Features, Options, SystemOptions, Files and OverrideFiles that are specified within the Feature command. Furthermore, like the Component command, the Feature command includes a ForceFlag that specifies whether a feature is forced into a build, forced out of a build, or set to use the default build inclusion dependencies and triggers.

Although all features must reside within a component definition, features may be defined within the definition of another feature. When a feature is specified inside another feature, the internal feature becomes the child feature and the external one becomes the parent feature. All commands within a feature are considered within the scope of that feature and also within the scope of the component under which the feature is defined. Examples of commands or statements that can be placed inside a feature's braces, which delineate what is included in the Feature command, include Feature, Option, SystemOption, File and OverrideFile.

A File command allows an additional file to be included within a build. This command may only be used within the scope of a component or feature. Parameters included in the File command include a FileName and a FilePath. The FileName defines the name of the file to be brought into a build. The FilePath provides for the relative physical location of a file to be brought into a build.

An Option command specifies the setting of an option that will be used to generate component and feature include files. The Option command may only be used within the scope of a component or feature. Parameters included in the Option command include a Name, a Value, a RomEditFlag, and a Description. The Name parameter defines the name of an option to change. The Value parameter sets forth any valid value as defined by the option in the .INF file. The RomEditFlag parameter is a Boolean value, which sets forth whether or not a RomEdit is enabled for the option. The Description parameter is an option parameter that provides a description of the option that may be displayed in the RomEdit utility.

An OverrideFile command overrides a component file. A file version allows a warning to be displayed to a designer if the override is stale. This command may only be used within the scope of a component or feature. The name of the new overriding file must be identical to the file being overridden. The parameters in the OverrideFile command include a FileName, which provides the name of the override file, a NewPath, which provides the relative physical path of the override file, and an OriginalVersion, which provides a version of the original file.

A PlatformType command specifies a type of platform for the build. This command is used to bring in default components and features based on the specified platform type. Only one PlatformType command may be used in the PLATFORM.CFG file. Parameters in the PlatformType command include a Name, which defines the name of the platform, and an Architecture, which is determined by the CPU and instruction set and specifies a group of systems that will execute the same code. The Architecture parameter may be, for example, IA32 for the IA-32 instruction set architecture or IA64 for the IA-64 instruction set architecture.

A SystemOption command is used to establish an option that is visible across the entire scope of the build description. Predefined options may be set and reset at different levels of processing, such as a global level, a component level, or feature level. Parameters in the SystemOption command include a Name and a Value. The Name parameter gives the name of the SystemOption to be associated with the build description. The name must be one of a set of pre-defined Options. The Value parameter sets forth a value to associate with the named SystemOption.

Figure 18:
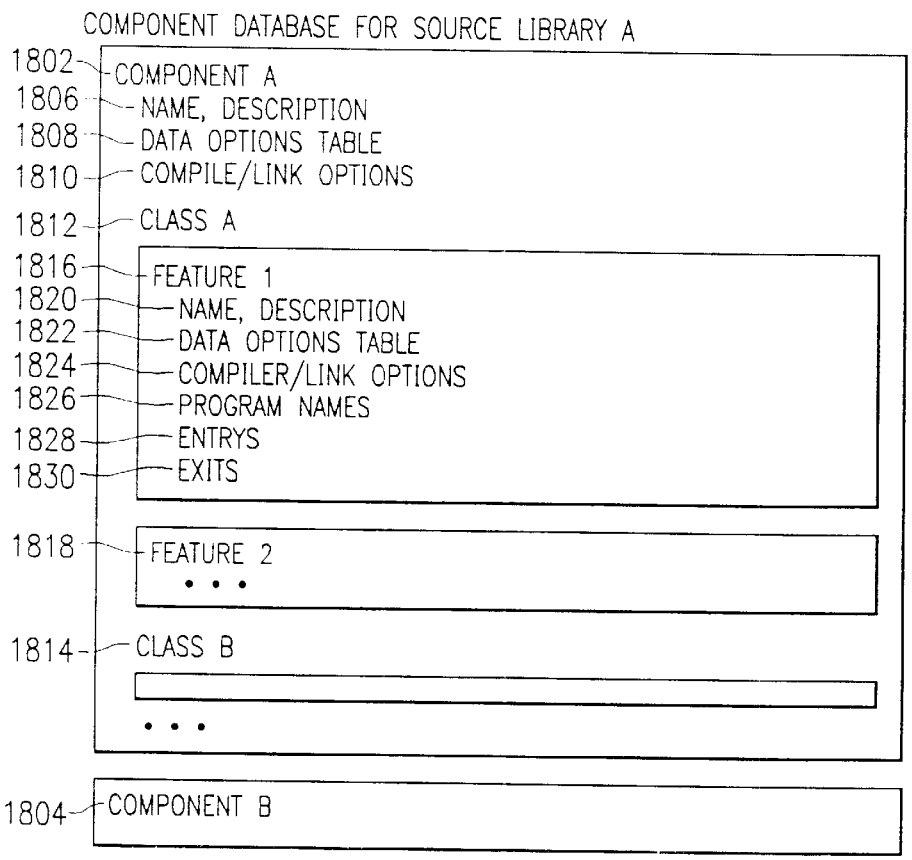
FIG. 18 illustrates an outline of the contents of the component database 1800 shown in FIG. 11.

FIG. 18 presents symbolically a representation of the component database 1800 for a source library A. The data for each component is shown contained within a rectangle. Two components, component A 1802 and component B 1804, are shown, with others assumedly also present but mmitted for clarity and simplicity. Only the details of the data for the component A 1802 is shown.

Each component has a name and a description (line 1806). Each component has a data options table, which is a table that lists all the user-settable options 1808 that affect source code filess within this component. These options are adjusted through use of the user interface (see FIG. 33E, for example), and the option values are actually loaded into the binary image by the product component linker 3600 (FIG. 36) as part of the "fix-up" process when the linker 3600 builds te finished product 1106. Any compilation, assembly, and link options 1810 that are specified for a component are present.

A component may be assigned to a class by its "component.inf" file if its directory contains source code files, but the present practice with the preferred embodiment is to place source code files into feature subdirectories and to have each feature assigned to a class by its "feature.inf" file. Accordingly, every feature is definitely assigned to a class. The several features may therefore be organized by class within the database, as shown. Two classes, class A 1812 and class B 1814, are shown. Within the class A 1812 are two features, feature 1 1816 and feature 2 1818 (no details are shown for feature 2). Presumably, any normal system could have many features, as well as sub-features, etc. The featre 1 1816 has a name and description 1820, a data options table 1822 (essentially the same as that for the component but applicable to the feature source code files), compiler and link options 1824 (if the feature source code files are separately compiled, assembled, and/or linked), the names of the feature source code files 1826, and a complete list of the entrys into 1828 and the exits from 1830 those source code files—elsewhere, more precisely, called interfaces and dependencies.

FIGS. 19 and 20 are symbolic representations of the data structures contained within the configuration state data 1900, organized similarly to the database shown in FIG. 18. Three components—component A 1902, component B 1904, an component C 1906 are shown, each provided with a "select" or "unselect" flag symbolically represented by a voting square with or without an "X" to indicate whether a given component is selected or not selected for inclusion in the finished product 1106. The flags 1922 and 1930 for the components A and B are shown with "X"s indicating that these components are currently part of the finished product 1106. The flag 1928 for the component B is shown without an "X", indicating that either by default, or because of system designer intervention, this component has not been selected. The component A has a name and description 1908, and it has two features, feature 1 1910 whose flag 1924 indicates it has not been selected and feature 2 1912 whose flag 1926 indicates (by an "X") that it has been selected. Feature 1 1910 is shown as having a class assignment 1914, source code files assigned to it 1916, definitions of options 1917, and references 1919—dependencies and interfaces. (A more detailed view of the structure of this data within RAM is presented in FIG. 32 below, which was described above.)

FIG. 19 simply illustrates that selected components and features data 2000 are taken from the from the configuration state data and passed on to the product make routine 900 when a finished product 1106 is created. As shown, the global constants for the options are passed along to be used as part of the "fix-up" data that is applied to the finished product 1106 by the product component linker 3600. The selected components A 2002 and C 2004 are passed along, together with feature data for each feature selected that is part of a component that was selected. The selected feature 2 2006 corresponds to the feature 2 1912 in FIG. 19 whose selection flag 1926 was set. This feature 2 2006 is accompanied by the names of its source code files 2998 as well as the exits 2008 from those source code files and other dependencies and interfaces, as well as feature-specific constants 2012 to be assigned to feature-specific options.

FIG. 21 presents the Product Configuration Data for a DeskTop platform 2102 shown at path C:\BIOS\DEVREF\INTEL\440BX\PLATFORM.CFG in Appendix A. This is the configuration that contains component CORE (FIG. 14). This part of the present invention contains commands used in the configuration of the product (FIG. 22).

The PLATFORMTYPE command 2102 indicates that this configuration is for a PlatformType "DeskTop" that runs on an IA32 architecture. All components that contain a PlatformType(IA32) command in their component information file that specify DeskTop(Rule) or AllOthers(Rule) will be considered for inclusion in the configuration according to their Rule. Similarly, all features of components considered for inclusion that contain a PlatformType(IA32) command in their feature information file that specify DeskTop(Rule) or AllOthers(Rule) will be considered for inclusion in the configuration according to their Rule.

The COMPONENT command 2104 allows an additional source file to be configured for component PNP.

The FILE command 2108 allows an additional source code file, MYFILE.ASM from directory \DEVREF\INTEL\440BX in the current component source code library, to be included as part of component PNP in the configuration.

FIG. 22 shows a list of the possible commands in a platform configuration file of the present invention. Names in bold are keywords, and names not in bold are specified by the designer. The characters "//" indicate that the rest of the line is a comment. All commands residing between the braces { } of a command are considered within the scope of the command.

The SYSTEMOPTION command 2202 is used to establish an option name and value that is usable in any source code file in the product configuration. The FEATURE command 2216 allows the addition, removal, or configuration of a feature within a given component. A features configuration 2212 is defined by the present invention as those Feature, Option, SystemOption, File and OverrideFile commands that are defined within the opening and closing braces { } of that feature.

The OVERRIDEFILE command 2216 is used within a component or feature command to override a file of that component or feature by instead using the specified newpath. The OPTION command 2218 is used within a component or feature command to specify the name and new value of an option defined in that component or feature information file. The new value of the option will appear in the feature include files generated for that component or feature.

FIG. 23 presents the Feature Include File shown at path C:\BIOS\CORE\BEEP\FEATURE.INC in Appendix A. This is the Feature Include File that is included when the source code file BEEP.ASM (FIG. 13) is assembled. The D_TIMER_DELAY variable is the defineName that the macros PUBEXT 1312 (Section 2.1 of the Line-by-Line Description of Macros) and EXTCALL 1318 (Section 1.1 of the Line-by-Line Description of Macros) in FIG. 13 are expecting.

FIG. 24 presents the component makefile for component CORE shown at path C:\BIOS\CORE\MAKEFILE in Appendix A that was generated by the present invention. Component CORE (FIG. 14) contains feature BEEP (FIG. 16) that contains the source code file BEEP.ASM (FIG. 13). A makefile, so called because the make program has historically looked in the current working directory for a file named MAKEFILE by default, contains commands that are interpreted by the make program.

EXTASMS 2404 is defined as a macro that contains the path of each external assembly source file to be assembled. The backslash \ at the end of each line indicates continuation. Generic rule 2436 specifies the assembler command line necessary to convert any file with a ASM extension into the same file with a. OBJ extension. The COMPONENT_NAME rule 2440 specifies the linker command line that will link the component from the object files produced from all the assembly source files defined by the macros EXTASMS and ASMS. As a side effect, it causes object files that do not exist to be generated from assembly source using the generic rule 2436. The CLEAN rule 2456 must be explicitly specified on the make program command line (FIG. 25). It deletes the files generated by the CORE component makefile so that the next time the CORE component makefile is interpreted, all the files will be regenerated.

FIG. 25 presents the product makefile generated by the present invention and used to build the product containing the component CORE (FIG. 24). The BIOS.ROM rule 2502 goes to the directory containing each component in the configuration and runs the NMAKER make utility program to interpret the component makefile generated in that directory by the present invention. This will produce a linked set of object files, "*.exe" files, for each component. These linked files may then be merged into a single ROM image executable file by the product component linker "BINLINK" 3600 (FIG. 36).

The CLEAN rule 2532 goes to the directory containing each component in the configuration and runs the CLEAN rule of each component makefile (FIG. 24), then goes to the directory containing the platform configuration file and cleans up the files generated in the build process so all the files will be regererated by the next build.

Figure 26:
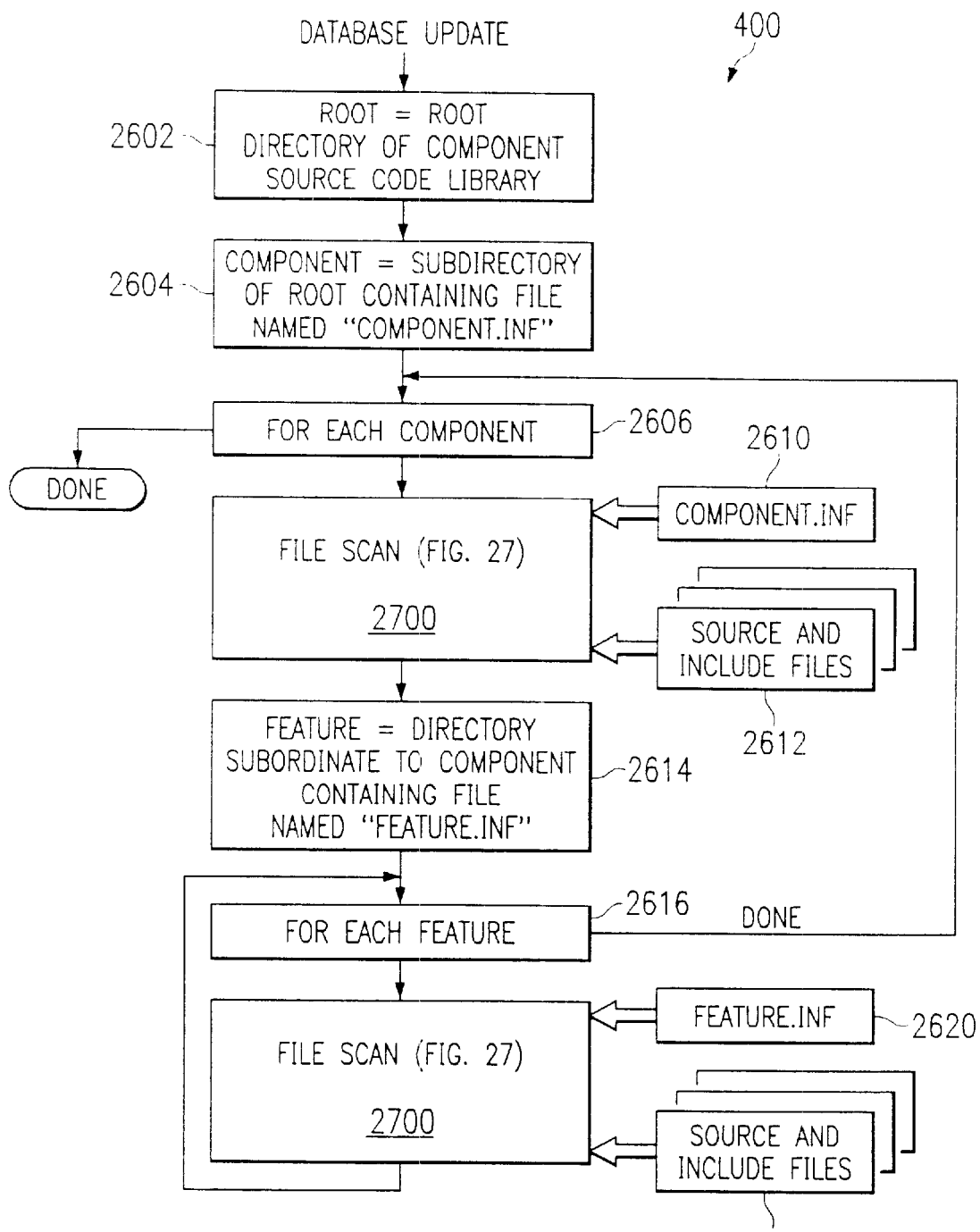
FIG. 26 is a block diagram of the database update routine 400, also shown in FIG. 4.

FIG. 26 illustrates the database update routine 400 that scans the component source code library 1200. The search begins 2602 in the root directory of the component source code library 1200 looking for components, which are subdirectories of the root directory containing a component information file named "COMPNENT.INF" 2604. For each component 2606, the file scan routine 2700 is called upon to scan the component information file 2610 and any source or include files 2612 that may be in the component directory. The search then continues in the component directory looking for features of the component, which are directories subordinate to the component directory containing a feature information file named "FEATURE.INF" 2614. For each feature 2616, the file scan routine 2700 is called upon to scan the feature information file 2620 and the source and include files in the feature directory 2622.

Figure 27:
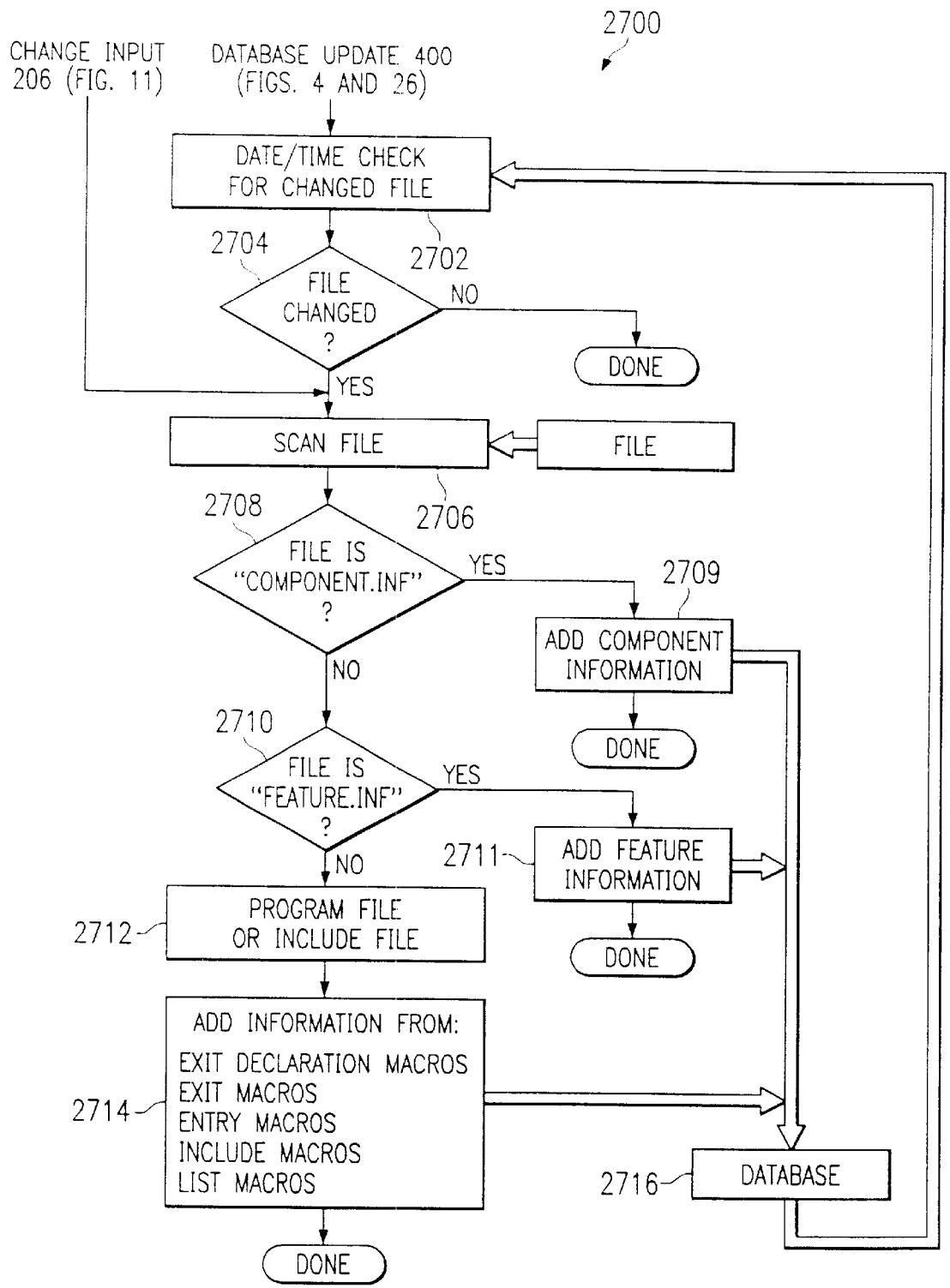
FIG. 27 is a block diagram revealing the details of the feature and component file scan routine 2700 shown in FIG. 26 (called by steps in FIGS. 4, 11, and 26)

FIG. 27 shows the file scan routine 2700. When called upon by the database update routine (FIG. 26) to scan a file, the file scan routine obtains the date and time the file to be scanned was last modified from the database 2716 and compares it to the date and time last modified from the file itself 2702. If the file has not changed, the database is not updated 2704. If the file has changed or the file scan routine was called upon by the change input routine 206 (FIG. 11), the file is scanned 2706. If the file is a component information file, named "COMPNENT.INF" 2708, the component information 2709 is added to the database 2716. If the file is a feature information file, named "FEATURE.INF" 2710, the feature information 2711 is added to the database 2716. Otherwise, the file is a source or include file 2712. Add information from the parameters of any exit declaration macros, entry macros, include macros and list macros in the file 2714 are added to the database 2716.

Figure 28:
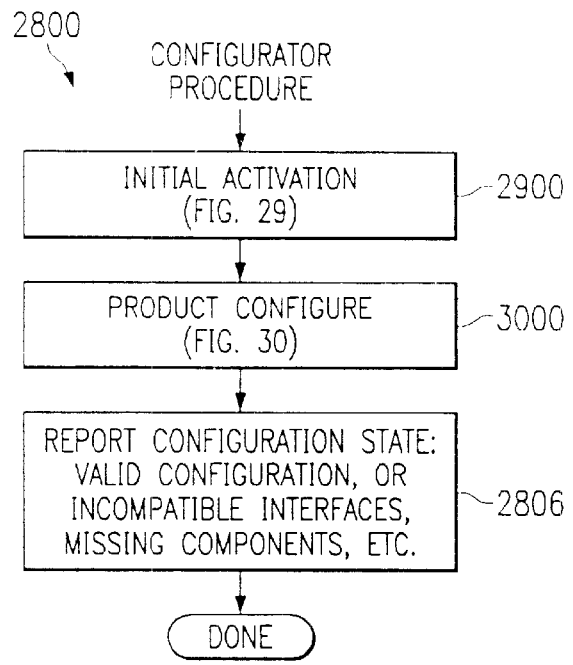
FIG. 28 is a block diagram of the configurator procedure 2800 shown in FIG. 11, also shown in FIG. 7.
Figure 29:
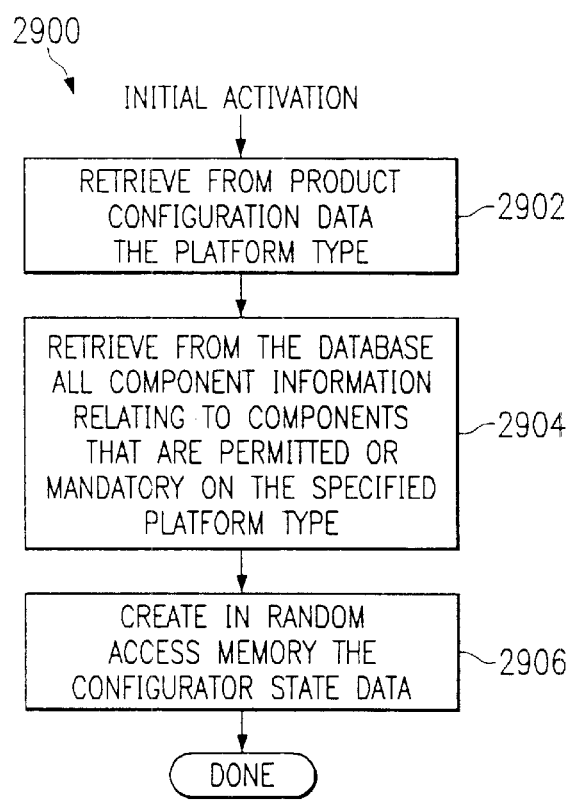
FIG. 29 is a block diagram of the initial activation routine 2900 portion of the configurator procedure 2800 (FIG. 28)

FIG. 28 shows the general flow of the configurator procedure 2800, beginning with initial activation 2900 (FIG.

29), continuing through product configure 3000 (FIG. 30) and ending with a report of the configuration state 2806 indicating a valid configuration (FIG. 33A) or incompatible interfaces, missing components and so on (FIG. 33B).

The initial activation 2900 of the configurator procedure 2800 begins by retrieving from product configuration data 2100 the platform type 2102. It then reads 604 from the database 1800 all component information relating to components that are permitted or mandatory on the specified platform type and creates the product configurator state data 1900 in random access memory. The product configurator state data 1900 includes the source files of each feature and the parameters of each PUBLIC_PROC macro and PUBEXT macro in those source files. As each feature is activated (3004, 3008, 3010, 3014) by the product configure routine 3000, the procedure referenced by each PUBEXT macro in its source files are added to a list of unresolved references. The product configure routine 3000 proceeds with the following steps, taking care 3002 not to activate any object that has been specified force out (3335, 2204, 2210, 2208).

Figure 31:
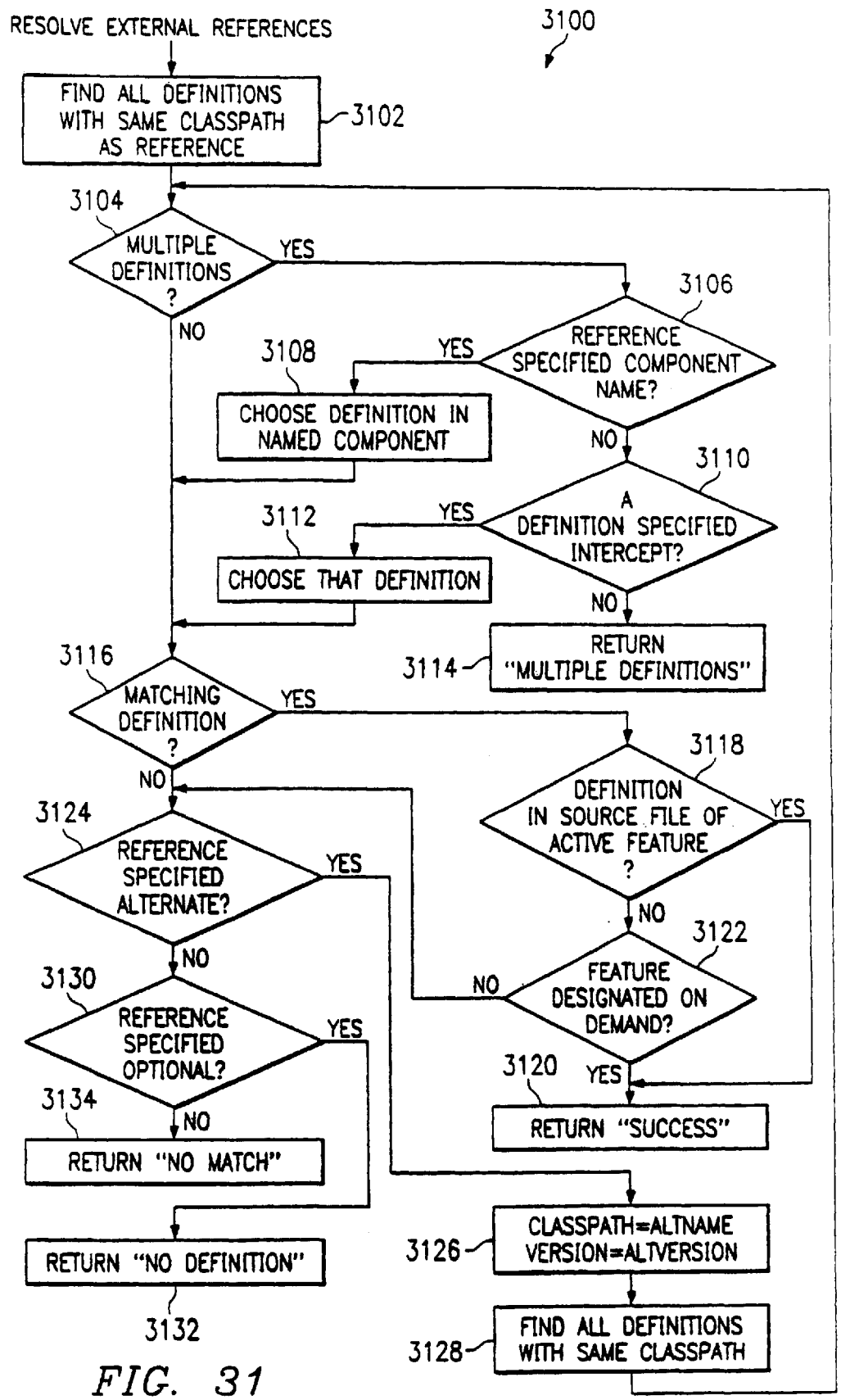
FIG. 31 is a block diagram of the resolve external references routine 3100 within the product configure routine 3000 (FIG. 30) of the configurator procedure 2800 (FIG. 28)

At step A 3004, all objects (component or feature) are set in the product configurator state data 1900 that have been specified force in (3333, 2204, 2210, 2208) and their parents to active state. At step B 3006, all recommended component objects (1510, 1514, 1516) are set in the product configurator state data 1900 to active state. At step C 3008, for all active objects in the product configurator state data 1900, all recommended children (1710, 1714, 1716) are set to active state and repeat. At step D 3010, for each component object or child of an active object that has a class specified as an external trigger (1518, 1718), if an object of that class is active in the product configurator state data 1900, the externally triggered object is set to an active state. At step E 3100, external references (FIG. 31) are resolved and a list of unresolved references and mismatched versions of resolved references is maintained. At step F 3014, until no further objects can be set active or no references are left unresolved, if a feature resolves an unresolved reference and is on demand (1716) and all parent objects are active or on demand (1516, 1716), then the object and all parent objects in the product configurator state data 1900 are set to active state and steps C, D, and E are repeated.

The resolve external references routine 3100 takes a procedure reference that was declared by a PUBEXT macro (Section 2.1 of the Line-by-Line Description of Macros) from a list of unresolved references and finds all the procedures defined 3102 by PUBLIC_PROC macros (Section 3.1 of the Line-by-Line Description of Macros) that have a matching name. The name parameter of the PUBEXT macro and the procedurename parameter of the PUBLIC_PROC macro that matched are both class paths consisting of a class name, zero or more subclass names and the actual procedure name seperated by periods. The class path serves to identify a specific procedure in a hierarchy of components, features and subfeatures that is independent of the location of the source file containing its definition within the component source code library 1200. The class path does not conflict with procedures in other components that have the same name because they would have a different class path. If there are multiple definitions with the same class path 3104, then if the PUBEXT macro of the definition specified a component name 3106, it chooses the definition in the named component 3108. Also, if the PUBLIC_PROC macro of a definition specified the INTERCEPT keyword 3110, it chooses that definition 3112. Otherwise, it removes the reference from the list of unresolved references and returns an indication that multiple definitions were found 3114. If a matching definition was found 3116 and the definition is in a source file of an active feature 3118 or an inactive feature 3122 designated on demand (1716), the reference is removed from the list of unresolved references and success is returned 3120. If the PUBEXT macro of the reference specified the ALTERNATE keyword 3124, the class path specified by the altname parameter 3126 is used and tried again 3128. If the PUBEXT macro of the reference specifies the OPTIONAL keyword 3130, no definition is necessary, and the reference is removed from the list of unresolved references and no definition is returned 3132. Otherwise, the reference is removed from the list of unresolved references and no match is returned 3134.

FIG. 32 is discussed above in the context of FIG. 11.

FIG. 33A presents the view that a designer would see while using the present invention to modify source file WORKADDR.ASM 3302 in the "Decompress Manager" feature 3304 of the "POST Services" component 3306 of a "Desktop" platform for the IA32 architecture 3308. This is a logical view of a component source code library (FIG. 12) using icons described in FIG. 33F to show components and features as opposed to a physical view of the component source code library showing the directory heirarchy. The icons show that the "Fdisk" 3310 and "kcManager" 3312 components have been forced out of the build while components "Intel371ab" 3314 and "Intel440BX" 3316 have been forced into the build.

FIG. 33B presents a logical view of the same component source code library as in FIG. 33A that a designer would see while using the present invention with component "Fdisk" 3310 no longer forced out of the build. The icons (described in FIG. 33F) indicate that component "Fdisk" 3310, feature "ata" 3318 and file "FDSKINIT.ASM" 3320 have errors and that the public functional dependencies for function "protocolTable" in class "fdisk" 3322 and function "SendE01" in class "pic" 3324 have errors.

FIG. 33C presents a logical view of another part of the component source code library shown in FIGS. 33A and 33B using icons described in FIG. 33F. This logical view shows what a system designer using the present invention would see by right clicking the override file "EARLYCFG.ASM" 3326 in feature "Memory Configuration" 3328 of component "Intel440BX" 3330. It also shows that file "oemfile.asm" 3332 is a custom file that would have been added using the "Add Custom File" line of the window of the present invention shown if FIG. 33D.

FIG. 33D presents a logical view of part of the component source code library shown in FIG. 33A using icons described in FIG. 33F. This logical view shows what a system designer using the present invention would see by right clicking component "Fdisk" 3310 that has been forced out of the build.

Figure 33E:
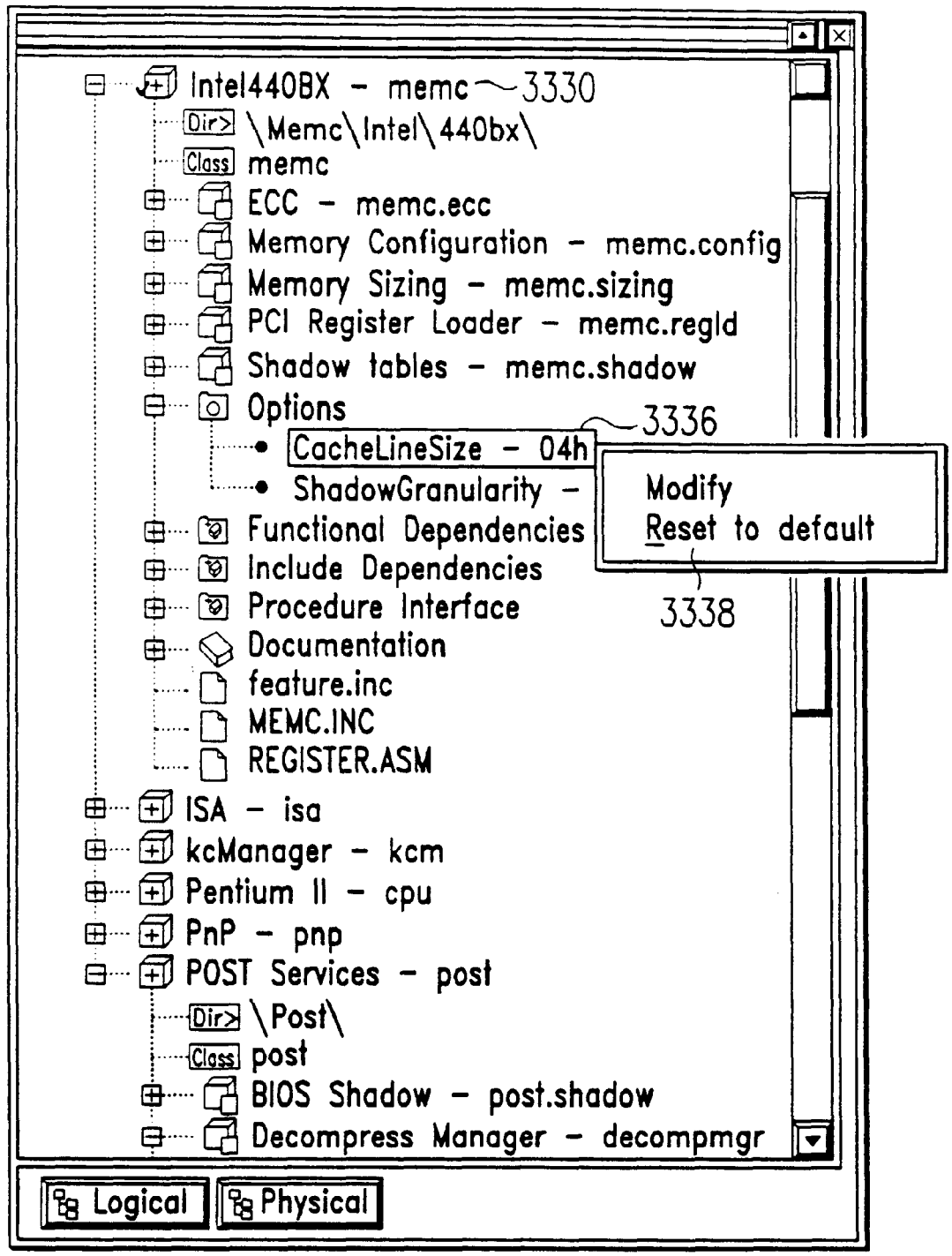
FIG. 33E illustrates how a system designer adjusts an option using the graphical user interface.

FIG. 33E presents a logical view of a different part of the component source code library shown in FIG. 33B using icons described in FIG. 33F. This logical view shows what a system designer using the present invention would see by right clicking the "CacheLineSize" option 3336 in component "Intel440BX" 3330. The "CacheLineSize" option currently has the value 04 hex. This window allows the system designer to modify the current value or reset it to the default value specified in the component information file.

FIG. 33F presents the icons that appear in a logical view of a component source code library of the present invention as shown in FIGS. 33A through 33D. Each icon represents a different element of the logical view and has a lighter color when the element is not included in the BIOS configuration. The icons for components and features that were forced into the configuration show a check mark while the icons for components and features forced out of the configuration have a lighter color and show a circle with a slash through it. Elements that have errors show an icon with an x, and elements that have warnings show an icon with a triangle containing an exclamation point.

Figure 34:
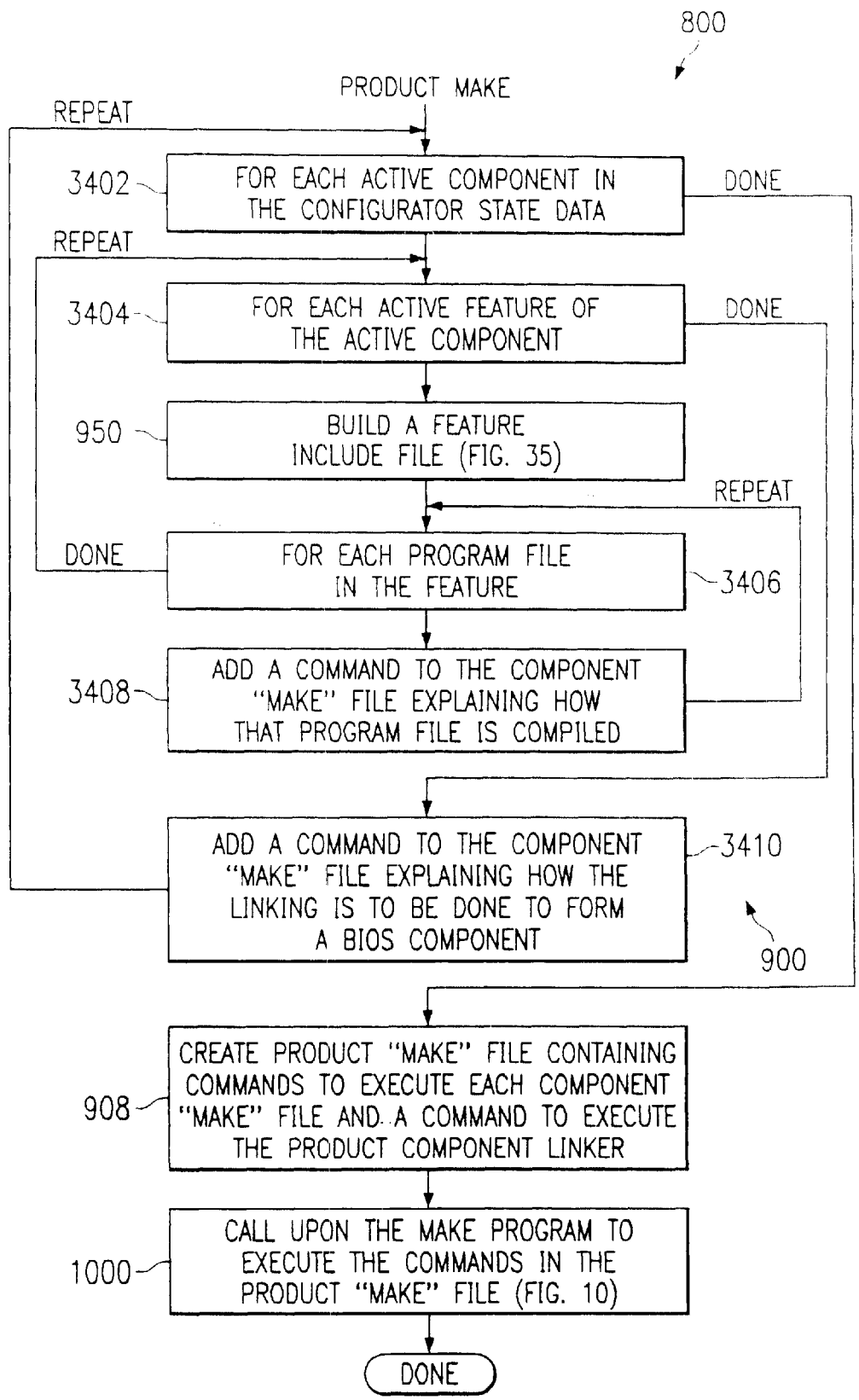
FIG. 34 is an overview block diagram of the product make routine 800 (FIG. 11), also shown in FIG. 8.

FIG. 34 shows the product make routine 800. For each active component 3402 in the product configurator state data 1900, for each active feature of the active component 3404, the routine builds a feature include file 950 (FIG. 35), then, for each source code file in the current feature 3406, it adds a command to the component "make" file of the current component 3408 explaining how that source code file is to be compiled. When all active features of the current component have been processed, a command is added to the component "make" file of the current component 3410 explaining how the linking is to be done to form a BIOS component. When all active components have been processed, a product "make" file (FIG. 10) is created containing commands to execute each component "make" file plus a command to execute the product component linker 908. The make utility program is then called upon to execute the commands in the product "make" file 1000.

FIG. 35 shows the build feature include file routine 950. For each PUBINC macro (Section 6.2 in the Line-by-Line Description of Macros) in each file of the feature 3502, the routine generates an I_CLASSPATH symbol from its classpath parameter 3504, then adds an assembler statement defining the I_CLASSPATH symbol as the path of the directory containing the include file 3506. If the classpath parameter of the PUBINC macro is "post.dispatcher," for example, then the PUBINC macro will expect the I_CLASSPATH symbol named I_POST_DISPATCHER to be defined. When all the PUBINC macros have been processed, for each PUBEXT macro in each file of the feature 3508, the routine generates a D_NAME symbol from the name parameter. If the public procedure specified by the name parameter was included in the build, the routine adds an assembler statement defining the D_NAME symbol as TRUE 3514 (FIG. 23), or else adds an assembler statement defining the D_NAME symbol as FALSE and, if the PUBEXT macro specifies the ALTERNATE keyword, generates a D_ALTNAME symbol from the altname parameter of the PUBEXT macro and adds an assembler statement defining the D_ALTNAME symbol as TYPE_RESERVED_TRUE. If the name (or altname) parameter of the PUBEXT macro is "timer.delay" 1312, for example, then the PUBEXT macro will expect the D_NAME (or D_ALTNAME) symbol named D_TIMER_DELAY to be defined.

FIG. 36 presents a flow diagram of the product component linker 3600, a routine assigned the symbolic name "bin_link". It accepts as input data the "*.exe" executable binary files that are generated when the regular linker(s) is (are) called upon to link togenter the "*.obj" object code files produced by the compiler(s) and assembler(s). It also accepts as input the "*.map" files, also generated by the regular linker(s), and learns from them the names of the code segments generated and where they reside within the "*.exe" files. It also receives, directly from the designer, one or more script command files "bios.scr" which contain directives on how it is to proceed with the different executables—in what order are the segments to occupy the final ROM image, the assignment of absolute addresses to some segments, etc. In the preferred embodiment, product component linker "BIN-LINK" 3600 (FIG. 36), after fixing up the addressing, etc. in all of the executable images and after combining together the pieces of the various named segments extracted from the executables, does not stitch the executables together to form a unified ROM image and peform such tasks as compressing executable images and duplicating images where necessary. These tasks are performed by a routine named "rom_image," which receives the output file "bios.scr" from "bin_link" and then performs these final tasks, as well as the tasks of integrating sound and image files into the actual final ROMable image.

Figure 37:
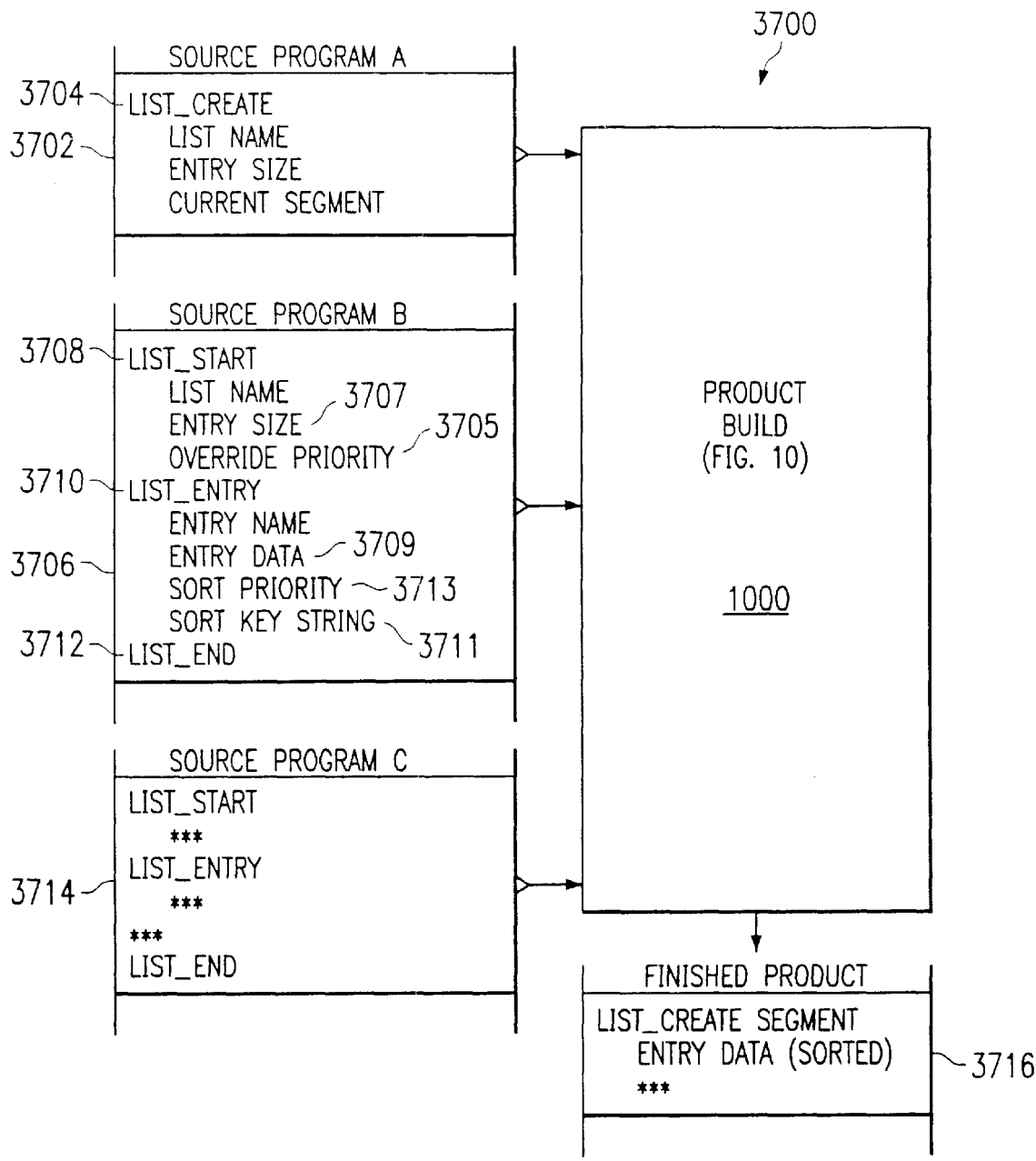
FIG. 37 presents a block diagram overview of the list creation and management process 3700.

The input control information which flows to the product component linker 3600 is shown in FIG. 37, described below. Starting with a list of the components that are to be included in the finished product, and limiting the "*.exe" files examined to those corresponding to the designer-selected components (typically found in the component subdirectories); and using information obtained from the linker-generated "*.map" files to locate and separate the named segments within each of the "*.exe" files; and by operating directly upon the selected component "*.exe" files, the product component linker 3600 is able to identify, withn each "*.exe" file, all of the named code segments, which are hereinafter called "built components" of the finished product 1106. Executable object code and data destined for inclusion within a single segment in the finished product will frequently be found to be scattered throughout many different "*.exe" executable files. Likewise, data that is intended to control the operation of the product component linker, and that will thereafter be discarded and not included in the finished product 1106, will also typically be found scattered throughout many different "*.exe" files but always placed int the two "fix-up" data segments public segment 3804 (FIG. 38) ("publicSegment"), which contains the names of public procedures, tables, etc.; and exteranl segment 3802 (FIG. 38) ("externSegment"), which contains the names of all the calls, jumps, read, etc. statements the addresses for which must be fixed up by the product component linker by insertion of the addresses of the public entry points, once the segment and offset addresses are determined and fixed by the product component linker 3600.

Accordingly, as its first step 3602, the product component linker 3600 collects all the built components and sorts them by segment name, merging the segments with the same name into unified segments even though they were separately compiled and linked, and then linking up the calls to the procedures, etc., to create unified executable program segments assembled from code fragments provided by several different components. For example, the calls to initialize the various components, created within many different component source files but assigned to a single segment, can be brought together into a single segment to form a unified initialization routine, and can even be sorted into a particular order of command execution automatically.

Next, from the external segment, the linker 3600 reads in (step 3604) the external segment 3802 contents, which names the procedures and/or the label definitions that the components contain; and the linker 3600 stores their locations in a table for later use when calls and accesses from other built components to these procedures, tables, etc. will be fixed up and assigned these same absolute addresses.

At step 3606, the product component linker 3600 reads in from the public segment 3804 all dependent references to the external definitions of procedures, etc., just described, including calls, jumps, table lookup accesses, etc.; and it stores the addresses of these references for later references as places in the code where absolute addresses will need to be plugged in.

All of these addresses, both the addresses of externals contained within the external segment 3802 and the addresses of the dependencies contained in the public segment 3804, are marked in the source code by the special macros which place absolute addresses into the external or public segment, as is appropriate, so that the precise position within the code of the externals and publics is communicated to the product component linker that will fix up the actual calls and jumps. As can be seen in the macro code explained below, as an extra error check, each macro, in addition to placing offset addresses within these special external and public segments, also inserts these same addresses into the actual code so that the procuct component linker, when it actually checks for an entry point within the linked object code, finds at each offset a number equal to the offset address.

Next, at step 3608, the linker 3600 generates duplicate instances of both definitions and of references which may be required by the execution-time information, where a piece of executable code is to appear in duplicate in the ROM image or is to be relocated at run time. For example, code may be moved about, or duplicated in different locations, or overwritten, and this may require the duplication of both definitions and of references.

Figure 38:
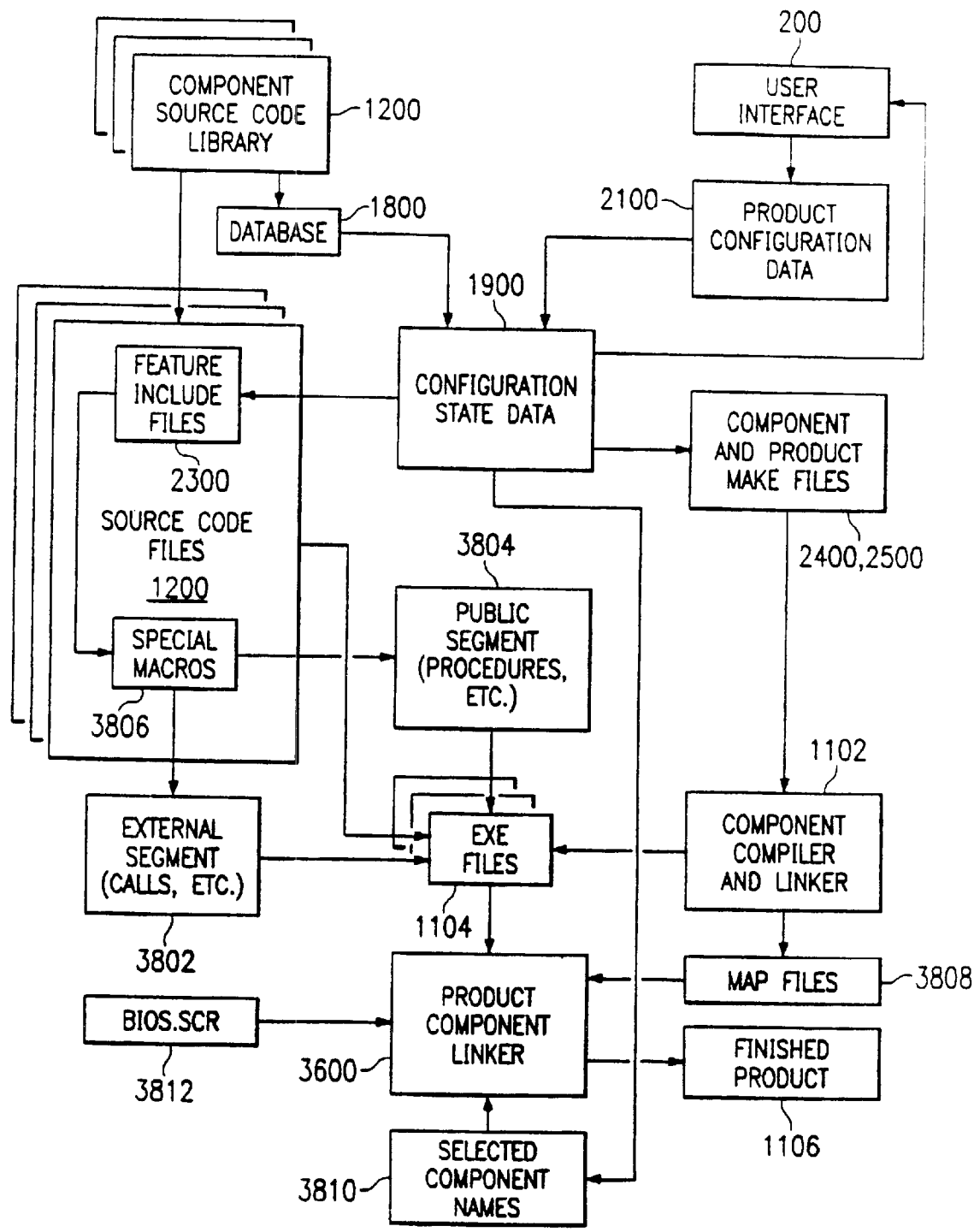
FIG. 38 presents a block diagram illustrating the flow of control information through the system 100 to guide the software development process.

This brings processing to step 3610, the point at which the references and definitions are actually associated and eventually linked together. With reference to FIG. 38, this is where, in the context of the present invention, the final choice is made to link a given call to one procedure or to another, for example; and because the process is done by the product component linker 3600 under the direct control of the macros 3806 (through the intermediary of the external and public sectors 3802 and 3804). But these macros are themselves, through the intermediary actions of the feature include files 2300, are commanded to edit the source code prior to compilation or assembly (for example, eliminating unwanted "calls" to unselected components and replacing include file class identifiers with the absolute addresses of those include files), and to control what signals are sent to the product component linker by the configuration state data 1900, which reflects commands contained within the product configuration data 2100 and the component and feature information files. Since these files are created, and are under the direct control of the designer through the user interface 200, the designer is thereby given an unusual amount of detailed control over the entire process of determining which components and features are selected, as has been explained.

The association of references with definitions is carried out in a certain order as follows:

First, references (dependencies: for example, "call" statements) directed to a specified component are associated with definitions (externals: for example, "proc" statements) that are found within that named component. If two different conponents contain procedures having the same name, then the component name determines which is picked as the destination of a given call statement.

Secondly, system-designer-designated "intercept" externals (a substitute procedure that is to "intercept" and take over the functions of a procedure called by the source code), identified as such by the macro-generated "call" information, are linked up to the intercepting references in preference over whatever reference would have been utilized otherwise.

Thirdly, to the extent that the finished product will contain duplicated code, or code generated by the product component linker 3600 (such as sorted tables, etc.), these link references are established next.

And finally, all remaining references are linked to definitions, with all private references scoped to limit the linking to parents and siblings within a given component.

At step 3612, the product component linker 3600 next collects and processes all of the segments that require special handling, such as list references that require sorting and insertion into segments, string segments that must be assembled and placed into the code, non-volatile RAM code which also must be procesed specially, relocation tables which indicate different locations where a given procedure may be found at different times during system boot-up, and ROM stacks needed to serve as subroutine "return" points during RAMless subroutine calls.

Of these, the ROM stacks require explanation: A ROM stack appears as follows in assembler source code, and is generated by the macro CREATE_ROM_STACK:

```
returnAddr:
    DW   returnAddr + 4
    DW   SEGMENT returnAddr
    jmp bx
```

The macro INIT_ROM_STACK generates the following stack pointer and stack segment pointer default values:

```
    . . .
    mov ss, SEGMENT returnAddr
    mov sp, OFFSET returnAddr
```

The macro ROMCALL that generates the RAM-less CALL function generates the following code at the point of the CALL statement:

```
    . . .
    mov bx, returnOffset
    jmp FAR xyz
returnOffset:
    [next instruction beyond the macro]
```

As can be seen, the ROM stack is simply a dummy stack frame to which any standard called procedure may execute a RET instruction. Upon return of program control, the RET instruction loads into the microprocessor's program code address and segment the address contained within the stack frame, which is the address just beyond the dummy stack frame, "returnAddr+4." Accordingly, the microprocessor executed the instruction following the dummy stack frame, which is "jmp [bx]" and jumps back into the calling program at the offset specified by the bx register.

This being the return procedure, clearly the special macro that creates the RAMless other segment subroutine call must pre-load the bx register with the return offset address of the next instruction following the calling point, the address "returnOffset," as shown above. Then the "call" is executed with a far "jmp" command, which does not try and save anything in the dummy stack frame when the call is executed, since the dummy stack frame is already pre-loaded with the return address that is to be used by the RET instruction execution.

In this simple manner, ROM BIOS system initialization routines running in a RAMless environment (befofre the memory controller of a PC is set up, for example) may call subroutines that are conventional in their design. Note that the product component linker 3600 needs only insert one dummy stack frame into each code segment that requires one, since many different calls (actually jumps) to procedures can share a single dummy stack frame, with the register bx in every case controlling the return and directing it to the right offset within the code.

Next, at step 3614, the modules of code, which now include lists, dummy ROM stacks, strings, non-volatile RAM blocks and code, and relocation tables, may be mapped into the final address space for the entire unified block of code, something that could not be done before this. Within the IBM PC and compatible "real mode," as found on Intel 386 class computers (Pentiums, 486s, etc.), all intrasegment addressing must be based upon real, absolute segment addresses and offsets within those segments. Accordingly, at this time, the selected component linker 3600 finalizes the addresses of al externals—all reference addresses. And finally, the linker 3600 actually fixes up the addresses in the code, thereby finally resolving and satisfying all the code dependencies. The code is now completely ready for installation in the final image.

The final step performed by the product component linker, step 3616, is that of writing out the rom modules, symbol maps, and logging information relating to lists, strings, and non-volatile RAM for the system designer to examine and also to pass on to the separate (in the preferred embodiment) "ROM_IMAGE" routine that inputs the ROM modules along with BIOS.SCR and information about image portions that are to be replicated, and performs the final assembly of the ROM code image, including compressing some portions, adding compressed code for sound and images, and creating the final ROM directory.

FIG. 37 shows the list creation and management process 3700. The LIST_CREATE macro 3704 (Section 5.1 in the Line-by-Line Description of Macros) shown in a code fragment of source code file A 3702, creates a list in the current segment by preserving the list name and entry size specified by its parameters and identifying the current segment at the time it was called. The code fragment of source code file B 3706, contains a LIST_START macro 3708 (Section 5.3 in the Line-by-Line Description of Macros) that specifies and preserves the same list name and entry size as the LIST_CREATE macro 3704 as well as the list entry priority order. The LIST_ENTRY macro (Section 5.5 in the Line-by-Line Description of Macros) in this code fragment 3710 specifies and preserves the data for a list entry, the name of the entry, its sort priority (a number used to sort list entries with the same sort key) and sort key. The LIST_END macro 3717 (Section 5.4 in the Line-by-Line Description of Macros) ends the list entries begun by the LIST_START macro 3708 and allows multiple list entries to be specified. The code fragment of source code file C 3714 illustrates that multiple list entries can be specified in different source code filess that may be a parts of different components. The product build process 1000 uses the information preserved by the LIST_CREATE macro 3704 to identify a list name, combines the information preserved by the LIST_START 3708 and LIST_ENTRY 3710 macros, sorts the entry data and puts the sorted entry data into the finished product 3716 in the segment identified by the LIST_CREATE macro 3704. See Appendix B for a further description of lists.

FIG. 38 presents, in one view, elements of the invention described elsewhere that participate in enabling the system designer to maintain detailed control over the assembly of features and components into a final finished procuct 1106.

The designer, through the user interface, views the configuration state data (FIG. 33A) and makes choices about components, features, and dependencies, as has been explained. This user information is preserved in the product configuration data file 2100 and is fed back into the configuration state data. The component source code library 1200 is also scanned, and detailed information about calls, procedures, includes, etc. is gathered into the database 1800, including such things as component designations, class designations, version designations, and other useful information. Also, information concerning components and features, such as which platforms they ar compatible with, or are required for, is gathered from the component and feature information files and placed into the database 1800. The contents of the database 1800 are also transferred into the configuration state data 1900.

All of this information, contained within the configuration state data 1900, then determines the configuration of the product, which is presented to the system designer in logical form at the user interface. The designer may modify the configuration by editing the files in the component source code library 1200 or by selecting or deselecting features and components (FIG. 33D) and adjusting options (FIG. 33E) with respect to dependencies and externals using the user interface. And of course, all errors in the way in which the system fits together are signalled directly to the designer by red Xs on the user interface (FIG. 33B).

Once the configuration is done, the product make routine 800 is called upon to create the finished product 1106. First, component and product make files 2400 and 2500 are generated to instruct the assembler, compiler, and linker in their tasks. Next, the feature include files 2300 are generated so the compiler and assembler will insert them into the source code files prior to compilation and assembly. The feature include files should be thought of as signal conduits leading directly from the system designer and the configuration state data into the source code files to actually control the pre-editing of the source code files prior to compilation and assembly, including deleting all calls to components and features that have been deselected; replacing "class" designations of include files with their absolute addresses within the component source code library 1200; and passing control values to the macros to alter the way in which the macros signal the product component linker as to what is to be finally connected up to what.

The special macros, when executed by the compiler and assembler, generate data for every procedure, label, and table (externals) that is designated for placement into a special external segment 3802, a first dummy code segment. They generate data for every call, jump, option, and global (dependencies) that is designated for placement into a special external segment 3804, a second dummy segment. These dummy segments should be thought of as communication pathways between the individual source code file locations and the product component linker over which may be passed information defining how the final address fix-up operations are to be carried out. Note that this information originates with the system designer. The component and feature information and the source code files are contained within the configuration state data, are partly passed into the compilation/assembly process through the feature include files 2300, and are finally gathered, altered, and sent on to the product component linker 3600 by the special macros 3806.

The compilation, assembly, and linking process is next carried out, generating executable files 1104 which are indexed into separate segments by the linker map files 3808.

Accordingly, the product component linker 3600, when placed into operation, can sift through the executable files, sorting their contents our by code segment, so that the contents of all segments are drawn together. In this manner, the public and external segment data 3802 and 3804 is drawn together so that it can control and direct the operations of the product component linker, along with a list of the selected components 3810 and a BIOS.SCR file that specifies absolute sector addresses, the ordering of sectors, and other such things. All of this enables the system designer to maintain an unusual degree of control in the process of linking components and features together into an integrated product, as has been explained.

DESCRIPTION OF THE SYSTEM MACROS USED IN THE PREFERRED EMBODIMENT OF THE PRESENT INVENTION

The Procedure and Label Declaration Macros consist of the PUBLIC_PROC, PRIVATE_PROC, END_PROC, PUBLIC_LABEL, PRIVATE_LABEL and FBM_LABEL.

The PUBLIC_PROC macro marks the start of a procedure that can be called from other components. It must be matched with an END_PROC macro. Its parameters are name, version and an optional INTERCEPT keyword. The name parameter is made up of a class name, zero or more subclass names and the actual procedure name, seperated by periods. The version parameter consists of major and minor version numbers seperated by a period. Callers with different major version number are incompatible. Callers with the same major version number but greater minor version numbers are incompatible. Increasing the minor version number implies backwards compatability. The optional INTERCEPT parameter indicates that the product component linker will fixup callers to call this procedure if there are multiple definitions.

The PRIVATE_PROC macro marks the start of a procedure that can be called only from within the component. It must be matched with an END_PROC macro. Its parameters are name, scope keyword and an optional version. The name parameter is made up of a class name, zero or more subclass names and the actual procedure name, seperated by periods. The scope keyword parameter must be NEAR or FAR. The optional version parameter is needed only if the private procedure is defined outside of the component, such as a shared file or oem hook. If specified, it is the same as the version parameter of the PUBLIC_PROC macro described above.

The END_PROC macro marks the end of a procedure and has no parameters. It must be matched with a preceding PUBLIC_PROC or PRIVATE_PROC macro.

The PUBLIC_LABEL macro creates a label that can be used from other components for code execution, for example, creating fixed entry points. Its parameters are name, version and an optional INTERCEPT keyword. The name parameter is made up of a class name, zero or more subclass names and the actual entry point name, seperated by periods. The version parameter is the same as the version parameter of the PUBLIC_PROC macro described above. The optional INTERCEPT parameter indicates that the product component linker will fixup callers to call this entry point if there are multiple definitions.

The PRIVATE_LABEL macro creates a label that can be used only from within the component for code execution, for example, creating fixed entry points. Its parameters are name and an optional version. The name parameter is made up of a class name, zero or more subclass names and the actual entry point name, seperated by periods. The optional version parameter is needed only if the private entry point is defined outside of the component, such as a shared file or oem hook. If specified, it is the same as the version parameter of the PUBLIC_PROC macro described above.

The FBL_LABEL macro specifies future binary manipulation (FBM) by the product component linker and does not generate any code. It informs the scan utilities and the product component linker that the label represents data generated by the binary linker at build time. The single name parameter is made up of a class name, zero or more subclass names and the actual entry point name, seperated by periods.

The External Reference macros consist of the PUBEXT, PRVEXT, EXTCALL, EXTJMP, EXTPTR, LOADADDR, LOADOFF, LOADSEG, EXTREF and EVALREF macros.

The PUBEXT macro declares an external reference to a public procedure, public-label, public list or public list entry. Its parameters are name, version and the optional parameters attribute keyword or component name, altname and altversion. The name parameter is made up of a class name, zero or more subclass names and the actual entry point name, seperated by periods. The version parameter is the same as the version parameter of the PUBLIC_PROC macro described above. When the optional third parameter is the keyword OPTIONAL, references to the label will be removed if the specified label does not exist. When the optional third parameter is the keyword SUBSTITUTE, the hexadecimal value FFFFFFFF (far) or FFFF(near) will be used if the specified label does not exist. When the optional third parameter is the keyword ALTERNATE, the fourth parameter is the altname to use if name is not defined and the fifth parameter is the version number of the altname procedure. When calls to a procedure are intercepted by a second procedure defined as a PUBLIC_PROC with the optional INTERCEPT parameter and this procedure wishes to call the original procedure, the name of the original component is specified as the optional third parameter.

The PRVEXT macro declares an external reference to a private procedure or label. Its parameters are name, scope keyword, version and the optional parameters attribute keyword, altname and altversion. The name parameter is made up of a class name, zero or more subclass names and the actual entry point name, seperated by periods. The scope parameter consists of the keyword NEAR or FAR. The version parameter is the same as the version parameter of the PUBLIC_PROC macro described above or the keyword NO_VER. The version is specified only if the label is defined outside of the component, such as a shared file or override. When the optional fourth parameter is the keyword OPTIONAL, references to the label will be removed if the specified label does not exist. When the optional fourth parameter is the keyword SUBSTITUTE, the hexadecimal value FFFFFFFF (far) or FFFF(near) will be used if the specified label does not exist. When the optional fourth parameter is the keyword ALTERNATE, the fifth parameter is the altname to use if name is not defined and the sixth parameter is the version number of the altname procedure.

The EXTCALL macro is used to call a public or private procedure and must be used with a preceding PUBEXT or PRVEXT macro. Its parameters are name, optional codetext string and optional component name. The name parameter is made up of a class name, zero or more subclass names and the actual procedure name, seperated by periods. The optional codetext string contains an instruction to be executed after the call has returned. When calls to a procedure are intercepted by a second procedure defined as a PUBLIC_PROC with the optional INTERCEPT parameter and this procedure wishes to call the original procedure, the name of the original component is specified as the optional third parameter.

The EXTJMP macro jumps to a public or private procedure and must be used in conjunction with a preceding PUBEXT or PRVEXT macro. Its parameters are name, an optional register name, an optional codetext string and an optional component name. The name parameter is made up of a class name, zero or more subclass names and the actual procedure name, seperated by periods. The optional register name specifies the 16-bit register that will hold the return address. The optional codetext string contains an instruction to be executed after the call has returned. When calls to a procedure are intercepted by a second procedure defined as a PUBLIC_PROC with the optional INTERCEPT parameter and this procedure wishes to call the original procedure, the name of the original component is specified as the optional fourth parameter.

The EXTPTR macro allocates a pointer to a procedure or a label and must be used in conjunction with a preceding PUBEXT or PRVEXT macro. Its parameters are name and an optional component name. The name parameter is made up of a class name, zero or more subclass names and the actual procedure name, seperated by periods. When calls to a procedure are intercepted by a second procedure defined as a PUBLIC_PROC with the optional INTERCEPT parameter and this procedure wishes to point to the original procedure, the name of the original component is specified as the optional second parameter.

The LOADADDR macro loads the address of a procedure or a label into registers and must be used in conjunction with a preceding PUBEXT or PRVEXT macro. Its parameters are name, an optional segmentreg, an optional offsetreg and an optional component name. The name parameter is made up of a class name, zero or more subclass names and the actual procedure name, seperated by periods. The optional segmentreg parameter specifies the 16-bit register to hold the segment portion of the address (default is ES). The optional offsetreg parameter specifies the 16-bit register to hold the offset portion of the address (default is DI). When calls to a procedure are intercepted by a second procedure defined as a PUBLIC_PROC with the optional INTERCEPT parameter and this procedure wishes to load the address of the original procedure, the name of the original component is specified as the optional fourth parameter.

The LOADOFF macro loads the offset of a public or private label into a 16-bit register and must be used in conjunction with a preceding PUBEXT or PRVEXT macro. Its parameters are offsetreg, name and an optional component name. The offsetreg parameter names the 16-bit register that will hold the offset (default DI). The name parameter is made up of a class name, zero or more subclass names and the actual procedure name, seperated by periods. When calls to a procedure are intercepted by a second procedure defined as a PUBLIC_PROC with the optional INTERCEPT parameter and this procedure wishes to load the address of the original procedure, the name of the original component is specified as the optional fourth parameter.

The LOADSEG macro loads the segment of a public or private label into a 16-bit register and must be used in conjunction with a preceding PUBEXT or PRVEXT macro. Its parameters are segmentreg, name and an optional component name. The segmentreg parameter names the 16-bit register that will hold the segment (default DI). The name parameter is made up of a class name, zero or more subclass names and the actual procedure name, seperated by periods. When calls to a procedure are intercepted by a second procedure defined as a PUBLIC_PROC with the optional INTERCEPT parameter and this procedure wishes to load the address of the original procedure, the name of the original component is specified as the optional fourth parameter.

The EXTREF macro is used to fixup a structure member to contain the address of a public or private label and must be useed in conjunction with a preceding BUBEXT or PRVEXT macro. Its parameters are name, an optional strucMem name, an optional component name and an optional FORWARD_REFERENCE keyword. The name parameter is made up of a class name, zero or more subclass names and the actual procedure name, seperated by periods. The optional strucMem name identifies the structure member to fixup if fixup is far. When calls to a procedure are intercepted by a second procedure defined as a PUBLIC_PROC with the optional INTERCEPT parameter and this procedure wishes to fixup the address of the original procedure, the name of the original component is specified as the optional third parameter. The optional FORWARD_REFERENCE keyword causes the macro to use a forward referenced anonymous label to calculate offset.

The EVALREF macro allows the address of a label to be used within an instruction. Its parameters are opcode, destination and source. The opcode parameter is the name of the instruction to be generated. The destination parameter specifies a register, label or procedure and the source parameter specifies a register, immediate value, procedure or label. The procedure or label in the destination or source parameter must be defined using an EXTREF macro enclosed in angle brackets (< >) inline with the EVALREF macro.

The Include File Declaration macros are PUBLIC_INCLUDE_START, PRIVATE_INCLUDE_START, PRVINC and PUBINC.

The PUBLIC_INCLUDE_START macro declares the start of an include file that can be used by other components. Its parameters are classheirarchy and version. The classheirarchy parameter is the class name and zero or more subclass names seperated by periods. The version parameter is the major and minor version numbers of the interface defined by the include file seperated by a period.

The PRIVATE_INCLUDE_START macro declares the start of an include file that can only be used within the current component. Its parameters are classheirarchy and an optional version. The classheirarchy parameter is the class name and zero or more subclass names seperated by periods. The version parameter is the major and minor version numbers of the interface defined by the include file separated by a period and is used only if the include file resides outside of the component, such as a shared include file.

The PRVINC macro includes a private include file. Its parameters are classheirarchy, filename and an optional version. The classheirarchy parameter is the class name and zero or more subclass names separated by periods. The filename paramater is the name of the include file. The version parameter is the major and minor version numbers of the interface defined by the include file seperated by a period and is used only if the include file resides outside of the component, such as a shared include file.

The PUBINC macro includes a public include file. Its parameters are classheirarchy, filename and version. The classheirarchy parameter is the class name and zero or more subclass names seperated by periods. The filename paramater is the name of the include file. The version parameter is the major and minor version numbers of the interface defined by the include file seperated by a period.

The Procedure Header macros are DESCRIPTION, INPUT:, OUTPUT:, MODIFIED:, MEM, REG, NONE and OEM_HOOK. None of these macros generate any code, their purpose is to identify the location and type of information describing the procedure defined by the preceding PUBLIC_PROC or PRIVATE_PROC macro when the source file is scanned.

The Segment Macros are CODE_SEGMENT_OPEN, DATA_SEGMENT_OPEN, ASSUME_CODE_SEGMENT, ASSUME_DATA_SEGMENT and SEGMENT_CLOSE.

The CODE_SEGMENT_OPEN macro marks the opening of a code segment that must be closed using the SEGMENT_CLOSE macro. Its parameter is an expression of attribute keywords combined using plus (+) that determines the placement and "lifetime" of the code that follows.

The DATA_SEGMENT_OPEN macro marks the opening of a data segment that must be closed using the SEGMENT_CLOSE macro. Its parameter is an expression of attribute keywords combined using plus (+) that determines the placement and "lifetime" of the data that follows.

The ASSUME_CODE_SEGMENT macro forces the assembler to assume that the specified segment register points to the code segment that contains the specified attributes. Its parameters are the segment register to make the assumption about and an expression of attribute keywords combined using plus (+) that specifies the attributes.

The ASSUME_DATA_SEGMENT macro forces the assembler to assume that the specified segment register points to the data segment that contains the specified attributes. Its parameters are the segment register to make the assumption about and an expression of attribute keywords combined using plus (+) that specifies the attributes.

The SEGMENT_CLOSE macro marks the end of a code or data segment that must have been opened by a preceding CODE_SEGMENT_OPEN or DATA_SEGMENT_OPEN macro.

The Option macros are OPTEXT, OPTCHK, LOADOPT, DB_OPT, DW_OPT and DD_OPT.

The OPTEXT macro declares a reference to an option from another component or feature that was declared in the component or feature's information file. Its parameters are name and an optional component name. The name parameter is made up of a class name, zero or more subclass names and the actual option name, seperated by periods. When calls to a procedure are intercepted by a second procedure defined as a PUBLIC_PROC with the optional INTERCEPT parameter and this procedure wishes to reference an option of the original component or feature, the name of the original component is specified as the optional second parameter.

The OPTCHK macro tests the specified option (which must have been declared with a preceding OPTEXT macro) with the specified condition and value. If true, the truecodetext is executed; otherwise the falsecodetext is executed. Its parameters are optionname, condition keyword, value, truecodetext and an optional falsecodetext. The optionname parameter is made up of a class name, zero or more subclass names and the actual option name, seperated by periods. The condition keyword is one of LE, LT, GE, GT, NE or EQ with the usual and customary meaning. The value parameter is a constant. The truecodetext parameter contains code to be executed if the condition is true and the optional falsecodetext parameter contains code to be executed if the condition is false.

The LOADOPT macro loads the specified destination with the specified option's value. The option must have been previously declared with the OPTEXT macro. Its parameters are destination and optionname. The destination parameter specifies the memory location or register to hold the options value and must be less or equal to the option size. The optionname parameter is made up of a class name, zero or more subclass names and the actual option name, seperated by periods.

The DB_OPT, DW_OPT and DD_OPT macros places a byte, word or double word, respectively, in the current segment containing the value of the specified option that must have been previously declared with the OPTEXT macro. The option name parameter is made up of a class name, zero or more subclass names and the actual option name, seperated by periods.

LINE-BY-LINE DESCRIPTION OF THE MACROS

The identifiers that name macros, macro parameters and macro variables in the description of the macros in the preferred embodiment of the present invention that follows, may begin with an upper case (A–Z) or lower case (a–z) letter or a question mark (?) followed by zero or more letters, digits (0–9), underscore (_) or question mark characters. Macro variable names that begin with three question marks (???) distinguish those variables that are defined and referenced solely within the macros. Macro variables referenced within a macro statement are normally replaced with their current contents. When the macro statement begins with a percent (%), macro variables are replaced with their current contents as normal; then, after replacement, any identifier naming a macro variable that remains is replaced with its current value.

Strings are delimited by less than (<) and greater than (>) signs.

IF statements indicate a condition that, if true, cause macro statements up to the matching ELSE or ENDIF statement to be evaluated. ELSE statements cause macro statements up to the matching ENDIF statement to be evaluated if the preceding IF statement was false. The ELSE statement may be combined with an IF to indicate that macro statements up to the matching ENDIF statement are to be evaluated if the preceding IF statement was false and the ELSEIF statement is true. Some of the If statements are: IFE expression—if expression is equal to zero, IFNB <string>—if string is not blank, IFDEF variable—if variable is defined, IF expression—if expression is true, IFIDN <string1>, <string2>—if string1 is identical to string2, and IFDIF <string1>, <string2>—if string1 is different than string2.

1. Exit Macros

The Exit macros are EXTCALL and EXTJMP described here and ROMCALL described in Section 4. The Exit macros identify points where the flow of control exits the current procedure, goes to the procedure identified by the exit macro and later returns.

DEFINE_PREFIX TEXTEQU <D_>
PROC_PREFIX TEXTEQU <P_>

These two textual equates define global macro variables containing the character string prefixes that will be used in the macros that follow.

1.1. EXTCALL macro

The EXTCALL macro is used by the present invention to call a public procedure in a different component or a private procedure in the current component. The code generated by the EXTCALL macro depends on the Exit Declaration macro and Entry Definition macro for its procedureName that are scanned by the present invention. The information from these macros in turn, is used to generate a global macro variable for the procedureName in the feature include file produced by the present invention and included in each source code file that indicates what code, if any, should be generated.

```
EXTCALL MACRO procedureName:REQ,
    optionalCode, component
        BRANCH_HANDLER procedureName, call,
            <optionalCode>,
    <component>
    ENDM
```

The EXTCALL macro generates a call instruction, fixup data for build, and optional code if supplied. Usage: "EXTCALL pci.oprom.init, <jc exit>". Its parameters are:

procedureName (required)—Name of procedure to be called in dot notation, e.g. "class.subclass.procedure";

optionalcode—Optional code to assemble, typically a jump on the carry flag set by the procedure; and component—May be used to specify the name of the component in which the procedure is defined when multiple components define the same procedureName.

The EXTCALL macro is implemented by invoking the BRANCH_HANDLER macro with the appropriate parameters. Note that the fourth parameter of the BRANCH_HANDLER macro is deliberately omitted.

1.2. EXTJMP macro

The EXTJMP macro is used by the present invention to call a public procedure in a different component or a private procedure in the current component. The code generated by the EXTJMP macro depends on the Exit Declaration macro and Entry Definition macro for its procedureName that are scanned by the present invention. The information from these macros in turn, is used to generate a global macro variable for the procedureName in the feature include file produced by the present invention and included in each source code file that indicates what code, if any, should be generated.

```
EXTJMP MACRO procedureName:REQ, register,
    optionalCode, component
        BRANCH_HANDLER procedureName, jmp,
            <optionalCode>, <register>,
    <component>
    ENDM
```

The EXTJMP macro is used to call a public or private procedure. It generates a jump instruction, fixup data for build, and optional code if supplied. Usage: "EXTJMP pci.oprom.init, <jc exit>". Its parameters are:

procedureName (required)—Name of procedure to be called in dot notation, e.g. "class. subclass.procedure";

register—Optional register to hold the return address.

optionalCode—Optional code to assemble, typically a jump on the carry flag set by the procedure; and component—May be used to specify the name of the component in which the procedure is defined when multiple components define the same procedureName.

The EXTJMP macro is implemented by invoking the BRANCH_HANDLER macro with the appropriate parameters.

1.3. BRANCH_HANDLER macro

The BRANCH_HANDLER macro is an internal macro that provides a necessary function to the present invention and is never called directly by a source code file.

```
BRANCH_HANDLER MACRO externName:REQ,
    branchInstruction:REQ, \ optionalCode, register, component
```

The BRANCH_HANDLER macro is used to call a public or private procedure. The backslash (\) at the end of the first line specifies line continuation. Its parameters are:

externName (required)—Name of external procedure to be called in dot notation, e.g. "class.subclass.procedure";

branchInstruction (required)—A call or jmp;

optionalCode—Optional code to assemble, typically a jump on the carry flag set by the called procedure;

register—Register containing return address offset; and component—May be used to specify the name of the component in which the procedure is defined when multiple components define the same procedureName.

```
LOCAL    ???addr
LOCAL    ???retAddr
LOCAL    ???defineName
LOCAL    ???procedureName
LOCAL    ???extern
```

These are local variables used by the macro.

GET_SYMBOL_NAME <externName>, <component>

The GET_SYMBOL_NAME macro returns externName (or component.externName, if specified) in global variable ???symbol with dots (.) replaced by underbars (_); e.g. <pci.oprom.init> is returned as pci_oprom_init.

???defineName CATSTR DEFINE_PREFIX, ???symbol
???procedureName CATSTR PROC_PREFIX, ???symbol If externName is pci.oprom.init; then ???defineName is D_pci_oprom_init and ???procedureName is P_pci_oprom_init.

```
IFNB <component>
    IFNB <optionalCode>
        .ERR <BRANCH_HANDLER: Cannot specify
            optionalCode with component>
    ENDIF
ENDIF
```

Generate an error if both the component and optionalCode parameters are specified.

```
%IFDEF ???defineName
% IF ((???defineName EQ TRUE) OR (???defineName
    EQ FALSE))
%   .ERR <BRANCH_HANDLER: The name !'externName!' has not been PUBEXT or PRVEXT>
ENDIF
```

Verify that the externName (pci.oprom.init) has been declared using a PUBEXT or PRVEXT macro. This will cause the system to define a global variable (D_pci_oprom_init) and give it a value, neither TRUE nor FALSE, indicating its type. The percent character (%) at the beginning of each line causes the IF statements to reference the value of the global variable specified by ???defineName.

% IFE ???defineName AND TYPE_SUBSTITUTE

If the value of the global variable specified by local variable ???defineName does not have the TYPE_SUBSTITUTE bit set, externName was not declared with the SUBSTITUTE attribute and code can be generated.

% IFE ???defineName AND TYPE_NOT_INSTALLED

If the TYPE_NOT_INSTALLED bit is not set, the component or feature containing the definition of externName was included in the build and code can be generated.

```
IFNB <register>
    mov register, ???retAddr
ENDIF
```

Load the return address offset into the register if one was specified.

% IF ???defineName AND TYPE_NEAR
% GET_SYMBOL_NAME ???procedureName
% ???extern CATSTR <???symbol>
% branchInstruction ???extern If the TYPE_NEAR bit is set, generate the branchInstruction (call or jmp) as a near branch. If the name parameter is pci.oprom.init then ???procedureName contains P_pci_oprom_init, the name of the global variable defined by the PUBEXT macro containing the name of this procedure. The GET_SYMBOL_NAME macro is passed the value of this global variable (typically pci.oprom.init) so the PUBEXT macro can use an alternate procedure name when required. The GET_SYMBOL_NAME macro returns the ???procedureName in global variable ???symbol with dots (.) replaced by underbars (_); e.g. <pci.oprom.init> is returned as pci_oprom_init, the name of the procedure defined by the PUBLIC_PROC macro.

```
    ELSE
        IFIDNI <branchInstruction>, <call>
            DB    09Ah            ; Opcode for far call
        ELSEIFIDNI <branchInstruction>, <jmp>
            DB    0EAh            ; Opcode for far jump
        ELSE
%            .ERR <BRANCH_HANDLER: Unknown branch instruction !'branchInstruction!'>
        ENDIF
        ???addr EQU $
            DW    $
            DW    $
```

Generate far call (or jmp) code with a procedure address to be fixed up later. An error is generated if the branchInstruction parameter did not contain what was expected. Note the physical address of the fixup location (???addr) will be stored within the fixup location itself. The build tools will use the stored fixup address (refering back to itself) as a sanity check.

% SAVE_EXT_FIXUP_DATA ???procedureName, TYPE_EXT_FAR, ???addr, component
ENDIF

Call the SAVE_EXT_FIXUP_DATA macro to save the fixup data for this external reference (see below). The percent character (%) at the beginning of the line causes the procedure name (pci.oprom.init) stored in the global variable specified by ???procedureName (P_pci_oprom_init) to be saved as the target of the branch.

???retAddr EQU $

Define the return address that was loaded into a register above.

IFNB <optionalCode>
    optionalCode
ENDIF
ENDIF

Generate optionalCode if it exists.

ELSE
    .ERR <BRANCH_HANDLER: Cannot use the SUBSTITUTE attribute with calls/jumps>
ENDIF Generate an error if the TYPE_SUBSTITUTE bit was set.

ELSE
% .ERR <BRANCH_HANDLER: !'externName!' is not defined>
ENDIF

Generate an error if the global variable specified by ???defineName (D_pci_oprom_init) was not defined.
ENDM End the macro and return to its caller.

1.4. SAVE_EXT_FIXUP_DATA macro

The SAVE_EXT_FIXUP_DATA macro is an internal macro that provides a necessary function to the present invention and is never called directly by a source code file.

SAVE_EXT_FIXUP_DATA MACRO callProcedure:REQ, fixupType:REQ, addr:REQ, \ addrOffset, component The SAVE_EXT_FIXUP_DATA macro is an internal macro used to save the fixup data specified by its parameters in a specially named segment. Its parameters are:

callProcedure (required)—Procedure name;

fixupType (required)—Fixup type, e.g. TYPE_EXT_FAR;

addr (required)—Address of fixup;

addrOffset—Address of offset if offset fixup is split from segment fixup; and component—may be used to specify the name of the component in which the procedure is defined when multiple components define the same procedureName.

The macro generates the following structure:

```
DB          procedure name
DB          0
DB          component name
DB          0
DB fixup type
DW offset of offset fixup
DW offset of segment fixup
DW segment for fixups
    externSegment SEGMENT
        DB      '&callProcedure'    ; Procedure string
        DB      0                   ; Null terminate the string
    IFNB <component>
        DB      '&component'        ; Component to resolve to
    ENDIF
        DB      0                   ; Null terminate the string
        DB      fixupType           ; Fixup type
    IFNB <addrOffset>
        DW      OFFSET addrOffset   ; Offset of offset fixup
    ELSE
        DW      OFFSET addr
    ENDIF
    IFB <addrOffset>
        DW      OFFSET addr + 2     ; Offset of segment fixup
    ELSE
        DW      OFFSET addr
    ENDIF
        DW      SEG addr            ; Segment for fixups
    externSegment ENDS
ENDM
```

The structure containing the external fixup data is put in a special segment. The callProcedure is stored as a null terminated string. If the component parameter is non-blank, it is also stored as a null terminated string. If the component parameter is blank, just the null terminator is stored. The null terminator is the ASCII character NUL which has the value zero and is used to indicate the end of a character string. If the addrOffset parameter is blank then the offset and segment to be fixed up are stored in adjacent words, at addr and addr+2, respectively; otherwise, addrOffset specifies the address of the offset to be fixed up and addr specifies the address of the segment to be fixed up.

The fixup data generated by each call to this macro is merged into a single externSegment when the source code files containing the calls are compiled, linked, and processed by the product component linker. The externSegment in each object file is merged into a single externSegment when the object files are linked to form the component .EXE file. The fixup data in the externSegment of each component .EXE file is used by the BIOS Component Linker to fixup the segment and offset of the external reference.

2. Exit Declaration Macros 2.1. PUBEXT macro

The PUBEXT macro is used by the present invention to declare the name of the public procedure that will be referenced by an Exit macro. The PUBEXT macro name and its parameters are scanned from the source file by the present invention. The information from this macro and the Entry Definition macro, is used to generate a global macro variable for the procedure name in the feature include file produced by the present invention and included in each source code file that indicates what code, if any, the Exit macro should generate.

PUBEXT MACRO name, version, attribute, altName, altVersion

The PUBEXT macro is used to declare an external reference to a public procedure or label. Usage: "PUBEXT memctrl.shadow.set, 1.0, OPTIONAL". Its parameters are:

name—Name of procedure or label in dot notation, e.g. "class.subclass.procedure";

version—Major.minor version of the external interface;

attribute—

OPTIONAL→Code is genarated only if public procedure or label exists,

ALTERNATE→Use alternate reference if the public procedure or label does not exist, SUBSTITUTE→Store 0FFFFh if public label is undefined, or component→May be used to specify the name of the component in which the procedure is defined when multiple components define the same procedure-Name;

altName—Name of alternate public procedure or label; and altVersion—Major.minor version of the alternate interface.

LOCAL ???defineName
    LOCAL ???attrib
    LOCAL ???component

These are local variables used by the macro.

???attrib CATSTR <attribute>

???component TEXTEQU <.>

The overloaded attribute parameter contains an attribute keyword or component name. These two local variables are used to hold the attribute keyword and component name specified by the attribute parameter. Since the parameter is overloaded, one or the other will be blank. Initially, it is assumed that ???attrib contains an attribute keyword and that ???component is therefore blank.

IFNB <attribute>
      IFDIF <attribute>, <OPTIONAL>
      IFDIF <attribute>, <ALTERNATE>
        IFDIF <attribute>, <SUBSTITUTE>
        ???component CATSTR <attribute>
        ???attrib TEXTEQU < >
        ENDIF
      ENDIF
      ENDIF
    ENDIF Check if the overloaded attribute parameter is really a component name. If so, then ???component contains the component name and ???attrib is blank.

NAME_VER_CHECKER <name>, <version>

%ATTRIB CHECKER ???attrib, <altName>, <altVersion>

The NAME_VER_CHECKER macro verifies that both the name and version parameters were specified. The ATTRIB_CHECKER macro verifies that if the ALTERNATE attribute was specified then both the altName and altVersion parameters were specified as well, or that if the ALTERNATE attribute was not specified then neither the altName nor the altVersion parameter was present. These two macro calls will produce errors if each of the names does not have a corresponding major.minor version number. The version numbers are otherwise ignored by the generated code.

All the parameters from each call of the PUBEXT macro are scanned from the source file and entered in a database. This allows the BIOS Development System to compare the version of the actual procedure interface used by the procedure definition with the version of the procedure interface declared in the PUBEXT macro call and used in the source code file containing the macro call. Since the version numbers of both the procedure declaration and definition are stored in a database, the system can determine if the interfaces are compatible by comparing version numbers before compilation.

%GET_EXT_NAME name, ???attrib, altName, ???component

Set bits in the global variable specified by ???defineName to indicate that the public procedure or label has been declared by a PUBEXT macro call and is defined or is to be handled according to the attribute specified. See description below.

GET_SYMBOL_NAME name

???defineName CATSTR DEFINE_PREFIX, ???symbol

The GET_SYMBOL_NAME macro returns name in global variable ???symbol with dots (.) replaced by underbars (_); e.g. <memctrl.shadow.set> is returned as memctrl_shadow_set. If name is memctrl.shadow.set; then ???defineName is D_memctrl_shadow_set.

%IFDEF ???defineName
    % ???defineName=???defineName OR TYPE_PUBLIC
    ENDIF

If the global variable containing the various type bits for this procedure is defined, set the TYPE_PUBLIC bit to indicate that it is a public procedure.

The BIOS Development System generates a feature include file that is included by each source code file contained in the source library. It defines a global variable ???defineName, e.g D_memctrl_shadow_set, for each procedure declared by a PUBEXT macro containing various type bits. For instance, if the procedure is declared to be OPTIONAL and the procedure definition is not included in the build then the system will define the global variable with a TYPE_NOT_INSTALLED bit indicating that no code is to be generated for its calls (see the BRANCH_HANDLER macro above).

ENDM

End the macro and return to its caller.

2.2. GET_EXT_NAME macro

The GET_EXT_NAME macro is an internal macro that provides a necessary function to the present invention and is never called directly by a source code file.

GET_EXT_NAME MACRO name:REQ, attribute, altName, component

The GET_EXT_NAME macro determines the name of the global variable declared by a PUBEXT macro call and sets bits in it to indicate that the public procedure or label has been declared and is defined or is to be handled according to the attribute specified. Its parameters are:

name (required)—Name of procedure or label in dot notation, e.g. "class.subclass procedure";

attribute—
      OPTIONAL→Code is genarated only if public procedure or label exists,
      ALTERNATE→Use alternate reference if the public procedure or label does not exist, or
      SUBSTITUTE→Store 0FFFFh if public label is undefined;

altName—Name of alternate public procedure or label; and component→May be used to specify the name of the component in which the procedure is defined when multiple components define the same procedureName.
      LOCAL ???defineName
      LOCAL ???publicName
      LOCAL ???tempDefineName These are local variables used by the macro.
   IFNB <attribute>
     IFDIF <attribute>, <OPTIONAL>
       IFDIF <attribute>, <ALTERNATE>
         IFDIF <attribute>, <SUBSTITUTE>
           .ERR <GET_EXT_NAME: Invalid !attribute supplied>
         ENDIF
       ENDIF
     ENDIF
   ENDIF Validate the attribute parameter if non-blank.
   GET_SYMBOL_NAME <name>, <component>
     ???defineName CATSTR DEFINE_PREFIX, ???symbol The GET_SYMBOL_NAME macro returns externName (or component.externName, if specified) in global variable ???symbol with dots (.) replaced by underbars (_); e.g. <pci.oprom.init> is returned as pci_oprom_init. If name is pci.oprom.init; then ???defineName is D_pci_oprom_init.

%IFDEF ???defineName

If the global variable whose name is specified by ???defineName is defined by the build tools set bits in the global variable to specify the type of the procedure declared.
     % IF ???defineName EQ TRUE If the global variable whose name is specified by ???defineName has the value TRUE, the procedure was included in the build and can be called.
       ???publicName CATSTR PROC_PREFIX, ???symbol
     % ???publicName TEXTEQU <name>
     % ???defineName=???defineName OR TYPE_TRUE Construct the name of the global variable that will contain the name of the procedure to be called and store the string <name> in it. If name is pci.oprom.init; then ???publicName is P_pci_oprom_init which contains the string <pci.oprom.init>. Set the TYPE_TRUE bit in the global variable whose name is specified by ???defineName.

% ELSEIF ???defineName EQ FALSE

If the global variable whose name is specified by ???defineName has the value FALSE, the procedure was not included in the build and its type is determined by the attribute it was declared with.

IFIDN <attribute>, <SUBSTITUTE>
     % ???defineName=???defineName OR TYPE_SUBSTITUTE
       ELSEIFIDN <attribute>, <OPTIONAL>
     % ???defineName=???defineName OR TYPE_NOT_INSTALLED OR TYPE_OPTIONAL If the SUBSTITUTE or OPTIONAL attribute was specified, set the appropriate bits.
       ELSEIFIDN <attribute>, <ALTERNATE>
         ???publicName CATSTR PROC_PREFIX, ???symbol
         GET_SYMBOL_NAME altName
         ???tempDefineName CATSTR DEFINE_PREFIX, ???symbol If the ALTERNATE attribute was specified, construct the name of the global variable that will contain the name of the procedure to be called. Construct the name of the global variable that contains the type bits for the altName.
     % IFDEF ???tempDefineName
     % IFE ???tempDefineName AND TYPE_RESERVED_TRUE
       .ERR <GET_EXT_NAME: !'altName!' is not in the build> ENDIF
     ELSE
       .ERR <GET_EXT_NAME: !'altName!' is not defined>
     ENDIF If the global variable containing the type bits for altName is not defined or it is defined but the TYPE_RESERVED_TRUE bit is not set, produce an error.
     % ???publicName CATSTR <altName>
     % ???defineName=???defineName OR TYPE_ALTERNATE ENDIF Set the name of the procedure to be called to <altName> and set the TYPE_ALTERNATE bit in the global variable containing the type bits.
     % ELSE
     % .ERR <GET_EXT_NAME: !'name!' was already qualified with PUBEXT or PRVEXT>
   ENDIF The global variable containing the type bits did not have the value TRUE or FALSE so generate an error.
   ELSE
     .ERR <GET_EXT_NAME: !'name!' was not picked up by the build tools>
   ENDIF The global variable containing the type bits was not defined so generate an error.
   ENDM End the macro and return to its caller.

3. Entry Definition Macros 3.1. PUBLIC_PROC macro

The PUBLIC_PROC macro is used by the present invention to generate a PROC statement defining a public procedure that will be referenced by an Exit macro. The PUBLIC_PROC macro name and its parameters are scanned from the source file by the present invention. The information from this macro and the Exit Declaration macro is used to generate a global macro variable for the procedure name in the feature include file produced by the present invention and included in each source code file that indicates what code, if any, the Exit macro should generate.

PUBLIC_PROC MACRO procedureName:REQ, version:=<MISSING>, attrib

The PUBLIC_PROC macro defines a procedure that can be called from other components. Usage: "PUBLIC_PROC pci.oprom.init, 1.3" Its parameters are:

procedureName (required)—Name of procedure in dot notation, e.g. "class. subclass procedure";

version—Major.minor procedure interface version number, it is given the value <MISSING> by default so that a missing version number can be detected; and attrib—INTERCEPT, tells the BIOS Development System to call this procedure if there are multiple definitions of the same procedureName in the configuration.

It leaves the global variable ???procedureName containing the name of the procedure.

LOCAL ???addr
LOCAL ???procName
LOCAL ???error
LOCAL ???procType

These are local variables used by the macro.

???error=FALSE
IFDEF ???procedureName
    IFNB ???procedureName
% .ERR <PUBLIC_PROC: The procedure ???procedureName is open>
    ???error=TRUE
    ENDIF
ENDIF If an existing procedure has not been closed, generate an error. The local variable ???error, set FALSE initially, is used to indicate that an existing procedure has not been closed to prevent the generation of another PROC statement that would cause additional more ambiguous errors.

IFIDNI <version>, <MISSING>
    .ERR <PUBLIC_PROC: !Version information missing>
ENDIF
IFNB <attrib>
    IFDIF <attrib>, <INTERCEPT>
% .ERR <PUBLIC_PROC: !'attrib!' is an invalid attribute>
    ENDIF
ENDIF Verify that a version parameter was specified and validate the attribute parameter.

IFE ???error

If no errors were detected, define the procedure.

GET_SYMBOL_NAME procedureName
???procedureName CATSTR ???symbol

The GET_SYMBOL_NAME macro returns procedureName in global variable ???symbol with dots (.) replaced by underbars (_); e.g. <pci.oprom.init> is returned as pci_oprom_init. Set the global variable ???procedureName to the procedure name for the assembler to resolve. If procedureName is pci.oprom.init; then ???procedureName is pci_oprom_init.

% ???procedureName PROC FAR PRIVATE
???addr EQU $

Create the public procedure and get its location so calls from other components can be fixed up.

IFIDN <attrib>, <INTERCEPT>
    ???procType TEXTEQU <TYPE_PUBLIC_INT_PROC>
ELSE
    ???procType TEXTEQU <TYPE_PUBLIC_PROC>
ENDIF Setup ???procType for the fixup data to indicate whether this is a normal public (intercomponent) procedure or a special procedure that intercepts calls to the normal procedure with the same name.

% SAVE_PUBLIC_FIXUP_DATA procedureName, ???procType, ???addr

Call the SAVE_PUBLIC_FIXUP_DATA macro (described below) to save the fixup data.

ENDIF
ENDM

End the macro and return to its caller.

3.2. SAVE_PUBLIC_FIXUP_DATA macro

The SAVE_PUBLIC_FIXUP_DATA macro is an internal macro that provides a necessary function to the present invention and is never called directly by a source code file.

SAVE_PUBLIC_FIXUP_DATA MACRO publicLabel, publicType, addr

The SAVE_PUBLIC_FIXUP_DATA macro is an internal macro used to save the fixup data specified by its parameters in a specially named segment. Its parameters are:

publicLabel—Public symbol name in dot notation, e.g. "class.subclass.procedure";

publicType—Public symbol type (Enumerated equate); and addr—Address of the public symbol.

```
publicSegment SEGMENT
    DB    '&publicLabel'    ; Public string
    DB    0                 ; Null terminate the string
    DB    publicType        ; Public type
    DW    OFFSET addr       ; Fixup offset
    DW    SEG addr          ; Fixup segment
publicSegment ENDS
```

The fixup data generated by each call to this macro is merged into a single publicSegment when the source code files containing the calls are compiled, linked, and processed by the product component linker. The publicSegment in each object file is merged into a single publicSegment when the object files are linked to form the component .EXE file. The fixup data in the publicSegment of each component .EXE file is used by the BIOS Component Linker to fixup the segment and offset of each external reference.

ENDM

End the macro and return to its caller.

3.3. END_PROC macro

The END_PROC macro is used by the present invention to do some error checking before marking the end of the procedure begun by the preceeding PUBLIC_PROC macro with an ENDP directive (i.e., command) required by the assembler.

END_PROC MACRO

The END_PROC macro defines the end of a public procedure.

IFNDEF ???procedureName
    .ERR <PROC_END: No procedure defined>
ELSE
    .ERRB ???procedureName, <END_PROC: No procedure currently open>

The global variable ???procedureName contains the name of the current procedure. Generate an error if no procedure is defined or no procedure is currently open.

IFNB ???procedureName
% ???procedureName ENDP
???procedureName TEXTEQU < >
ENDIF If a procedure is currently open, generate an ENDP statement for that procedure and set the global variable ???procedureName to a null string.

ENDIF
ENDM
End the macro and return to its caller.
4. ROM Stack Macros
  4.1. CREATE_ROM_STACK macro
  The CREATE_ROM_STACK macro is used by the present invention to create a ROM stack. The ROM stack is a mechanism for returning to a caller in a different segment while minimizing the impact on memory. It may be used in code that executes when the processor is first powered on since no Random Access Memory is then available to store the return address until that memory has been initialized.
  CREATE_ROM_STACK MACRO
  The CREATE_ROM_STACK macro creates the ROM stack and provides a small dispatcher to return to the caller. Register BP is used as the offset to return to.
    LOCAL returnDispatcher
    LOCAL romStackLabel
    These are local variables used by the macro.
    % romStackLabel CATSTR <romStack>, <???currSegmentName>
    Create the name of the romStackLabel from the string <romStack> and the current segment name.
    % PUBLIC romStackLabel
    %romStackLabel LABEL BYTE
      DW OFFSET returnDispatcher
      DW SEG returnDispatcher
    Define the name of the romStackLabel as an externally visible name containing the far address of returnDispatcher in the current code segment.

```
returnDispatcher:
%   mov   sp, OFFSET romStackLabel
    jmp   bp
```

The returnDispatcher resets the stack pointer register to point to the top of the ROM stack and branches to the return address offset stored in the BP register.
  ENDM
  The ROM stack is a mechanism for returning to a caller in a different segment while minimizing the impact on memory. It may be used in code that executes when the processor is first powered on since no Random Access Memory is then available to store the return address until that memory has been initialized.
  The CREATE_ROM_STACK macro is called to create a ROM stack in the current code segment. The INIT_ROM_STACK macro is called to initialize the stack registers, SS and SP, to point to the ROM stack in the current code segment. The ROMCALL macro generates a far jmp instruction after the offset of the return address in the current code segment is saved in the BP register.
  The called procedure preserves the BP register and returns with a normal far return instruction that pops the address of returnDispatcher off of the ROM stack, thus returning to the current code segment. The returnDispatcher code resets the stack pointer and uses the BP register to return to the caller.
  4.2. INIT_ROM_STACK macro
  The INIT_ROM_STACK macro is used by the present invention to initialize the stack registers to point to the ROM stack in the current code segment. The ROM stack is a mechanism for returning to a caller in a different segment while minimizing the impact on memory. It may be used in code that executes when the processor is first powered on since no Random Access Memory is then available to store the return address until that memory has been initialized.
  INIT_ROM_STACK MACRO
  The INIT_ROM_STACK macro initializes the stack registers, SS and SP, to point to the ROM stack in the current code segment.
    LOCAL romStackLabel
    This is a local variable used by the macro.
    %romStackLabel CATSTR <romStack>, <???currSegmentName>
    Create the name of the romStackLabel from the string <romStack> and the current segment name.

```
%   EXTERNDEF romStackLabel:NEAR
%   mov   sp, SEG romStackLabel
    mov   ss, sp
%   mov   sp, OFFSET romStackLabel
    ENDM
```

Declare the name of the ROM stack in the current code segment as external and initialize the stack registers to point to it.
  4.3. ROMCALL macro
  The ROMCALL macro is used by the present invention to call a public procedure in a different component using the ROM stack. The code generated by the ROMCALL macro depends on the Exit Declaration macro and Entry Definition macro for its procedureName that are scanned by the present invention. The information from these macros in turn, is used to generate a global macro variable for the procedureName in the feature include file produced by the present invention and included in each source code file that indicates what code, if any, should be generated.
    ROMCALL MACRO jRoutineName, codeText, jComponent
      EXTJMP jRoutineName, bp, codeText, jComponent
    ENDM
  The ROMCALL macro calls a far routine, jRoutineName, using the ROM stack. It uses the EXTJMP macro to generate a far jmp instruction after saving the offset of the return address in the BP register.
5. List Macros
  A List is an array of sorted, same-sized data structures (called List Entries), referenced by a List Name. One component (called the List Owner) creates the list, giving it a name and format and assigning the segment where the list will be placed in the ROM image. Any other component (including the List Owner) may add List Entries to the list using the List Name. The BIOS Component Linker collects all the Lists and List Entries, groups them by their List Names, sorts them and writes them out to the ROM image. The BIOS Component Linker also fixes up references to the Lists and List Entries.
  5.1. LIST_CREATE macro
  The LIST_CREATE macro is used by the present invention to create a list. It generates information to identify the list that will be picked up by the BIOS Component Linker part of the present invention that builds the list. The LIST_CREATE macro and its parameters are scanned by the present invention so they can be compared to the parameters of the LIST_START macros that define the entries of the list.

LIST_CREATE MACRO listName, listVersion, listSize, listAttribute

The LIST_CREATE macro creates a list. Its parameters are:

listName—Unique name to represent this list;

listVersion—Major.minor version number of list;

listSize—Size of list entry, may be the number of bytes, the name of a qualified type (BYTE, WORD, etc.), or a structure name; and listAttribute—PUBLIC keyword.

Usage: "LIST_CREATE postList, 1.0, postTaskStruc".
   LOCAL ???entrySize
   LOCAL ???listAttr These are local variables used by the macro.
   ???entrySize=0
IFNB <listAttribute>
   IFIDN <listAttribute>, <PUBLIC>
   ???listAttr=1
   ELSE
   ???listAttr=0
   % .ERR <LIST_CREATE: The attribute !'listAttribute!' is illegal>
   ENDIF
ELSE
   ???lisAttr=0
ENDIF Intialize ???entrySize. Validate the listAttribute, if specified, and translate it into a 1 PUBLIC attribute) or 0 (no attribute).

IFNB <listSize>
   IF OPATTR listSize EQ 24h

Ensure the listSize is a structure, qualified type (BYTE, WORD, DWORD, etc . . . ) or an immediate value. If not, generate an error in the ELSE statement.

IF TYPE listsize NE 0
      ???entrySize=SIZEOF (listSize)
   ELSE
      ???entrySize=listsize
   ENDIF
ELSE
   % .ERR <LIST_CREATE: !'listSize!' is not a structure, qualified type, or immediate value>
   ENDIF
ENDIF If listSize has a type, it is a structure or qualified type. The SIZEOF function will return the its size. Otherwise it is an immediate value (number) and no special processing is required.

IFNB <listname>
   IFNB <listVersion>
      IFNB <listSize>
      % SAVE_LIST_CREATE_DATA listname, ???currSegmentName, ???entrySize, listVersion, ???listAttr
      ELSE
      .ERR <LIST_CREATE: Size of list entry is missing>
      ENDIF
   ELSE
   .ERR <LIST_CREATE: List version is missing>
   ENDIF
ELSE
   .ERR <LIST_CREATE: List name is missing>
ENDIF Verify that the listName, listVersion, and listsize have all been specified. Call the SAVE_LIST_CREATE_DATA macro, described below, to save the list creation data. The global variable ???currSegmentName contains the name of current segment.

ENDM

End the macro and return to its caller.

5.2. SAVE_LIST_CREATE_DATA macro

The SAVE_LIST_CREATE_DATA macro is an internal macro that provides a necessary function to the present invention and is never called directly by a source code file.

SAVE_LIST_CREATE_DATA MACRO listName:REQ, listSegment:REQ, \ entrySize:REQ, listVersion:REQ, listAttr:REQ The SAVE_LIST_CREATE_DATA macro is an internal macro used to save the data needed to create a list specified by its parameters in a specially named segment. Its parameters are:

listName (required)—The name of the list;

listSegment (required)—Segment name that the list lives in;

entrySize (required)—Size of list entry;

listVersion (required)—Version number of list; and listAttr (required)—1 (PUBLIC attribute) or 0 (no attribute).

```
listDeclarationSegment SEGMENT
    DB    '&listName'      ; List Name
    DB    0                ; Null terminate the string
    DB    '&listSegment'
    DB    0                ; Null terminate the string
    DW    entrySize        ; Size of list entry
    DB    '&listVersion'   ; Version number
    DB    0                ; Null terminate the string
    DB    listAttr         ; List attributes
listDeclarationSegment ENDS
ENDM
```

The list creation data generated by each call to this macro is merged into a single listDeclarationSegment when the code files containing the calls are compiled, linked, and processed by the product component linker. The listDeclarationSegment in each object file is merged into a single listDeclarationSegment when the object files are linked to form the component .EXE file. The list creation data in the listDeclarationSegment of each component .EXE file is used by the BIOS Component Linker to generate a list header. The listName will become a PUBLIC) label, pointing to the list header in the specified segment of the final ROM image.

5.3. LIST_START macro

The LIST_START macro is used by the present invention to identify a list to which entries are to be added. The LIST_START macro and its parameters are scanned by the present invention so they can be compared to the parameters of the LIST_CREATE macro that created the list.

LIST_START MACRO listName, listVersion, listType, lOverridePriority

The LIST_START macro starts adding entries to the specified version of the specified list. It is used in conjunction with one or more LIST_ENTRY, LIST_DATA, and/or LIST_SORT macros to define the entries and a matching LIST_END macro to end the entries. Its parameters are:

listName—Unique name, declared by a LIST_CREATE macro call;

listVersion—Major.minor version number of list;

listType—Data type of list entry, may be the name of a qualified type (BYTE, WORD, etc.), or a structure name; and lOverridePriority—List entry priority order (CORE, PRODUCT or PLATFORM keyword). This specifies whether the list entries that follow will replace existing list entries with the same name but lower override priority. PLATFORM replaces PRODUCT, PRODUCT replaces CORE and CORE replaces the default.

It initializes the global variables:

???listName—listName,

???listType—listType, and

???listOverride—List entry priority order, and opens a specially named segment.

IFNDEF ???listName
   ???listName CATSTR <LIST_UNDEFINED>
ENDIF
IFDIFI ???listName, <LIST_UNDEFINED>
% .ERR <LIST_START: List !'&???listName!' is already open>
ELSE
  IFB <listName>
  .ERR <LIST_START: List name is missing>
  ELSEIFB <listVersion>
  .ERR <LIST_START: List version is missing>
  ELSEIFB <listType>
  .ERR <LIST_START: List type is missing>
  ELSE Initialize global variable ???listName if necessary and perform some basic error checking.

???listName CATSTR <listName>
  ???listType CATSTR <listType>
  IFNB <lOverridePriority>
    IFIDN <lOverridePriority>, <CORE>
    ???listOverride CATSTR <0F0h>
    ELSEIFIDN <lOverridePriority>, <PRODUCT>
    ???listOverride CATSTR <80h>
    ELSEIFIDN <lOverridePriority>, <PLATFORM>
    ???listOverride CATSTR <010h>
    ELSE
    % .ERR <LIST_START: Override priority type !'lOverridePriority!' is invalid>
    ???listOverride CATSTR <0F0h>
    ENDIF
  ELSE
    ???listOverride CATSTR <0FFh>
  ENDIF No errors have been found so far. Initialize all global variables, translating the override priority into a numeric value. When two list entries are found in the build with the same name, this value allows the BIOS Component Linker to choose one. CORE has lowest priority, PRODUCT is higher and PLATFORM is highest.

IF (OPATTR listType) NE 24h
  .ERR <LIST_START: List type !'listType!' is not a structure or qualified type>
    ???listType CATSTR <ERROR>
  ELSEIF TYPE listType EQ 0
  % . ERR <LIST_START: List type !'listType!' is an immediate value—not a structure or qualified type>
    ???listType CATSTR <ERROR>
  ELSE
    listEntrySegment SEGMENT
  ENDIF
  ENDIF
ENDIF
ENDM Verify that listType is a valid structure or qualified type and open the segment listEntrySegment.

5.4. LIST_END macro

The LIST_END macro is used by the present invention to end a list to which entries have been added.

LIST_END MACRO

The LIST_END macro ends the entries for a list.

IFDEF ???listName
  IFIDNI ???listName, <LIST_UNDEFINED>
  .ERR <LIST_END: The open list has already been closed with LIST_END>
  ELSE
  listEntrySegment ENDS
  ???listName CATSTR <LIST_UNDEFINED>
  ENDIF
ELSE
  .ERR <LIST_END: A list has not been opened with LIST_START>
ENDIF
ENDM Verify that the global variable ???listName specifies an open list. Close segment listEntrySegment and set ???listName to indicate a closed list.

The list entry data enclosed by this listEntrySegment is merged into a single listEntrySegment when the source code files containing these segment declarations are compiled, linked, and processed by the product component linker. The listEntrySegment in each object file is merged into a single listEntrySegment when the object files are linked to form the component .EXE file. The list entry data in the listEntrySegment of each component .EXE file is merged and sorted by the BIOS Component Linker to generate a sorted list in the final ROM image with the list header specified by the LIST_CREATE macro that created the list.

5.5. LIST_ENTRY macro

The LIST_ENTRY macro is used by the present invention to define the entries to be added to a list.

LIST_ENTRY MACRO entryName, entryData, ePriority:=<8000h>, eSortKey, listAttribute The LIST_ENTRY macro creates a list entry by specifying the data to appear in the list and he information necessary to sort the entry. It must appear after a LIST_START macro call and before a LIST_END macro call. Its parameters are:

entryName—Name of the individual list entry. Must be unique within the list;

entryData—The data, within (<) and (>), that will appear in the ROM image. Structure data must be contained within additional curly braces ({) and (});

ePriority—Number used to sort list entries with the same sort key. Low numbers are placed ahead of high numbers. Minimum is 0, maximum is 65535 (0FFFFh) and default is 32768 (8000h);

eSortKey—String used to match the list entry to a master reference list. The entryName is the default sort key; and listAttribute—LABEL and/or PUBLIC.

It also uses the values of three global variables provided by the preceeding START_LIST macro call:

???listName—Name of open list;

???listType—Entry type; and

???listOverride—Override priority number (CORE, PRODUCT, PLATFORM, or none).

Usage: "LIST_ENTRY vgaData, <24h, 45h>".
LOCAL ???qualifiedType
LOCAL ???dataSize
LOCAL ???eData
LOCAL ???eSortKey
LOCAL ???rawData
LOCAL ???listAttr
These are local variables used by the macro.
IFNB <listAttribute>
   IFIDN <listAttribute>, <PUBLIC>
   ???listAttr=1
   ELSEIFIDN <listAttribute>, <LABEL>
   ???listAttr=2
   ELSEIFIDN <listAttribute>, <LABEL OR PUBLIC>
   ???listAttr=3
   ELSEIFIDN <listAttribute>, <PUBLIC OR LABEL>
   ???listAttr=3
   ELSE
   ???listAttr=0
   % .ERR <LIST_ENTRY: The attribute !'listAttribute!' is illegal>
   ENDIF
ELSE
   ???listAttr=0
ENDIF
Parse the listAttribute parameter and translate it into a numeric value. The PUBLIC keyword causes the entryName to be defined as a public label referencing the entryData. The LABEL keyword causes the entryName to be defined as a label (a PUBLIC LABEL if both keywords are specified) within the list without actually generating a list entry. This attribute is useful if an index into a list is needed when the list is composed of optional entries.
IFB <eSortKey>
   ???eSortKey CATSTR <entryName>
ELSE
   ???eSortKey CATSTR <eSortKey>
ENDIF
If the eSortKey parameter is blank, use the entryName parameter as the default sort key.
IFB <entryName>
   .ERR <LIST_ENTRY: Entry name for list data is missing>
ELSEIFB <entryData>
   .ERR <LIST_ENTRY: List data is missing>
ELSEIFNDEF ???listName
   .ERR <LIST_ENTRY: A list has not been started with LIST_START>
ELSEIFIDNI ???listName, <LIST_UNDEFINED>
   .ERR <LIST_ENTRY: The open list has already been closed with LIST_END>
ELSEIFIDNI ???listType, <ERROR>
ELSE
Perform some sanity checking on the input data.
% ???dataSize=SIZEOF ???listType
   ???qualifiedType=TRUE
   IFIDNI ???listType, <BYTE>
   ELSEIFIDNI ???listType, <WORD>
   ELSEIFIDNI ???listType, <DWORD>
   ELSEIFIDNI ???listType, <FWORD>
   ELSEIFIDNI ???listType, <QWORD>
   ELSEIFIDNI ???listType, <TBYTE>
   ELSE
   ???qualifiedType=FALSE
   ENDIF
If we got here then there were no errors. Determine the size of the list type and if it is a structure or qualified type.
IFE ???qualifiedType
   ???eData CATSTR ???listType, <!< >, <entryData>, <!>>
   ???rawData CATSTR <!< >, <entryData>, <!>>
ELSE
   ???eData CATSTR ???listType, < >, <entryData>
   ???rawData CATSTR <entryData>
ENDIF
If the data is not a qualified type then build up the expression "structureName <structureData>" else "dataType data" (e.g. BYTE data).
   % SAVE_LIST_ENTRY_DATA ???listName, entryName, ???eSortKey, ePriority, \ ???listOverride, ???listAttr, ???dataSize, <???eData>, <???rawData>
ENDIF
ENDM
Call the SAVE_LIST_ENTRY_DATA macro to save the list entry and return to the caller.
5.6. SAVE_LIST_ENTRY_DATA macro
The SAVE_LIST_ENTRY_DATA macro is an internal macro that provides a necessary function to the present invention and is never called directly by a source code file.
   SAVE_LIST_ENTRY_DATA MACRO listName, entryName, \ sortKey, sortPriority, overridePriority, \ listAttr, dataSize, listData, listTextData
The SAVE_LIST_ENTRY_DATA macro saves the list entry data specified by its parameters in segment listEntry-Segment opened by the LIST_START macro.

```
DB   '&listName'              ; List Name
DB   0                        ; Null terminate the string
DB   LISTMGR_ENTRY_TYPE       ; Entry type
DB   '&entryName'             ; List entry name
DB   0                        ; Null terminate the string
DB   '&sortKey'               ; List sort key
DB   0                        ; Null terminate the string
DW   sortPriority             ; Sort priority (multiple entries)
DB   override Priority        ; Sort override (CORE, PLATFORM..)
DB   override Priority        ; Data override (CORE, PLATFORM..)
DB   listAttr                 ; List attributes
DW   dataSize                 ; Size of data
@@:
    listData                  ; Generate the data
DB   "&listTextData"          ; Raw list entry data
DB   0                        ; Null terminate the string
ENDM
```

The local label (@@:) defines a location that is filled with the values of the entry data.
5.7. LIST_DATA macro
The LIST_DATA macro is used by the present invention to override the data for a list entry.
   LIST_DATA MACRO entryName, entryData, eAttributes
The LIST_DATA macro must appear after a LIST_START macro call and before a LIST_END macro call. Its parameters are:
   entryName—Name of list entry that will have its entryData changed;

entyData—New data for list entry; and eAttributes—LABEL and/or PUBLIC.

It also uses the values of three global variables provided by the preceeding START_LIST macro call:

???listName—Name of open list;

???listType—Entry type; and

???listOverride—Override priority number (CORE, PRODUCT, PLATFORM, or none).

LOCAL ???dataSize
    LOCAL ???qualifiedType
    LOCAL ???eData
    LOCAL ???rawData
    LOCAL ???listAttr These are local variables used by the macro.

IFNB <eAttributes>
  IFIDN <eAttributes>, <PUBLIC>
    ???listAttr=1
  ELSEIFIDN <eAttributes>, <LABEL>
    ???listAttr=2
  ELSEIFIDN <eAttributes>, <LABEL OR PUBLIC>
    ???listAttr=3
  ELSEIFIDN <eAttributes>, <PUBLIC OR LABEL>
    ???listAttr=3
  ELSE
    ???listAttr=0
    % .ERR <LIST_DATA: The attribute !'eAttributes!' is illegal>
  ENDIF
ELSE
  ???listAttr=0
ENDIF Parse the eAttributes parameter and translate it into a numeric value. The PUBLIC keyword causes the entryName to be defined as a public label referencing the entryData. The LABEL keyword causes the entryName to be defined as a label (a PUBLIC LABEL if both keywords are specified) within the list without actually generating a list entry. This attribute is useful if an index into a list is needed when the list is composed of optional entries.

IFB <entryName>
  .ERR <LIST_DATA: The list entry name is missing>
ELSEIFB <entryData>
  .ERR <LIST_DATA: The list entry data is missing>
ELSEIFNDEF ???listName
  .ERR <LIST_DATA: A list has not been started with LIST_START>
ELSEIFIDNI ???listName, <LIST UNDEFINED>
  .ERR <LIST_DATA: The open list has already been closed with LIST_END>
ELSEIFIDNI ???listType, <ERROR>
ELSE
  % ???dataSize=SIZEOF ???listType Verify that an open list exists and that all the required parameters are present. Determine the size of a list entry.

???qualifiedType=TRUE
  IFIDNI ???listType, <BYTE>
  ELSEIFIDNI ???listType, <WORD>
  ELSEIFIDNI ???listType, <DWORD>
  ELSEIFIDNI ???listType, <FWORD>
  ELSEIFIDNI ???listType, <QWORD>
  ELSEIFIDNI ???listType, <TBYTE>
  ELSE
    ???qualifiedType=FALSE
  ENDIF Determine if the List type is a structure or qualified type.

IFE ???qualifiedType
  ???eData CATSTR ???listType, <!< >, <entryData>, <!>>
  ???rawData CATSTR <!< >, <entryData>, <!>>
ELSE
  ???eData CATSTR ???listType, < >, <entryData>
  ???rawData CATSTR <entryData>
ENDIF If the data is not a qualified type then build up the expression "structureName <structureData>" else "dataType data" (e.g. BYTE data).

% SAVE_LIST_OVERRIDE_DATA ???listName, entryName, ???dataSize, \ <???eData>, <???rawData>, ???listOverride, ???listAttr
ENDIF
ENDM Call the SAVE_LIST_OVERRIDE_DATA macro to save the list override data and return to the caller.

5.8. SAVE_LIST_OVERRIDE_DATA macro

The SAVE_LIST_OVERRIDE_DATA macro is an internal macro that provides a necessary function to the present invention and is never called directly by a source code file.

SAVE_LIST_OVERRIDE_DATA MACRO listName, entryName, dataSize, listData, \ listTextData, overridePriority, attributes The SAVE_LIST_OVERRIDE_DATA macro saves the list override data specified by its parameters in segment listEntrySegment opened by the LIST START macro.

```
        DB    '&listName'          ; List Name
        DB    0                    ; Null terminate the string
        DB    LISTMGR_OVERRIDE_TYPE   ; Override type
        DB    '&entryName'         ; List entry name
        DB    0                    ; Null terminate the string
        DB    overridePriority     ; Override priority
        DB    attributes           ; List attributes
        DW    dataSize             ; Size of data
@@:
        listData                   ; Generate the data
        DB    "&listTextData"      ; Raw list entry data
        DB    0                    ; Null terminate the string
ENDM
```

The local label (@@:) defines a location that is filled with the values of the entry data.

5.9. LIST_SORT macro

The LIST_SORT macro is used by the present invention to change the sort criteria for a list try.

LIST_SORT MACRO entryName, ePriority:=<8000h>, eSortKey

The LIST_SORT macro must appear after a LIST_START macro call and before a LIST_END macro call. Its parameters are:

entryName—Name of the list entry that will have its sort order changed;

ePriority—Number used to sort list entries with the same sort key. Low numbers are placed ahead of high numbers. Minimum is 0, maximum is 65535 (0FFFFh) and default is 32768 (8000h);

eSortKey—String used to match the list entry to a master reference list. The entryName is the default sort key.

It also uses the values of three global variables provided by the preceeding START_LIST macro call:

???listName—Name of open list;

???listType—Entry type; and

???listOverride—Override priority number (CORE, PRODUCT, PLATFORM, or none).
  LOCAL ???eSortKey The local variable used by this macro.

```
IFB <eSortKey>
    ???eSortKey CATSTR <entryName>
ELSE
    ???eSortKey CATSTR <eSortKey>
ENDIF
```

If the eSortKey parameter is blank, use the entryName parameter as the default sort key.

```
IFB <entryName>
    .ERR <LIST SORT: Entry name for list data is missing>
ELSEIFNDEF ???listName
    .ERR <LIST_SORT: A list has not been started with LIST_START>
ELSEIFIDNI ???listName, <LIST_UNDEFINED>
    .ERR <LIST_SORT: The open list has already been closed with LIST_END>
ELSEIFIDNI ???listType, <ERROR>
ELSE
    % SAVE_LIST_SORT_DATA ???listName, entryName, ???eSortKey, ePriority, ???listOverride
ENDIF
ENDM
```

Do some sanity checking, and if everything checks out, save the new sort data.

5.10. SAVE_LIST_SORT_DATA macro

The SAVE_LIST_SORT_DATA macro is an internal macro that provides a necessary function to the present invention and is never called directly by a source code file.

SAVE_LIST_SORT_DATA MACRO listName, entryName, sortKey, \ sortPriority, overridePriority The SAVE_LIST_SORT_DATA macro saves the list sort data specified by its parameters in segment listEntrySegment opened by the LIST_START macro.

```
DB   '&listName'                    ; List Name
DB   0                              ; Null terminate the string
DB   LISTMGR_SORT_TYPE   ; Sort type
DB   '&entryName'                   ; List entry name
DB   0                              ; Null terminate the string
DB   overridePriority               ; The ultimate entry to use
DB   '&sortKey'                     ; List sort key
DB   0                              ; Null terminate the string
DW   sortPriority                   ; Sort priority (multiple entries)
ENDM
```

5.11. MASTER_START macro

The MASTER_START macro is used by the present invention to start the definition of a master index.

The BIOS Component Linker part of the present invention sorts List Entries according to the order of the Sort Keys in the Master Index. There is, at most, one Master Index per List. The Master Index, usually found in the List Owning component, is in a seperate assembly source file to facilitate overriding. The Master Index is created with three macros, MASTER_START, MASTER_ENTRY and MASTER_END.

MASTER_START MACRO listName, attrib

The MASTER_START macro must be called before any MASTER_ENTRY or MASTER_END macros are called. Its parameters are:

listName—The fully qualified list name (including component path) that this Master Index is associated with; and attrib—LOCKED keyword. If LOCKED, then this is a Locked Index; otherwise it is a Master Index.

A Locked Index is a special form of the Master Index. Instead of using the Sort Key to determine the final ordering of List Entries, Locked Indexes use the List Entry name instead. The MASTER_START macro initializes the global variables:

???masterName—listName, and

???masterAttribs—Master or Locked index, opens a specially named segment and saves the values of these global variables in this segment.

```
IFNDEF ???masterName
    ???masterName CATSTR <MASTER_LIST_CLOSED>
ENDIF
IFIDN ???masterName, <MASTER_LIST_CLOSED>
    masterIndexSegment SEGMENT
```

Initialize global variable ???masterName, if necessary, perform some consistency checking and open segment masterIndexSegment.

```
IFNB <attrib>
    ???masterAttribs=1
    IFDIF <attrib>, <LOCKED>
        % .ERR <MASTER_START: !'attrib!' is an invalid attribute>
    ENDIF
ELSE
    ???masterAttribs=0
ENDIF
```

Translate the attrib parameter into a numeric value and set global variable ???masterAttribs to indicate whether a Master or Locked index was specified.

```
IFNB <listName>
    ???masterName CATSTR <listName>
ELSE
    .ERR <MASTER_START: The list name is missing>
    ???masterName CATSTR < >
ENDIF
% SAVE_MASTER_INFO_START ???masterName, ???masterAttribs
ELSE
    % .ERR <MASTER_START: Master index list !'&???masterName!' is already open>
ENDIF
ENDM
```

Store the listName in global variable and call SAVE_MASTER_INFO_START to save the values of the global variables. Generate errors if the parameters or global variables were not consistent.

5.12. SAVE_MASTER_INFO_START macro

The SAVE_MASTER_INFO_START macro is an internal macro that provides a necessary function to the present invention and is never called directly by a source code file.

```
SAVE_MASTER_INFO_START MACRO masterListName, attributes
   DB    '&masterListName'   ; Master List Name
   DB    0                   ; Null terminate the string
   DW    attributes          ; List attributes
ENDM
```

The SAVE_MASTER_INFO_START macro saves the values of its parameters in the segment opened by the MASTER_START macro.

5.13. MASTER_END macro

The MASTER_END macro is used by the present invention to end the definition of a master index.

MASTER_END MACRO

The MASTER_END macro ends the definition of a master index. It must appear following a MASTER_START macro call.

```
   IFNDEF ???masterName
      .ERR <MASTER_END: A master index was not started with MASTER_START>
   ELSEIFIDNI ???masterName, <MASTER_LIST_CLOSED>
      .ERR <MASTER_END: The master index was already closed with MASTER_END>
   ELSE
      SAVE_MASTER_INFO 0
      masterIndexSegment ENDS
      ???masterName CATSTR <MASTER_LIST_CLOSED>
   ENDIF
ENDM
```

Verify a master list is open. Save a null master list entry to mark end of list. Close the master index segment and mark ???masterName as MASTER_LIST_CLOSED.

5.14. MASTER_ENTRY macro

The MASTER_ENTRY macro is used by the present invention to insert a list entry into the master index.

MASTER_ENTRY MACRO keyName

The MASTER_ENTRY macro must follow a MASTER_START macro call and preceed a MASTER_END macro call. Its parameter is:

keyName—Name used to create an association between a specific list entry and this master index position. It must be either a Sort Key (Master Index) or List Entry name (Locked Index).

```
   IFNDEF ???masterName
      .ERR <MASTER_ENTRY: A master index list has not been opened with
MASTER_START>
   ELSE
      IFDIF ???masterName, <MASTER_LIST_CLOSED>
      % SAVE_MASTER_INFO keyName
      ELSE
      % .ERR <MASTER_ENTRY: The master index list has already been closed with
MASTER_END>
```

ENDIF
ENDIF
ENDM

Check that a master list has been started. Call the SAVE_MASTER_INFO macro to store the Sort Key or List Entry name.

5.15. SAVE_MASTER_INFO macro

The SAVE_MASTER_INFO macro is an internal macro that provides a necessary function the present invention and is never called directly by a source code file.

```
SAVE_MASTER_INFO MACRO keyName
   IFDIF <keyName>, <0>
      DB   '&keyName'        ; Index name
   ENDIF
      DB   0                 ; Null terminate the string
ENDM
```

The SAVE_MASTER_INFO macro saves the keyName specified by its parameter in the special segment opened by the preceeding MASTER_START macro call.

6. Include Macros

6.1. PUBLIC_INCLUDE_START macro

The PUBLIC_INCLUDE_START macro is used by the present invention to identify a public include file. The PUBLIC_INCLUDE_START macro and its parameters are scanned by the present invention so they can be compared to the parameters of the PUBINC macros that include the file.

Include files reside in the component that logically "owns" the definitions in them. If the definitions are to be used by other components in other directories, the include file will declare itself as public by using the PUBLIC_INCLUDE_START macro. External components will reference the include file using the class/subclass and filename specified by a PUBINC macro. The physical location of the include file used will be determined by the build process.

Like interfaces, the usage of a public include file will include the major and minor version of the "interfaces" (not file version) expected for the file.

PUBLIC_INCLUDE_START MACRO classPath, version

The PUBLIC_INCLUDE_START macro marks the start of a public include file that can be used by other components in other directories. Its parameters are:

classPath—Class name and zero or more subclass names seperated by periods (.); and version—Major.minor version number of the interfaces expected for the file.

```
   IFB <version>
      .ERR <PUBLIC_INCLUDE_START: !Version number for public include missing>
   ENDIF
   IFB <classPath>
      .ERR<PUBLIC_INCLUDE_START: Class path information is missing>
   ENDIF
ENDM
```

Verify that both the classPath and version parameters have been specified.

The parameters of each PUBLIC_INCLUDE_START macro call are scanned from the include file and entered in a database along with the include file name and directory path. This allows the BIOS Development System to merge any interface information it scanned from the include file with interface information from the source file that included it, before compilation.

6.2. PUBINC macro

The PUBINC macro is used by the present invention to include a public include file defined in a different component. The PUBINC macro and its parameters are scanned by the present invention so they can be compared to the parameters of the PUBLIC_INCLUDE_START macro that defines the file.

PUBINC MACRO classpath, fileName, version

The PUBINC macro includes an external include file into the build. The external include file is outside of the current directory and component. Its parameters are:

classPath—Class name and zero or more subclass names seperated by periods (.);

fileName—Name of include file; and version—Major.minor version number of the interfaces expected for the file.

Usage: "PUBINC post.dispatcher, postdisp.inc, 1.0".
LOCAL ???incPath
The local variable used by the macro.
IFNB <classPath>
  IFNB <fileName>
  GET_SYMBOL_NAME classPath
  ???incPath CATSTR <I_>, ???symbol
% INCLUDE ???incPath\\fileName
  IFB <version>
    .ERR <PUBINC: The include file version is missing>
  ENDIF
  ELSE
  .ERR <PUBINC: The include file name is missing>
  ENDIF
ELSE
  .ERR <PUBINC: The include file feature path is missing>
  ENDIF
ENDM Verify that all the parameters are present. Call the GET_SYMBOL_NAME macro to return global variable ???symbol containing classPath with each period (.) replaced with an underscore (_). Form the name of the global variable containing the directory path of the include file by prefixing the value of ???symbol with an I_. If classPath is post.dispatcher then ???incPath is I_post_dispatcher. Include the file with an INCLUDE directive (i.e., command) that uses the directory path in the global variable.

The BIOS Development System generates a feature include file "feature.inc" that is included in each source code file in the source code library. It defines a global variable for each public include file declared by a PUBINC macro call containing the directory path of the include file, e.g. I_post_dispatcher TEXTEQU <@Environ(MANTICORE)\post\dispatcher>.

APPENDIX A: SOURCE LIBRARY FOR PLATFORMTYPE DESKTOP

| Directory of c:\BIOS\core | | |
|---|---|---|
| 4-26-99 | 1:23p | 11,645 bda.inc |
| 7-23-99 | 7:42a | 795 beep.obj |
| 7-23-99 | 7:42a | 453 chksum.obj |
| 7-23-99 | 7:42a | 559 compat.obj |
| 7-23-99 | 7:42a | 18,564 compnent.exe |
| 7-28-99 | 9:48p | 1,110 compnent.inf |
| 7-23-99 | 7:42a | 803 compnent.map |
| 7-23-99 | 7:42a | 2,261 dispinit.obj |
| 7-23-99 | 7:42a | 1,423 dispintf.obj |
| 7-23-99 | 7:42a | 871 disputil.obj |
| 7-23-99 | 7:42a | 4,274 exe.obj |
| 7-23-99 | 7:42a | 675 fillint.obj |
| 7-23-99 | 7:42a | 577 getnext.obj |
| 7-22-99 | 10:44a | 3,988 makefile |
| 7-23-99 | 7:42a | 3,080 module.obj |
| 7-23-99 | 7:42a | 1,529 service.obj |
| Directory of c:\BIOS\core\beep | | |
| 4-26-99 | 2:15p | 4,448 beep.asm |
| 4-26-99 | 1:20p | 1,375 feature.inc |
| 5-24-99 | 10:19a | 1,058 feature.inf |
| Directory of c:\BIOS\devref\intel\440bx | | |
| 7-22-99 | 2:49p | 143,245 binlink.out |
| 7-22-99 | 2:49p | 262,144 bios.rom |
| 6-29-99 | 9:15a | 1,503 bios.scr |
| 6-03-99 | 12:14p | 44,823 devutils.asm |
| 7-22-99 | 2:49p | 313 dispat¯1.out |
| 6-25-99 | 8:25a | 4,865 dmainit.asm |
| 7-29-99 | 7:20a | 245 hook.asm |
| 7-28-99 | 12:06p | 5,809 init.asm |
| 7-22-99 | 9:01a | 3,514 makefile |
| 7-22-99 | 2:49p | 34,650 modules.out |
| 7-29-99 | 1:12p | 245 myfile.asm |
| 8-12-99 | 4:38p | 113 platform.cfg |
| 8-12-99 | 4:38p | 113 platform.old |
| 6-16-99 | 3:29p | 4,142 register.asm |
| 7-22-99 | 2:49p | 2,401 stackl¯1.out |
| 7-22-99 | 2:49p | 1,651 tasklist.out |

APPENDIX B: LIST MANAGER COMPONENT

APPENDIX B: LIST MANAGER COMPONENT

1. Overview

Numerous components need the ability to create and manage lists of related data structures from multiple components of the BIOS. Examples of lists are seen in Setup, POST Tasks, Plug and Play device nodes, SMI handlers and others. This document describes the design, macros and functions associated to the list management for Manticore

2. Related Documents

| Title | |
|---|---|
| Manticore High Level Design Specification | Frances Cohen, Marc Sandusky, Robert Lusinsky, Marc Bombet |
| Manticore BIOS Source Code Low Level Design Specification | Frances Cohen |

3. Terms Used

Below is a list of terms used in this document.

*List* – Array of sorted, same-sized data structures (List Entries), referenced by a List Name.
*List Data* - The actual data that gets placed in the ROM image. Does not include the key, name or priority.
*List Entry* – Individual data structure that make up a List, along with its associated name, key and priority.
*List Header* – Small structure placed before the List in the final ROM image, containing the number of entries and the size of each entry.
*List Name* – A unique name identifying a list.
*List Owner* – The component that creates the list.
*List Manager* – Component that controls access to lists and provides common utility functions.
*Master Index* – List of all possible List Entry keys for a particular list. Not all lists have a Master Index. The List Entries are sorted according to the position of the key within this file. All possible keys for a list must appear in the Master Index.
*Locked Index* – Special form of the Master Index used to guarantee exact order of List Entries. The List Entries are sorted according to the position of the List Entry name (not the Sort Key) within this file.

4. Design

A List is an array of sorted, same-sized data structures (called List Entries), referenced by a List Name. One component (called the List Owner) creates the List, giving it a name and format and assigning where the List will exist during BIOS execution. Any other component (including the List Owner) may add List Entries to the List by using the List Name. The Binary Linker collects all the Lists and List Entries, groups them by their List Name, sorts them and writes them out to the BIOS. The Binary Linker also fixes up references to the Lists and List Entries.

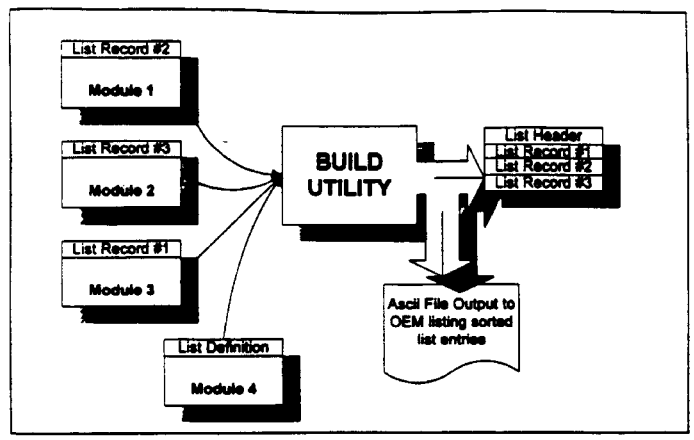

Figure 1: List Collection

The Binary Linker utility places the sorted List Data in the ROM image. The placement depends on the segment attributes found in the list declaration. The Binary Linker places a List Header before the List Data, which contains the number of List Entries and the size of each List Entry.

| Offset | Length | Description |
|--------|--------|-------------|
| 0 | 2 | Number of list entries. |
| 2 | 2 | Size of each list entry (in bytes). |

Figure 2: List Header

The List Header is always paragraph aligned. The public label created from the List Name points to the List Header. The size of the List Header is not guaranteed, and may change in future revisions.

4.1 Creating A List

Each List must be created, once, by the owning component/feature, using the LIST_CREATE macro (page 10). If the list is sorted using a Master Index, the Master Index file is also a part of the owning component. If two Lists are created with the same name, the Binary Linker will generate an error.

```
LIST_CREATE   devnodes, 1.0, devNodeListStruct
```

The List must have three things: a name, a version number, and an entry size. The name must not conflict with any other List or procedure.

The List version number indicates changes in the structure or function of the List. The version number is made up of two parts, major version and minor version, separated by a period '.'. Higher numbers imply later revisions. When the major version changes, any List Entry with a lower or higher major version will cause the Binary Linker to generate an error. When the minor version changes, any List Entry with a greater minor version will cause the Binary Linker to generate an error.

The entry size is a number, qualified type (such as BYTE, WORD, etc.) or structure name specifying the size of the List Data for each List Entry. This size is placed in the second field of the List Header.

4.2 Creating An Entry

Any component or feature can add List Entries to a List, using the LIST_START (page 13), LIST_END (page 11) and LIST_ENTRY (page 11) macros.

```
LIST_START   pnp.devnodes, 1.0, devNodeListStruct
  LIST_ENTRY pnpDevNodeName,<{...}>
LIST_END
```

4.2.1 LIST_START Usage

LIST_START starts a block of List Entries, giving the information that is common for all, including the List Name, the List version number, the List Entry size, and the List Entry Override Priority.

```
LIST_START listName,listVersion,entrySize,overridePriority
```

The List Name gives the List Owner, followed by the List Name (just like function names). The Binary Linker generates a warning if List Entries are created for a nonexistent List.

The List version number indicates the following List Entries are designed for the specified revision of the List. The version number is broken up into two parts: the major version and minor version. Higher numbers imply later revisions. When the major version of a List Entry is not equal to the major version of the List, the Binary Linker will generate an error. When the minor version of a List Entry is higher than the minor version of the List, the Binary Linker will generate an error.

The List Entry size specifies how many bytes the List Data for each List Entry takes. This must be a MASM qualified type (i.e. BYTE, WORD, etc.) or a structure name.

An additional option, the List Entry override priority specifies whether the List Entries that follow will replace existing List Entries with the same name but a lower override priority. There are currently three predefined values for this field: CORE (for core code), PRODUCT (for product line code), PLATFORM (for platform code). The default value, if not specified, is CORE.

For example, the core could specify that POST task *x* will occur at Test Point 50, using the override priority "CORE." But, a customer has a product line *y* where all of the platforms relocate POST task *x* to Test Point 90. So, the customer creates another List Entry in an OEM "Product-Line" Component, and uses the override prioirty "PRODUCT." Finally, in product line *y*, there is a single platform that breaks the mold and wants to move POST task *x* back to Test Point 33. So the customer creates another List Entry in the OEM "Platform" Component and uses an override priority "PLATFORM."

When the Binary Linker sees multiple List Entries with the same name, but different Override Priorities, it chooses Platform over Product and Product over Core.

4.2.2 LIST_ENTRY Usage

LIST_ENTRY describes the information about a single List Entry, including its name, the List Data, its Sort Key and Sort Priority.

```
LIST_ENTRY entryName,<listData>,sortPriority,sortKey
```

The List Entry name (along with the List Entry override priority) uniquely identifies it within the List. The List Entry name can be used as a label pointing to the List Data. It is also used for sorting and for overriding. If another List Entry is found with the same Override Priority, the Binary Linker generates an error.

The List Data contains, in angle brackets, the exact data to be placed after the List Type (from LIST_START). Structures must contain additional curly braces '{' and '}'. This is the data that will actually appear in the ROM image.

The Sort Key and Sort Priority determine the ordering of the List Entries within the List. The Sort Key is standard name or else empty. The ordering behavior depends on the Sort Key and the presence of a Master Index or Locked Index, as indicated in the following table:

| Sort Key Present? | Master Index Present? | Locked Index Present? | Result |
|---|---|---|---|
| No | No | No | List Entries are sorted based on the Sort Priority. |
| No | No | Yes | List Entries are sorted based on the order of their name in the Locked Index. Error if the List Entry name is not found in the Locked Index. |
| No | Yes | No | Error (Master Index requires Sort Key) |
| No | Yes | Yes | Error (Master Index requires Sort Key) |
| Yes | No | No | Error (Sort Key requires a Master Index) |
| Yes | No | Yes | Error (Sort Key requires a Master Index) |
| Yes | Yes | No | List Entries are sorted based on the order of the Sort Keys in the Master Index. Error if Sort Key not found in the Master Index. |
| Yes | Yes | Yes | List Entries are sorted based on the order of their name in the Locked Index. Error if the List Entry name is not found in the Locked Index. |

4.2.3 LIST_END Usage
LIST_END marks the end of a block of List Entries.

4.3 Using A List
The List Manager (*listmgr*) provides utility functions for accessing lists. For a complete list of functions, see Public Functions (page 14). This section provides guidelines for common tasks using the List Manager.

4.3.1 Finding The Start Of A List
There are two steps to finding the start of a list.

1. Either create the list (LIST_CREATE, page 10) or declare it external (PUBEXT).
2. Load the address of the list, using LOADADDR.

- 109 -

For example,

```
PUBEXT     posttask,1.0,SUBSTITUTE
LOADADDR   posttask                    ; GS:DI = List Header
```

The SUBSTITUTE attribute is used with PUBEXT so that if the list has no entries, GS and DI will contain 0xFFFF. The List Manager detects empty lists by checking DI for this value. If OPTIONAL were used (instead of SUBSTITUTE), then LOADADDR would generate no code if the list was empty. Without SUBSTITUTE or OPTIONAL, LOADADDR would cause the Binary Linker to generate an error if the list were empty.

4.3.2 Looping Through A List

To process all of the entries in the list, the List Manager provides the getNext function.

For example,

```
EXTINC     listMgr,listmgr.inc,1.0      ; Has List Manager macros

PUBEXT     posttask,1.0,SUBSTITUTE
PUBEXT     listMgr.getNext,1.0

LOADADDR   posttask              ; GS:DI = List Header
loop1:
       EXTCALL    listMgr.getNext       ; GS:DI = First Entry
       jc         exitLoop1             ; End of list
       ...Your code here...
       jmp        loop1 exitLoop1:
```

4.4 Master Index

The Binary Linker uses Master Indexes to sort List Entries that have sort keys. There is, at most, one Master Index, per List. The Master Index is .ASM file, usually found in List Owning component, but in a separate file, to facilitate overriding. The Master Index is created using three macros, MASTER_START, MASTER_ENTRY and MASTER_END.

For example,

```
MASTER_START  post.postTask
   MASTER_ENTRY TpVerifyRealMode        ; 1st POST Task
   MASTER_ENTRY TpChipsetInit           ; 2nd POST Task
   MASTER_ENTRY TpVideoInit             ; 3rd POST Task
   ...
MASTER_END
```

The name following MASTER_START is the List Name (per LIST_CREATE). The name following MASTER_ENTRY is the Sort Key, as found in List Entry.

- 110 -

The Binary Linker sorts List Entries according to the order of the Sort Keys in the Master Index. The Binary Linker will generate an error if:

1. A List Entry has a Sort Key, but no Master Index has been specified for the List.
2. The Sort Key for a List Entry cannot be found in the Master Index.
3. The Master Index is found, but there is no corresponding List.

The Master Index file can be overridden normally.

4.5 List Output

The Binary Linker will output the final contents of a List into an assemblable file with the name *listname*.out, where *listname* is the fully qualified component path to the list. For example, the contents of the list post.postTasks would be output to post.postTasks.out.

The List Output file has a well-defined format, which is broken into two sections: comment and code. The comment section contains the human- (and debugger-) readable information about the final list contents, including the actual binary data generated for each List Entry. The code section contains a Locked Index, describing the exact order of the List Entries in the build. The List Output file can be used as a Locked Index file. See Locked Index (page 7) for more information.

4.5.1 Comment Section

The comment section begins on a new line with the tag ";$$COMMENTSTART$$" as the first non-whitespace character. The comment section ends on a new line with the tag ";$$COMMENTEND$$" as the first non-whitespace character. All lines within comment section must begin with a ';' as the first non-whitespace character.

Before any other Comment Section statements appear, the keyword "CommentVersion(x.x)" must appear, where x.x is the major and minor version numbers of the Comment Section format. Major numbers imply changes that are not backward compatible. Minor number implies backward compatible changes.

What follows are LIST_CREATE, LIST_START and LIST_ENTRY macros describing the List, as if all List declaraction statements had been done in a single .ASM file (including overridden versions). There are two differences. First, all lines are prefixed with a ';'. Second, the actual hex data generated by the LIST_ENTRY macros appears on a line immediately following the LIST_ENTRY macro (16 bytes per line).

For example:

```
;$$COMMENTSTART$$
;CommentVersion(1.0)
;
;LIST_CREATE postTask,1.0,postTaskStruct
;LIST_START postTask,1.0,postTaskStruct
;* LIST_ENTRY postEntry1,<{...}>,TpPostEntry1,0x8000
;    ; 8000F00869
; LIST_ENTRY postEntry1,<{...}>,TpPostEntry2,0x4000,SORT_KEY+SORT_PRIORITY
;    ; 8000F00973
;   LIST_ENTRY postEntry2,<{...}>,TpPostEntry2,0x8000
;    ; 8000F00A90
; ...
;LIST_END
```

```
;
;SSCOMMENTEND$$
```

4.5.2 Code Section

The code section contains the exact List ordering, in the form of a Locked Index. See page 7 for more information.

4.6 Locked Index

The Locked Index is a special form of the Master Index, which is used by OEMs to fix the ordering of the List Entries in a List. Instead of using the Sort Key to determine the final ordering of List Entries, Locked Indexes use the List Entry name instead. There can be, at most, one Locked Index for each list. Most of the time, Locked Indexes are renamed versions of the List Output file (see page 6).

A Locked Index is created by using the same macros as Master Indexes, except that MASTER_START has the attribute LOCKED specified as the second parameter. See MASTER_START (page 14) for more information.

The Binary Linker generates an error if:

1. A Locked Index is found for a List, which has not been created with LIST_CREATE.
2. A List Entry name is not found in the Locked Index.
3. An entry appears in the Locked Index without a corresponding List Entry.

4.7 Binary Linker Information

Each of the described macros must place information within the image of the component to be used by the Binary Linker. These data structures are detailed below:

List Structure

Segment: listDeclarationSegment

| Name | Size | Description |
|---|---|---|
| listName | STRING | List name |
| 0 | BYTE | Null termination of string |
| listSegment | STRING | List segment name |
| 0 | BYTE | Null termination of string |
| listEntrySize | WORD | Number of bytes taken up by each list entry. |
| listVersion | STRING | Raw string of list version number |
| 0 | BYTE | Null termination of string |
| listAttribute | BYTE | Bit 0: <0> = 1 – All list entries are public regardless of individual list entry attributes. <0> = 0 – All list entries are private unless the list entry is declared public using the list entry attribute. Bits 1 – 7: Reserved |

List Entry Structures

Segment: listEntrySegment

The following structures are used to insert list entries, override sort order of list entries, and override data of list entries. Each structure begins with the list name followed by a NULL byte and a byte for the structure type. The structure type signifies the type of fix-up information represented in the structure.

List Entry – Fix-up type 1

| Name | Size | Description |
|---|---|---|
| listName | STRING | List name. |
| 0 | BYTE | Null terminate string |
| 1 | BYTE | Fix-up type (List entry) |
| entryName | STRING | List Entry name. |
| 0 | BYTE | Null terminate string |
| sortKey | STRING | Sort Key |
| 0 | BYTE | Null terminate string |
| sortPriority | WORD | Priority of the entry. |
| sortOverride | BYTE | Sort order override priority (Equals overridePriority given in LIST_START macro). A lower number has a higher priority. |
| dataOverride | BYTE | Priority of item over other times with the same entry name. (Equals overridePriority given in LSIT_START macro). A lower number has a higher priority. |
| entryAttribs | BYTE | Bit 0: 1 = Public, 0 = Private<br>Bit 1: 1 = Label, 0 = No Label<br>Bits 2-7: Reserved |
| listEntrySize | WORD | Number of bytes taken up by each list entry. Size must match size in LIST_CREATE or tools will generate an error. |
| listData | listEntrySize | List Data. Always exactly listEntrySize bytes in length. |
| listData | STRING | Raw list entry text |
| 0 | BYTE | Null termination of string |

Sort Order Override – Fix-up type 2

| Name | Size | Description |
|---|---|---|
| listName | STRING | List name. |
| 0 | BYTE | Null terminate string |
| 2 | BYTE | Fix-up type (Sort order override) |
| entryName | STRING | List Entry name. |
| 0 | BYTE | Null terminate string |
| overridePriority | BYTE | Priority of item over other times with the same entry name. A lower number has a higher priority. |
| sortKey | STRING | Sort Key |
| 0 | BYTE | Null terminate string |
| sortPriority | WORD | Priority of the entry. A higher number has a higher priority. |

List Data Override – Fix-up type 3

| Name | Size | Description |
|---|---|---|
| listName | STRING | List name. |
| 0 | BYTE | Null terminate string |
| 3 | BYTE | Fix-up type (List data override) |
| entryName | STRING | List Entry name. |
| 0 | BYTE | Null terminate string |
| overridePriority | BYTE | Priority of item over other times with the same entry name. A lower number has a higher priority. |
| attributes | BYTE | Bit 0: 1 = Public, 0 = Private<br>Bit 1: 1 = Label, 0 = No Label<br>Bits 2-7: Reserved |
| listEntrySize | WORD | Number of bytes taken up by each list entry. Size must match size in LIST_CREATE or tools will generate an error. |
| listData | listEntrySize | List Data. Always exactly listEntrySize bytes in length. |
| listData | STRING | Raw list entry text |
| 0 | BYTE | Null termination of string |

Master Index/Locked Index

Segment:  masterIndexSegment

| Name | Size | Description |
|---|---|---|
| listName | STRING | List name |
| 0 | BYTE | Null termination of list name |
| listAttributes | WORD | Bits 0: 0 = Master Index, 1 = Locked Index<br>Bits 1-15: Reserved |
| indexName | STRING | Strings containing the index. The last index will have a length of 0 (i.e. 0x00 only) |
| 0 | BYTE | Null termination of index name |

5. Public Macros

5.1 LIST_CREATE

DESCRIPTION: Creates a list. The name of the list must be unique across all components.

The List Name will become a public label, pointing to the list header in the final ROM image. Other BIOS code can use LOADADDR to retrieve the address. The list is placed the segment in which the LIST_CREATE macro is used.

The Binary Utility uses the information to sort the list and place it in the desired location in the ROM. It also creates an output file using the specified List Name, with the extension '.out'. The format of the file is described under List Output (page 6).

Example:
```
LIST_CREATE devnodes,1.0, devNodeListStruc

LOADADDR devnodes    ; GS:DI = start of devnodes list
```

ENTRY:
| | | |
|---|---|---|
| | Name | *listName*. Unique name to represent this list. The name must contain only standard symbol characters (A..Z,a..z,0..9 or '_'). |
| | Version | *listVersion*. Major.minor version number. Increasing numbers imply later versions. |
| | Number \| Qualified Type \| Structure Name | *listEntrySize*. Number of bytes taken up by each List Entry. Can be a number, the name of a MASM qualified type (BYTE, WORD, etc.) or a structure name. |

EXIT: NONE

NOTES: Segment: Any
File: .\CORE\LISTMGR\LISTMGR.INC

SEE ALSO: LIST_ENTRY (page 11), LIST_START (page 13), LIST_END (page 11)

5.2 LIST_DATA

DESCRIPTION: Changes all or part of the List Data for an already existing List Entry. Must appear between LIST_START and LIST_END and the override priority must be PLATFORM or PRODUCT.

ENTRY:
| | | |
|---|---|---|
| | Name | *entryName*. Name of the List Entry, which will have its List Data changed. |
| | Structure \| number | *newListData*. New List Data. Must be enclosed in angle brackets (< and >). The portion to override is specified by *overrideOffset* and *overrideSize*. |

EXIT: NONE

NOTES: Segment: Any
File: .\CORE\LISTMGR\LISTMGR.INC

SEE ALSO: LIST_ENTRY (page 11), LIST_SORT (page 12)

5.3 LIST_END

| | |
|---|---|
| DESCRIPTION: | Used to declare an entry to a list  Only the record data will remain in the ROM image. The other data is used by the build utility to sort the data. Any component can supply an entry to a list. |
| ENTRY: | NONE |
| EXIT: | NONE |
| NOTES: | Segment:  Any<br>File:  .\CORE\LISTMGR\LISTMGR.INC |
| SEE ALSO: | LIST_START (page 13), LIST_ENTRY (page 11) |

5.4 LIST_ENTRY

| | | |
|---|---|---|
| DESCRIPTION: | Creates a List Entry. Must be used after LIST_START and before LIST_END. The Binary Linker will place only the List Data for the entry in the ROM. | |
| ENTRY: | Name | *entryName*. Name of the individual list entry. Must be unique within the list. |
| | Structure \| number | *listData*. The data, which will make up the body of the List Entry at run-time. The data must be enclosed in angle brackets. The data must be of the type specified in the LIST_START's listType parameter. |
| | Number | *sortPriority*. Used to sort items with the same sort key. Low numbers are placed ahead of higher numbers. Minimum is 0, maximum is 65535 (0xFFFF). Default is 32768 (0x8000). |
| | String | *sortKey*. Used for to match item to a master reference list. Default uses the item's entry name as the Sort key. The string must contain only standard symbol characters (A..Z,a..z,0..9, '_'). |
| EXIT: | NONE | |
| NOTES: | Segment:  Any<br>File:  .\CORE\LISTMGR\LISTMGR.INC | |
| SEE ALSO: | LIST_CREATE (page 10), LIST_START (page 13), LIST_END (page 11 ) | |

5.5 LIST_PRIVATE_LABEL

| | | |
|---|---|---|
| DESCRIPTION: | Creates a List Entry Label. Must be used after LIST_START and before LIST_END. The label can be accessed only within the component in which the label was declared. | |
| ENTRY: | Name | *entryName*. Name of the individual list entry. Must be unique within the list. |
| | Number | *sortPriority*. Used to sort items with the same sort key. Low numbers are placed ahead of higher numbers. Minimum is 0, maximum is 65535 (0xFFFF). Default is 32768 (0x8000). |

– 116 –

|  |  |  |
|---|---|---|
|  | String | *sortKey*. Used for to match item to a master reference list. Default uses the item's entry name as the Sort key. The string must contain only standard symbol characters (A..Z,a..z,0..9, '_'). |
| EXIT: | NONE |  |
| NOTES: | Segment: | Any |
|  | File: | .\CORE\LISTMGR\LISTMGR.INC |
| SEE ALSO: | LIST_CREATE (page 10), LIST_START (page 13), LIST_END (page 11) | |

5.6   LIST_PUBLIC_LABEL

| | | |
|---|---|---|
| DESCRIPTION: | Creates a List Entry Label. Must be used after LIST_START and before LIST_END. The label can be accessed from any. | |
| ENTRY: | Name | *entryName*. Name of the individual list entry. Must be unique within the list. |
|  | Number | *sortPriority*. Used to sort items with the same sort key. Low numbers are placed ahead of higher numbers. Minimum is 0, maximum is 65535 (0xFFFF). Default is 32768 (0x8000). |
|  | String | *sortKey*. Used for to match item to a master reference list. Default uses the item's entry name as the Sort key. The string must contain only standard symbol characters (A..Z,a..z,0..9, '_'). |
| EXIT: | NONE | |
| NOTES: | Segment: | Any |
|  | File: | .\CORE\LISTMGR\LISTMGR.INC |
| SEE ALSO: | LIST_CREATE (page 10), LIST_START (page 13), LIST_END (page 11) | |

5.7   LIST_SORT

| | | |
|---|---|---|
| DESCRIPTION: | Changes the sorting criteria for an already existing List Entry. Must appear between LIST_START and LIST_END and the override priority must be PLATFORM or PRODUCT. | |
| ENTRY: | Name | *entryName*. Name of the List Entry which will have its sort order changed. |
|  | Number | *newSortPriority*. Used to sort items with the same sort key. Low numbers are placed ahead of higher numbers. Minimum is 0, maximum is 65535 (0xFFFF). Default is 32768 (0x8000). |
|  | String | *newSortKey*. Used for to match item to a master reference list. Default uses the item's entry name as the Sort key. The string must contain only standard symbol characters (A..Z,a..z,0..9, '_'). |
| EXIT: | NONE | |
| NOTES: | Segment: | Any |
|  | File: | .\CORE\LISTMGR\LISTMGR.INC |
| SEE ALSO: | LIST_ENTRY (page 11), LIST_DATA (page 10) | |

5.8 LIST_START

DESCRIPTION: Start adding entries to the specified version of the specified list.

ENTRY:
- Name — *listName*. All List Entries will be added to this List. The Binary Linker will generate a warning if there are List Entries in the build for a List, which has not been declared using LIST_CREATE.
- Version — *listVersion*. Major.minor version number of the List specified by listName.
- Qualified Type | Structure Name — *listType*. Data type of each List Entry. Can be a MASM qualified type (BYTE, WORD, etc.) or a structure name.
- Keyword — *overridePriority*. When two entries are found in the build with the same name, this value allows the binary linker to choose one. CORE has lowest priority, PRODUCT is next and PLATFORM is highest.

EXIT: NONE

NOTES:
Segment: Any
File: .\CORE\LISTMGR\LISTMGR.INC

SEE ALSO: LIST_CREATE (page 10)

5.9 MASTER_END

DESCRIPTION: Ends the definition of a Master Index. Must appear following a MASTER_START macro.

ENTRY: NONE

EXIT: NONE

NOTES: File: .\CORE\LISTMGR\LISTMGR.INC
SEE ALSO: MASTER_START (page 14), MASTER_ENTRY (page 10)

5.10 MASTER_ENTRY

DESCRIPTION: Inserts a list entry into the Master Index. Must follow MASTER_START and precede MASTER_END.

ENTRY:
- Name — *keyName*. Name used to create an association between a specific list entry and this Master Index position. Either a Sort Key (Master Index) or List Entry name (Locked Index).

EXIT: NONE

NOTES: File: .\CORE\LISTMGR\LISTMGR.INC
SEE ALSO: MASTER_START (page 14), MASTER_END (page 13)

5.11 MASTER_START

DESCRIPTION: Starts the definition of a Master Index. Must appear before any MASTER_ENTRY or MASTER_END macros.

ENTRY:
- Name    *listName*. Name of the fully qualified list name (including component path) that this Index is associated with.
- Keyword    *indexAttribute*. If LOCKED, then this is a Locked Index. Otherwise, a Master Index.

EXIT: NONE

NOTES: File: .\CORE\LISTMGR\LISTMGR.INC
SEE ALSO: MASTER_END (page 13), MASTER_END (page 13)

6. Public Functions

Below is a list of functions available from the List Manager to access a list. All code that can use a stack should use the list manager to navigate its lists.

6.1 listmgr.exec

DESCRIPTION: Execute all of the functions in a list, starting with the specified List Entry, continuing to the end of the list. Assumes that the first DWORD of the List Entry data structure contains a far pointer to the function.

The function has the following parameters:

| | | |
|---|---|---|
| ENTRY: | GS:DI | Points to list entry. |
| | EAX,EBX, ECX,EDX, ESI | As passed to listmgr.exec |
| EXIT: | NONE | |

The function must be stack based.

Example:
```
      LOADADDR   myList
      EXTCALL    listmgr.execnc
```

ENTRY: GS:DI    Points to first function to execute. If DI = 0 starts at the beginning of the list. If DI = 0FFFFh, exit immediately.

EXIT: NONE

NOTES: Segment: POST,RUNTIME
SEE ALSO: listmgr.execnc (page 15)

- 119 -

6.2 listmgr.execne

DESCRIPTION: Execute functions in a list, starting with the specified List Entry, until one returns carry set (CY) or the end of the list is reached. Assumes that the first DWORD of the list data structure contains a far pointer to the function.

The function has the following parameters:

| | | |
|---|---|---|
| ENTRY: | GS:DI | Points to list entry. |
| | EAX,EBX, ECX,EDX, ESI | As passed to listmgr.exec |
| EXIT: | EAX,EBX, ECX,EDX, ESI | As returned by last function. |

The function must be stack based.

Example:
```
        LOADADDR    myList
        EXTCALL     listmgr.execnc
```

ENTRY: GS:DI — List segment. If DI = 0, start at the beginning of the list. If DI = 0FFFFh, exit immediately.

EXIT: NONE

NOTES: Segment: POST.RUNTIME
SEE ALSO: listmgr.exec (page 14)

6.3 listmgr.getCount

DESCRIPTION: Returns the number of entries in a list.

ENTRY: GS — List segment.

EXIT: CX — Number of entries in the list. 0 = Empty list.

NOTES: Segment: POST.RUNTIME
SEE ALSO: None

6.4 listmgr.getNext

DESCRIPTION: Returns pointer to next entry in the list or an error if there are no more entries in the list.

Example:
```
        LOADADDR myList
processList:
        EXTCALL listmgr.getNext
        jc      processListExit
        . . .
        jmp     processList
processListExit:
```

ENTRY: GS:DI    Points to current entry in the list. If DI = 0, then returns the first entry in the list.

EXIT:
- CY    No more entries in the list. DI is undefined.
- NC    GS:DI    Points to next entry in the list.

NOTES: Segment: POST,RUNTIME
SEE ALSO: None

6.5 listmgr.getNth

DESCRIPTION: Returns pointer to a particular entry in the list or an error if there are no more entries in the list.

Example:
```
        LOADADDR myList
        mov     cx, itemnumber
        EXTCALL listmgr.getNth
        jc      noList
        . . .
noList:
```

ENTRY:
- GS    Points to the current list.
- CX    Index of entry.

EXIT:
- CY    No such entry in the list.
- NC    GS:DI    Points to CXth entry in the list.

NOTES: Segment: POST,RUNTIME
SEE ALSO: None

— 121 —

What is claimed is:

1. A software development system for developing a finished product comprising:

a source code library containing source code elements that include interfaces and dependencies, said interfaces and dependencies including names and class designations and other information, said source code library being organized into objects;

a configurator for developing configuration state data defining the configuration of the finished product based on product configuration data, data scanned from the elements of said source code, including the names and classes and other information relating to dependencies and interfaces, and data about objects and their appropriate use;

a graphical user interface for presenting a visual, logical representation of the product organized in part by class and object, and displaying the configuration data in an expandible tree, the elements of the tree including source code elements, their interfaces and their dependencies, options, indications of any missing elements or linkages graphically, and indications of graphically selected and deselected objects, said graphical user interface accepting commands to select and deselect objects and to adjust options, the effects of the commands being recorded in said configuration state data and in said product configuration data; and a product make routine for generating the finished product from said source code elements under the guidance of said configuration state data.

2. A software development system in accordance with claim 1 which further includes, as part of the data associated with at least some dependencies, object specification data, wherein the object specification data causes the corresponding dependency to be linked to an interface in a source code element included with the specified object in preference to other interfaces having identical identifiers.

3. A software development system in accordance with claim 1 which includes source code elements which must run in a RAM free environment, wherein the product make routine, when modifying such source code elements at call or jump dependencies, sets up a dummy return stack that does a register branch following a return, and at the point of a call or jump, generates and inserts code that loads the immediate address into said register and then produces a jump to the specified interface.

4. A software development system in accordance with claim 1 wherein the configurator, when encountering a dependency that depends upon the presence of an unselected object with a corresponding interface, automatically selects said object for inclusion in the finished product.

5. A software development system in accordance with claim 1 wherein said other information for at least some interfaces and dependencies includes version numbers, and wherein said graphical user interface gives visual indication of any version incompatibiliy.

6. A software development system in accordance with claim 1 wherein said other information for at least some interfaces may optionally include an intercept designation, and wherein said configurator associates a dependency with an interface having an intercept designation in preference over other identically named interfaces.

7. A software development system in accordance with claim 1 wherein said product make routine, when confronted with at least some dependencies for which there is no corresponding interface due to the non-selection of an object, and where this is not an error condition, modifies the source code element by removing the dependency from the source code element.

8. A software development system in accordance with claim 1 wherein said configurator may cause the graphical user interface to give a visual error indication with respect to at least some dependencies for which there is no interface.

9. A software development system in accordance with claim 1 wherein said product make routine converts class and name references for at least some dependencies into name and library address references as it modifies the source code elements.

10. A software development system in accordance with claim 1 wherein at least some of said source code elements contain list elements, and wherein said product make routine modifies the source code elements by bringing those list elements together and inserts them into the final product at a designated point.

11. A software development system in accordance with claim 1 wherein the data about the appropriate use of objects, in at least some cases, includes an indication that the selection of one object is triggered by the selection of another object; and wherein said configurator, when encountering such data, selects said another object whenever said one object is also selected.

* * * * *